(12) United States Patent
Yamane et al.

(10) Patent No.: US 6,393,196 B1
(45) Date of Patent: May 21, 2002

(54) MULTIMEDIA STREAM GENERATING METHOD ENABLING ALTERNATIVE REPRODUCTION OF VIDEO DATA, AND A MULTIMEDIA OPTICAL DISK AUTHORING SYSTEM

(75) Inventors: Yasuhiko Yamane, Moriguchi; Takumi Hasebe, Yawata; Kazuhiko Nakamura, Hirakata; Hideki Fukuda; Tomoyuki Okada, both of Katano; Yoshiichiro Kashiwagi, Yawata; Yoshihiro Mori, Hirakata; Kenji Tagawa, Katano, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/077,332
(22) PCT Filed: Sep. 26, 1997
(86) PCT No.: PCT/JP97/03443
  § 371 Date: May 27, 1998
  § 102(e) Date: May 27, 1998
(87) PCT Pub. No.: WO98/13769
  PCT Pub. Date: Apr. 2, 1998

(30) Foreign Application Priority Data

Sep. 27, 1996 (JP) ............................................. 8-277014

(51) Int. Cl.[7] ................................................. H04N 5/76
(52) U.S. Cl. ........................... 386/52; 386/98; 386/111; 386/126
(58) Field of Search ................................. 386/4, 33, 39, 386/95, 98, 45, 125–126, 52, 54, 64, 111–112; 348/423.1; 360/8, 13; 369/83; H04N 5/76, 5/92, 9/79

(56) References Cited

U.S. PATENT DOCUMENTS

| | | | | |
|---|---|---|---|---|
| 5,745,645 A | * | 4/1998 | Makamura et al. | 386/111 |
| 5,784,528 A | * | 7/1998 | Yamane et al. | 386/112 |
| 5,895,124 A | * | 4/1999 | Tsuga et al. | 386/98 |
| 5,937,136 A | * | 8/1999 | Sato | 386/52 |
| 6,081,785 A | * | 6/2000 | Oshima et al. | 380/201 |
| 6,154,600 A | * | 11/2000 | Newman et al. | 386/52 |

FOREIGN PATENT DOCUMENTS

| | | |
|---|---|---|
| EP | 0 729 152 | 8/1996 |
| JP | 6-268954 | 9/1994 |
| JP | 8-294088 | 11/1996 |
| JP | 9-63251 | 3/1997 |
| JP | 9-63252 | 3/1997 |

* cited by examiner

*Primary Examiner*—Thai Tran
(74) *Attorney, Agent, or Firm*—Wenderoth, Lind & Ponack, L.L.P.

(57) ABSTRACT

An authoring system variously processes a bitstream carrying information about moving picture data, audio data, and subpicture data constituting titles having a sequence of related content, generates a bitstream constituting a title with content corresponding to a user selection, efficiently records the generated bitstream to a specific recording medium, and reproduces title content corresponding to a user selection from the bitstream thus generated. Editing content input by a user using a keyboard or other device for the multimedia bitstream content is the source data is converted to authoring encoding parameters. Whether certain conditions determined by the data structure and other considerations of the authoring system are met is determined, and if the conditions are not satisfied, feedback is given to the user to prompt re-entry of the editing information.

20 Claims, 46 Drawing Sheets

Fig.15

| |
|---|
| VOB NUMBER (VOB_NO) |
| VIDEO ENCODING START TIME (V_STTM) |
| VIDEO ENCODING END TIME (V_ENDTM) |
| VIDEO ENCODING MODE (V_ENCMD) |
| VIDEO ENCODING BIT RATE (V_RATE) |
| MAXIMUM VIDEO ENCODING BIT RATE (V_MRATE) |
| GOP STRUCTURE FIXING FLAG (GOP_FXflag) |
| VIDEO ENCODING GOP STRUCTURE (GOPST) |
| INITIAL VIDEO ENCODING DATA (V_INST) |
| LAST VIDEO ENCODING DATA (V_ENDST) |
| AUDIO ENCODING START TIME (A_STTM) |
| AUDIO ENCODING END TIME (A_ENDTM) |
| AUDIO ENCODING BIT RATE (A_RATE) |
| AUDIO ENCODING METHOD (A_ENCMD) |
| AUDIO START GAP (A_STGAP) |
| AUDIO END GAP (A_ENDGAP) |
| PRECEDING VOB NUMBER (B_VOB_NO) |
| FOLLOWING VOB NUMBER (F_VOB_NO) |

Fig.32

| SCENARIO INFORMATION REGISTER | REGISTER NAME | VALUE |
|---|---|---|
| | ANGLE NUMBER (ANGLE_NO reg) | |
| | VTS NUMBER REGISTER (VTS_NO reg) | |
| | PGC NUMBER REGISTER (VTS_PGCI_NO reg) | |
| | AUDIO ID REGISTER (AUDIO_ID reg) | |
| | SUBPICTURE ID REGISTER (SP_ID reg) | |
| | SCR BUFFER (SCR_buffer) | |
| CELL INFORMATION REGISTER | REGISTER NAME | VALUE |
| | CELL BLOCK MODE REGISTER (CBM_reg) | N_BLOCK: Not a Cell in the block |
| | | F_CELL: First Cell in the block |
| | | BLOCK: Cell in the block |
| | | L_CELL: Last Cell in the block |
| | CELL BLOCK TYPE REGISTER (CBT_reg) | N_BLOCK: Not a part of in the block |
| | | A_BLOCK: Angle block |
| | SEAMLESS REPRODUCTION FLAG REGISTER (SPF_reg) | SML: A Cell shall be presented seamlessly |
| | | NSML: A Cell shall not be presented seamlessly |
| | INTERLEAVED ALLOCATION FLAG REGISTER (IAF_reg) | N_ILVB: Exist in the Contiguous block |
| | | ILVB: Exist in the Interleaved block |
| | STC DISCONTINUITY FLAG REGISTER (STCDF_reg) | STC_NRESET: STC reset is not necessary |
| | | STC_RESET: STC reset is necessary |
| | SEAMLESS ANGLE CHANGE FLAG REGISTER (SACF_reg) | SML: A Cell shall be presented seamlessly |
| | | NSML: A Cell shall not be presented seamlessly |
| | FIRST CELL VOBU START ADDRESS (C_FOVOBU_SA_reg) | |
| | LAST CELL VOBU START ADDRESS (C_LOVOBU_SA_reg) | |

Fig.33

| | REGISTER NAME |
|---|---|
| INFORMATION REGISTER FOR NON-SEAMLESS MULTI-ANGLE | SWITCHING ADDRESS FOR NON-SEAMLESS ANGLE1(NSML_AGL_C1_DSTA_reg) |
| | SWITCHING ADDRESS FOR NON-SEAMLESS ANGLE2(NSML_AGL_C2_DSTA_reg) |
| | SWITCHING ADDRESS FOR NON-SEAMLESS ANGLE3(NSML_AGL_C3_DSTA_reg) |
| | SWITCHING ADDRESS FOR NON-SEAMLESS ANGLE4(NSML_AGL_C4_DSTA_reg) |
| | SWITCHING ADDRESS FOR NON-SEAMLESS ANGLE5(NSML_AGL_C5_DSTA_reg) |
| | SWITCHING ADDRESS FOR NON-SEAMLESS ANGLE6(NSML_AGL_C6_DSTA_reg) |
| | SWITCHING ADDRESS FOR NON-SEAMLESS ANGLE7(NSML_AGL_C7_DSTA_reg) |
| | SWITCHING ADDRESS FOR NON-SEAMLESS ANGLE8(NSML_AGL_C8_DSTA_reg) |
| | SWITCHING ADDRESS FOR NON-SEAMLESS ANGLE9(NSML_AGL_C9_DSTA_reg) |
| INFORMATION REGISTER FOR SEAMLESS MULTI-ANGLE | REGISTER NAME |
| | SWITCHING ADDRESS FOR SEAMLESS ANGLE1(SML_AGL_C1_DSTA_reg) |
| | SWITCHING ADDRESS FOR SEAMLESS ANGLE2(SML_AGL_C2_DSTA_reg) |
| | SWITCHING ADDRESS FOR SEAMLESS ANGLE3(SML_AGL_C3_DSTA_reg) |
| | SWITCHING ADDRESS FOR SEAMLESS ANGLE4(SML_AGL_C4_DSTA_reg) |
| | SWITCHING ADDRESS FOR SEAMLESS ANGLE5(SML_AGL_C5_DSTA_reg) |
| | SWITCHING ADDRESS FOR SEAMLESS ANGLE6(SML_AGL_C6_DSTA_reg) |
| | SWITCHING ADDRESS FOR SEAMLESS ANGLE7(SML_AGL_C7_DSTA_reg) |
| | SWITCHING ADDRESS FOR SEAMLESS ANGLE8(SML_AGL_C8_DSTA_reg) |
| | SWITCHING ADDRESS FOR SEAMLESS ANGLE9(SML_AGL_C9_DSTA_reg) |
| VOBU INFORMATION REGISTER | REGISTER NAME | |
| | VOBU END PACK ADDRESS(VOBU_EA_reg) | |
| | REGISTER NAME | VALUE |
| | INTERLEAVED UNIT FLAG (ILVU_flag_reg) | ILVU: VOBU is in ILVU |
| | | N_ILVU: VOBU is not in ILVU |
| | UNIT END FLAG (UNIT_END_flag_reg) | END: At the end of ILVU |
| | | N_END: Not at the end of ILVU |
| REGISTER FOR SEAMLESS REPRODUCTION | ILVU END PACK ADDRESS(ILVU_EA_reg) |
| | NEXT INTERLEAVED UNIT START ADDRESS(NT_ILVU_SA_reg) |
| | PRESENTATION START TIME OF THE FIRST VIDEO FRAME IN THE VOB (VOB_V_SPTM_reg) |
| | PRESENTATION END TIME OF THE LAST VIDEO FRAME IN THE VOB (VOB_V_EPTM_reg) |
| | AUDIO REPRODUCTION STOPPING TIME1 (VOB_A_GAP_PTM1_reg) |
| | AUDIO REPRODUCTION STOPPING TIME2 (VOB_A_GAP_PTM2_reg) |
| | AUDIO REPRODUCTION STOPPING PERIOD1 (VOB_A_GAP_LEN1_reg) |
| | AUDIO REPRODUCTION STOPPING PERIOD2 (VOB_A_GAP_LEN2_reg) |

*Fig.43*

```
###################
#VTBL

###################

VOB    Audio  SP   ATTR   START_TC      END_TC         BR   I32 v01,    3,     8,   SL,    01:00:00:00,  01:00:22:20,   4,   OFF
v02,    3,     8,   DC,    01:00:22:20,  01:02:17:28,   4,   OFF
v02cut, 3,     8,   DC,    01:00:22:20,  01:02:10:28,   4,   OFF
v03,    3,     8,   SL,    01:02:17:28,  01:07:52:15,   4,   OFF
v04en,  3,     8,   AG,    01:07:52:15,  01:08:27:00,   4,   OFF
v04fr,  3,     8,   AG,    01:07:52:15,  01:08:27:00,   4,   OFF
v04es,  3,     8,   AG,    01:07:52:15,  01:08:27:00,   4,   OFF
v04pt,  3,     8,   AG,    01:07:52:15,  01:08:27:00,   4,   OFF
v05,    3,     8,   SL,    01:08:27:00,  01:15:50:18,   4,   OFF
```

Fig. 44

```
###################
# ATBL

###################
```

| #VOB | STR_NO | MODE | START_TC | END_TC | ATTR | BR | FQ |
|---|---|---|---|---|---|---|---|
| v01, | 0, | AC3, | 01:00:00:00, | 01:00:22:20, | SL, | 38400 | 48 |
| v02, | 0, | AC3, | 01:00:22:20, | 01:02:17:28, | DC, | 38400 | 48 |
| v02cut, | 0, | AC3, | 01:00:22:20, | 01:02:10:28, | DC, | 38400 | 48 |
| v03, | 0, | AC3, | 01:02:17:28, | 01:07:52:15, | SL, | 38400 | 48 |
| v04en, | 0, | AC3, | 01:07:52:15, | 01:08:27:00, | AG, | 38400 | 48 |
| v04es, | 0, | AC3, | 01:07:52:15, | 01:08:27:00, | AG, | 38400 | 48 |
| v04fr, | 0, | AC3, | 01:07:52:15, | 01:08:27:00, | AG, | 38400 | 48 |
| v04pt, | 0, | AC3, | 01:07:52:15, | 01:08:27:00, | AG, | 38400 | 48 |
| v05, | 0, | AC3, | 01:08:27:00, | 01:15:50:18, | SL, | 38400 | 48 |
| v01, | 1, | AC3, | 01:00:00:00, | 01:00:22:20, | SL, | 38400 | 48 |
| v02, | 1, | AC3, | 01:00:22:20, | 01:02:17:28, | DC, | 38400 | 48 |
| v02cut, | 1, | AC3, | 01:00:22:20, | 01:02:10:28, | DC, | 38400 | 48 |
| v03, | 1, | AC3, | 01:02:17:28, | 01:07:52:15, | SL, | 38400 | 48 |
| v04en, | 1, | AC3, | 01:07:52:15, | 01:08:27:00, | AG, | 38400 | 48 |
| v04es, | 1, | AC3, | 01:07:52:15, | 01:08:27:00, | AG, | 38400 | 48 |
| v04fr, | 1, | AC3, | 01:07:52:15, | 01:08:27:00, | AG, | 38400 | 48 |
| v04pt, | 1, | AC3, | 01:07:52:15, | 01:08:27:00, | AG, | 38400 | 48 |
| v05, | 1, | AC3, | 01:08:27:00, | 01:15:50:18, | SL, | 38400 | 48 |
| v01, | 2, | AC3, | 01:00:00:00, | 01:00:22:20, | SL, | 38400 | 48 |
| v02, | 2, | AC3, | 01:00:22:20, | 01:02:17:28, | DC, | 38400 | 48 |
| v02cut, | 2, | AC3, | 01:00:22:20, | 01:02:10:28, | DC, | 38400 | 48 |
| v03, | 2, | AC3, | 01:02:17:28, | 01:07:52:15, | SL, | 38400 | 48 |
| v04en, | 2, | AC3, | 01:07:52:15, | 01:08:27:00, | AG, | 38400 | 48 |
| v04es, | 2, | AC3, | 01:07:52:15, | 01:08:27:00, | AG, | 38400 | 48 |
| v04fr, | 2, | AC3, | 01:07:52:15, | 01:08:27:00, | AG, | 38400 | 48 |
| v04pt, | 2, | AC3, | 01:07:52:15, | 01:08:27:00, | AG, | 38400 | 48 |
| v05, | 2, | AC3, | 01:08:27:00, | 01:15:50:18, | SL, | 38400 | 48 |

MULTIMEDIA STREAM GENERATING METHOD ENABLING ALTERNATIVE REPRODUCTION OF VIDEO DATA, AND A MULTIMEDIA OPTICAL DISK AUTHORING SYSTEM

TECHNICAL FIELD

The present invention relates to an authoring system for: variously processing a bitstream carrying video information representing individual titles having content with a particular sequential relationship, audio data, and ancillary video data; generating a bitstream whereby a title with user-selectable content can be constructed; efficiently recording to a particular recording medium the generated bitstream; and reproducing title content according to a user-selected sequence from the generated bitstream. More specifically, the present invention relates to a method for generating a multimedia stream comprising mutually related audio data and video data, and to a multimedia optical disk authoring system for storing the multimedia stream as digital data.

BACKGROUND ART

Authoring systems that are part of systems using analog video and video CDs for producing titles having content with a particular sequential relationship by digitally processing multimedia data such as video data, audio data, and ancillary video data have been developed in recent years. MPEG data is one example of a multimedia stream comprising such audio information and video information. MPEG data recording media include Video CD, and an authoring system therefor is based on a workstation. A Video CD system is able to record video data to a CD medium, which is usually used for digital audio recording and has a recording capacity of approximately 600 megabytes, by using a high efficiency MPEG video compression method.

In this type of authoring system, elementary streams of video and audio information are first encoded, and then system stream encoding is applied to these elementary streams to generate an MPEG stream. A reproduction path, which is a reproduction sequence of an MPEG stream, is then determined to enable reproduction of content according to a user-selected scenario. This scenario information and MPEG stream are then multiplexed, converted to a disc image of the CD medium, and then recorded to a CD medium to create a master disc. This master disc is then duplicated by means of a pressing process or other method to produce discs for distribution.

More recently, an optical disc recording medium known as DVD has been introduced with a greater storage capacity than Video CD. Video with an extended play time can be stored to DVD media, and this capacity can be used to achieve such desirable, but conventionally unavailable functions, as an alternative path playback function for video data. Alternative path playback is a function whereby video data from plural related paths is divided into specific segments, which are then multiplexed on an optical disc. A disc reproduction apparatus then reproduces only the video data segments selected from among a plurality of multiplexed video data segments, skipping those multiplexed segments not associated with a selected reproduction path. These multiplexed sections are called "alternative video reproduction periods."

An example of an alternative reproduction function is the parental lock playback function whereby the playback video is selectively reproduced according to viewing restriction information. More specifically, this function enables the selective presentation or non-presentation of, for example, violent scenes in a movie. A further example of an applied alternative reproduction function is multi-viewpoint playback in which images from different viewing angles are selectively reproduced. A specific example of this is a baseball game in which the imaging angle of the video playback can be selectively changed during a live broadcast to images presented from, for example, the batter's viewpoint, the pitcher's viewpoint, or the viewpoint of a spectator's seat.

Because alternative video reproduction periods are skipped during playback, associated video data must satisfy a wide range of restrictive conditions relating to encoder conditions and video data combinations. However, conventional Video CD and other authoring system processes, in principle, generate all MPEG data according to the same conditions. As a result, directly applying this process will result in the generation of defective alternative video reproduction periods due to video data not satisfying these conditions. Discs containing such defective alternative video reproduction periods will cause the disc reproduction apparatus to malfunction during playback.

Furthermore, such defective alternative video reproduction periods cannot be detected until the segment is played back after the master disc is completed. As a result, the title producer must re-author the master disc starting from the encoding process, imposing a significant burden. The magnitude of this burden is particularly severe during MPEG-2 encoding. MPEG-2 encoding, in general, provides significantly higher quality audio and video streams compared with MPEG-1, and the playback time is approximately double. This is because the video quality in MPEG-2 is determined by such factors as the bit rate and other parameters specified during encoding, and by the filters used. A two-pass encoding process is therefore used. In this two-pass process, the encoded image quality is checked, parameters are readjusted to achieve the image quality that can be provided with MPEG-2, and the final image is then produced through a second encoding pass. As will thus be obvious, a significant amount of work is required to generate a multimedia stream containing alternative video reproduction periods.

The compression method and data syntax of MPEG-2 are also slightly different from those used in MPEG-1. The content of and differences between MPEG-1 and MPEG-2 are described in detail in the MPEG standards ISO-11172 and ISO-13818, and further description thereof is thus omitted below. While the structure of the video encoding stream is defined in MPEG-2, a hierarchical structure for the system stream and a method for processing low hierarchy levels are not clearly defined.

BRIEF SUMMARY OF THE INVENTION

In consideration of the above problem, an object of the present invention is to provide a generating method for efficiently generating a multimedia stream containing alternative video reproduction periods and an authoring system therefor. The invention relates to an authoring system for generating a bitstream constituting a title having content corresponding to a user selection by applying a variety of processes to a source stream carrying video data, audio data, and ancillary video data constituting titles having content with a particular sequential relationship. The authoring system comprising a means for presenting source stream content in editing units, and a means for generating edit command data for the presented editing units (VOB).

BRIEF DESCRIPTION OF DRAWINGS

FIG. 15 is a typical diagram of an encoding parameter structure according to the present invention.

FIG. 32 is a typical diagram showing the structure of a decoding system table according to the present invention.

FIG. 33 is a typical diagram showing the structure of a decoding table according to the present invention.

FIG. 43 is used to describe the structure of a video table VTBL.

FIG. 44 is used to describe the structure of an audio table ATBL.

DETAILED DESCRIPTION OF THE INVENTION

Figure 1:
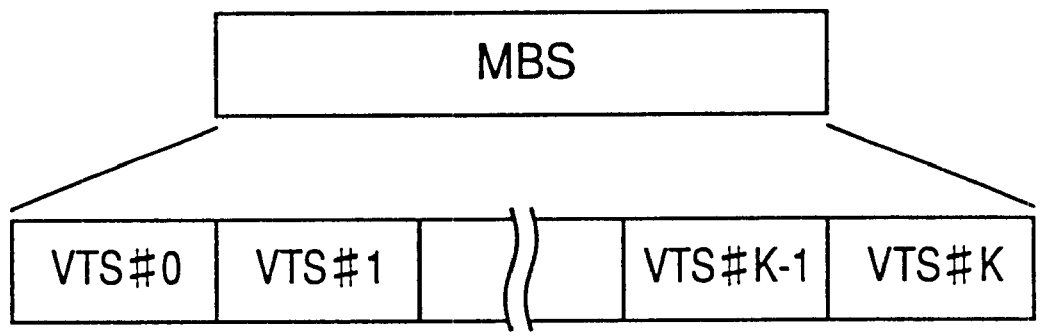
FIG. 1 is a typical diagram of a data structure of a multimedia bitstream.

<1.1> Data-structure of an authoring system
<1.2> Authoring encoder EC
<1.3> Scenario data St7 generation
<1.4> Authoring decoder DCD
<1.5> Scenario selection data St51 generation
<2.1> Parental lock control and multiangle control
<2.2> Segmenting an alternative reproduction period for parental lock control
<2.3> An example of limit values of an alternative reproduction period for parental lock control <2.4> Dividing an alternative reproduction period for angles
<2.5> Multiscene control
<3.1> Data structure in a DVD system
<3.2> DVD encoder
<3.3> DVD decoder
<3.3.1> Multiscene
<3.3.2> Seamless playback
<3.3.3> Details of seamless playback
<3.4.1> Interleaving
<3.4.2> Definition of interleaving
<3.4.3> Structure of interleave blocks and units
<3.5.1> Multiscene control
<3.5.2> Parental control
<3.5.3> Multi-angle control
<3.6.1> Flow chart: encoder
<3.6.2> Formatter flow chart descriptions
<3.7> Decoder flow charts
<3.7.1> Disk-to-stream buffer transfer
<3.8> DVD player
<1.1> Data Structure of an Authoring System The logic structure of a multimedia data bitstream processed by a recording apparatus, recording medium, and reproduction apparatus according to the present invention, and by an authoring system comprising the function thereof, is described first below with reference to FIG. 1. Video and audio information of which the content can be recognized, understood, or enjoyed by a user is defined as one title. With reference to a movie, for example, a title contains the information used to express, in the broadest context, the complete content of a single movie, and, in the smallest context, the content of each individual scene.

A video title set VTS comprises bitstream data containing information for a specific number of titles. For brevity, a video title set VTS is referred to below as simply a VTS. A VTS contains reproduction data, such as the video and audio representing the actual content of each title, and control data for controlling the reproduction data.

A video zone VZ, which is one video data unit in an authoring system, is formed from a specific number of VTS. For brevity, a video zone VZ is referred to below as simply a VZ. K+1 VTS numbered VTS #0 to VTS #K, where K is a positive integer including zero, are arranged in linear sequence in one VZ. One of these VTS, preferably the first VTS #0, is used as a video manager for manifesting the title content contained in each VTS.

A multimedia bitstream MBS, which is the largest management unit of a bitstream of multimedia data in an authoring system, is formed from a specific number of VZ comprised as described above.

<1.2> Authoring Encoder EC

Figure 2:
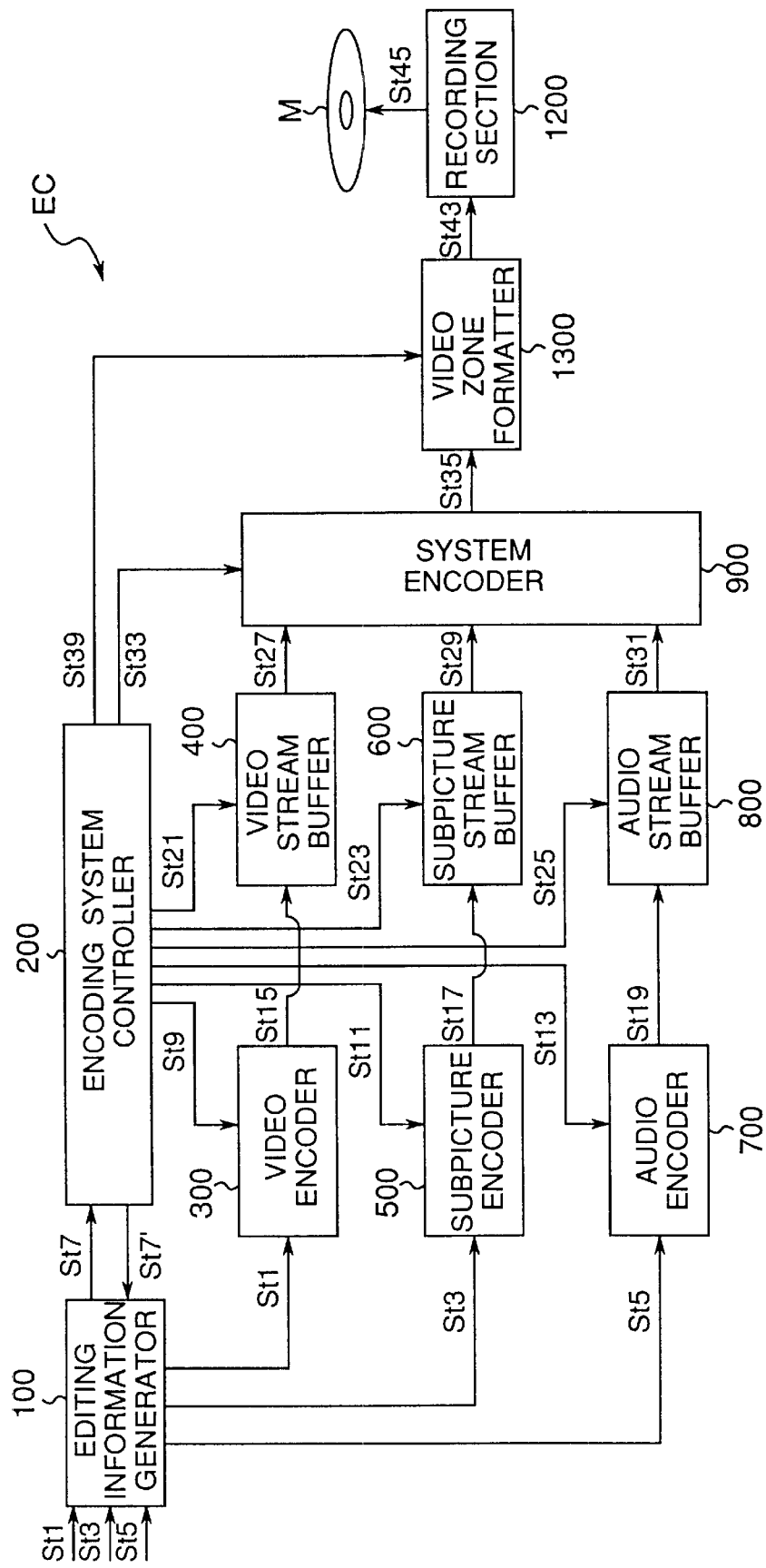
FIG. 2 is a block diagram of a structure of an authoring encoder comprising an editing information generator shown in FIG. 38.

A preferred embodiment of an authoring encoder EC based on the present invention for generating a new multimedia bitstream MBS by encoding an original multimedia bitstream according to a user-defined scenario is shown in FIG. 2. Note that an original multimedia bitstream comprises a video stream St1 for carrying video information, a subpicture stream St3 for carrying captions and other ancillary video information, and an audio stream St5 for carrying audio information. The video stream and audio stream are streams containing video and audio information obtained from a target during a specified period. The subpicture stream is a stream containing video information for one screen, that is, momentary video information. If necessary, the subpicture for one screen can be captured to video memory, for example, and the captured subpicture screen can be continuously displayed.

During a live broadcast, multimedia source data St1, St3, and St5 are supplied in real-time as video and audio signals from a video camera or other means. They may also be non-real-time video and audio signals reproduced from video tape or other recording medium. It should be noted that three different multimedia source streams are shown in the figure for simplicity, and it will be obvious that three or more source data streams each representing different title content can be input. Multimedia source data comprising audio, video, and ancillary video information for a plurality of titles is referred to as a multi-title stream.

An authoring encoder EC comprises an editing information generator 100, encoding system controller 200, video encoder 300, video stream buffer 400, subpicture encoder 500, subpicture stream buffer 600, audio encoder 700, audio stream buffer 800, system encoder 900, video zone formatter 1300, recording section 1200, and recording medium M. A bitstream encoded by an encoder according to the present invention as shown in the figure is recorded to, for example, an optical disk medium.

The authoring encoder EC comprises an editing information generator 100 for outputting scenario data instructing editing the parts of the multimedia bitstream MBS corresponding to the user selections of video, subpicture, and audio information in an original multimedia title. An editing information generator 100 preferably comprises a display unit, speaker unit, keyboard, CPU, and source stream buffer. The editing information generator 100 is connected to the above-described external multimedia stream source from which the multimedia source data St1, St3, and St5 are supplied.

A user can reproduce video and audio in the multimedia source data on the display unit and speaker unit to recognize the title content. While confirming the reproduced content, a user can enter content editing commands according to a desired scenario using the keyboard unit. Note that editing command content refers to information describing whether all or part of the source data containing content for a plurality of titles is selected, describes what source data content is selected at specific time intervals, and describes how the selected content is connected and reproduced.

Based on the keyboard input, the CPU generates scenario data St7, which encodes such information as the location, length, and time-base relationship between edit objects in the selected parts of multimedia source data St1, St3, and St5. It should be noted that generating the scenario data St7 is described in detail below together with the structure and operation of the editing information generator 100 while referring to FIG. 37, FIG. 38, FIG. 39, and FIG. 40.

The source stream buffer has a specific capacity, and outputs after delaying the multimedia source data streams St1, St3, and St5 a specific time Td. This delay is required because a certain time Td is needed to determine the editing process contents of the multimedia source data based on the scenario data St7 when encoding is done at the same time the scenario data St7 is generated, that is, when a sequential encoding process is used. It is therefore necessary during the actual edit encoding process to delay the multimedia source data for time Td for synchronization with edit encoding. The delay time Td used in this sequential editing process only needs to be long enough to resynchronize the various elements of the system, and the source stream buffer therefore normally comprises semiconductor memory or other high speed recording medium.

When the multimedia source data is encoded at one time after the scenario data St7 is generated for the entire title, that is, when the multimedia source data is encoded during batch encoding, the delay time Td must be at least as long as one title. In this case, the source stream buffer can be a low speed, high capacity storage medium such as video tape, magnetic disk, or optical disk. More specifically, the source stream buffer can be constructed using an appropriate storage medium according to the delay time Td and manufacturing cost.

The encoding system controller 200 is connected to the editing information generator 100, and receives the scenario data St7 from the editing information generator 100. The encoding system controller 200 generates the encoding parameter data, and the encoding start and stop timing signals St9, St11, and St13 for edit objects in the multimedia source data based on information relating to the time-base position and length of edit content contained in the scenario data St7. The encoding system controller 200 also encodes the scenario data St7 to edit control command data St7' at the smallest editing unit level of the bitstream that is valid for the authoring encoder EC, and feeds the edit control command data St7' back to the editing information generator 100. Note the process for generating this edit control command data St7' is described below with reference to FIG. 37.

As thus described, the multimedia source data St1, St3, and St5 are synchronized with the timing signals St9, St11, and St13 because St1, St3, and St5 are output after being delayed time Td by the source stream buffer. More specifically, signal St9 is a video encoding signal, and thus specifies the encoding timing of the video stream St1; the video encoding signal St9 is thus used to extract the part of video stream St1 to be encoded, and generate the video encoding unit. Signal St11 is likewise a subpicture stream encoding signal for declaring the timing at which the subpicture stream St3 is encoded to generate a subpicture encoding unit. In addition, signal St13 is an audio encoding signal for declaring the timing at which the audio stream St5 is encoded to generate an audio encoding unit.

The encoding system controller 200 also generates timing signals St21, St23, and St25 for arranging the encoded multimedia encoding streams in a particular mutual relationship based on the streams St1, St3, and St5 of the multimedia source data contained in the scenario data St7.

The encoding system controller 200 also generates stream encoding data St33 for a title editing unit (VOB) of each title in one video zone VZ. The stream encoding data St33 indicates encoding parameters for system encoding, that is, multiplexing the video, audio, and subpicture multimedia encoding streams, and the reproduction time information IT, which is indicative of the reproduction presentation time of a title editing unit (VOB).

The encoding system controller 200 furthermore generates an formatting command signal St39 defining the formatting parameters for formatting the title editing units (VOB) as a multimedia bitstream MBS based on the title editing units (VOB) of each stream where the title editing units (VOB) are in a specific mutual time-base relationship. The formatting command signal St39 is used for generating connections between the title editing units (VOB) of each title in a multimedia bitstream MBS, or interleaved title editing units (VOBs) for interleaving the title editing units.

The video encoder 300 is connected to the source stream buffer of the editing information generator 100 and to the encoding system controller 200, and receives therefrom the video stream St1, encoding parameter data for video encoding, and encoding start/stop timing signals St9. This parameter data includes, for example, the encoding start/stop timing, bit rate, encoding conditions for starting and stopping encoding, and type of content information; the type of content information includes, for example, whether the signal is formatted as an NTSC signal, PAL signal, or telecine content. Based on the video encoding signal St9, the video encoder 300 encodes a specific part of the video stream St1, and thereby generates the video encoding stream St15.

The subpicture encoder 500 is connected to a source buffer of the editing information generator 100, and to the encoding system controller 200, and receives therefrom the subpicture stream St3 and the subpicture stream encoding signal St11. Based on the parameter signal St11 for subpicture stream encoding, the subpicture encoder 500 encodes a specific part of the subpicture stream St3, and thereby generates the subpicture encoding stream St17.

The audio encoder 700 is also connected to a source buffer of the editing information generator 100, and to the encoding system controller 200, and receives therefrom the audio stream St5 and audio encoding signal St13. Based on the audio encoding parameter data and encoding start/stop timing signal St13, the audio encoder 700 encodes a specific part of the audio stream St5, and thereby generates the audio encoding stream St19.

The video stream buffer 400 is connected to the video encoder 300, and stores the video encoding stream St15 output from the video encoder 300. The video stream buffer 400 is also connected to the encoding system controller 200, and based on timing signal St21 outputs the stored video encoding stream St15 as time-base adjusted video encoding signal St27.

In the same manner, the subpicture stream buffer 600 is connected to the subpicture encoder 500, and stores the subpicture encoding stream St17 output from the subpicture encoder 500. The subpicture stream buffer 600 is further connected to the encoding system controller 200, and based on the input timing signal St23 outputs the stored subpicture encoding stream St17 as the time-base adjusted subpicture encoding stream St29.

Furthermore, the audio stream buffer 800 is connected to the audio encoder 700, and stores the audio encoding stream St19 output from the audio encoder 700. The audio stream buffer 800 is further connected to the encoding system controller 200, and based on the input timing signal St25 outputs the stores audio encoding stream St19 as the time-base adjusted audio encoding stream St31.

The system encoder 900 is connected to the video stream buffer 400, subpicture stream buffer 600, and audio stream buffer 800, and receives therefrom the time-base adjusted video encoding signal St27, time-base adjusted subpicture encoding stream St29, and time-base adjusted audio encoding stream St31. The system encoder 900 is further connected to the encoding system controller 200, and receives therefrom the system encoding stream St33.

Based on the system encoded encoding parameter data and encoding start/stop timing signal St33, the system encoder 900 applies a multiplex encoding process to the time-base adjusted streams St27, St29, and St31 to generate a title editing unit (VOB) St35.

The video zone formatter 1300 is connected to the system encoder 900 from which a title editing unit St35 is input. The video zone formatter 1300 is further connected to the encoding system controller 200 from which the formatting parameter data and formatting start/stop timing signal St39 are input for formatting a multimedia bitstream MBS. Based on the title editing unit St39, the video zone formatter 1300 rearranges the title editing units St35 for one video zone VZ into a sequence conforming to the user-defined scenario, and thereby generates an edited multimedia bitstream St43.

This multimedia bitstream St43 edited to user-defined scenario content is then transferred to a recording section

1200. The recording section 1200 processes the edited multimedia bitstream MBS to data St43 in a format corresponding to the recording medium M, and records to the recording medium M. Note that the multimedia bitstream MBS contains the volume file structure VFS, which indicates physical addresses on the recording medium generated by the video zone formatter 1300.

The encoded multimedia bitstream St35 can also be output directly to a decoder as described below for reproduction of the edited title content. It will be obvious that in this case the multimedia bitstream MBS does not contain a volume file structure VFS.

<1.3> Scenario Data St7 Generation

Figure 37:
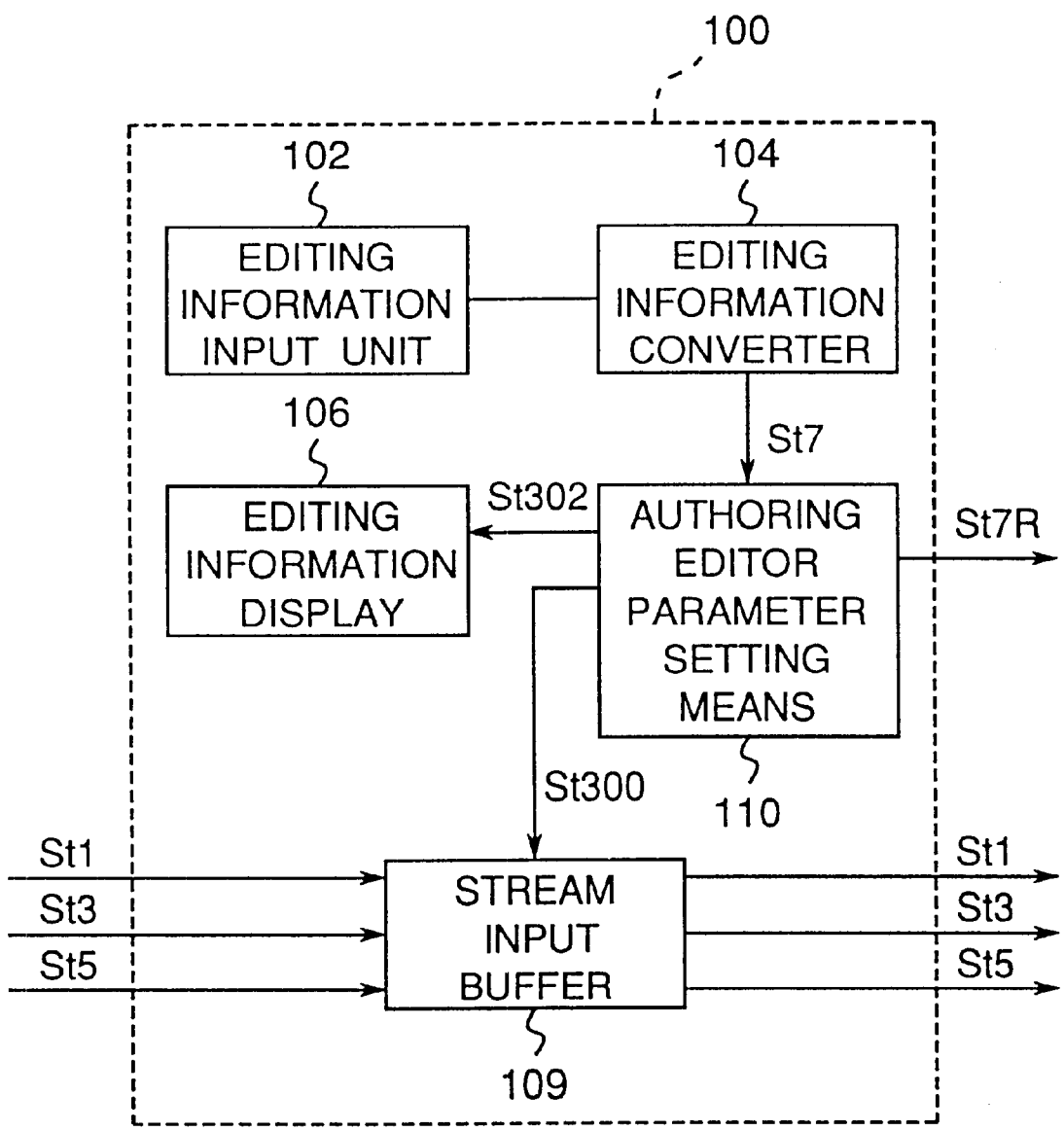
FIG. 37 is a block diagram of the structure of a first embodiment of an editing information generator according to the present invention shown in FIG. 12.

The method of generating the scenario data St7 described above is described next below with reference to FIG. 37 in which a configuration of the editing information generator 100 is shown. As shown in FIG. 37, the editing information generator 100 comprises an editing information input means 102, editing information converter 104, authoring editor parameter setting means 110, editing information display 106, and stream input buffer 109. The editing objects, that is, the video, subpicture, and audio source streams St1, St2, and St3 are temporarily stored synchronized to the edit timing in the stream input buffer 109.

The editing information input means 102 is a means for inputting editing instructions reflecting user intent to the authoring encoder EC.

The editing information converter 104 is a means for converting the editing instruction signal input by the user by means of the editing information input means 102, and generating the scenario data St7.

The authoring editor parameter setting means 110 outputs a synchronization signal St300 for synchronization with the source stream edit timing to the stream input buffer 109.

The authoring editor parameter setting means 110 also determines whether the encoded user editing command content conforms to the configuration and functional limitations of the multimedia bitstream data format of the multimedia bitstream used in the authoring system, the authoring encoder EC, and the authoring decoder DC described below, that is, satisfies the authoring edit parameter conditions. The authoring editor parameter setting means 110 combined with the editing information converter 104 are equivalent to the CPU described above. It should be noted that the authoring editor parameter setting means 110 thus comprises the ability to present the source stream to the user in the smallest editing units possible.

When the authoring editor parameter setting means 110 determines that the users editing control command data St7R satisfies the authoring edit parameter conditions, the authoring editor parameter setting means 110 outputs the editing control command data St7R to the encoding system controller 200 as the scenario data St7 shown in FIG. 2. Based on this editing control command data, the encoding system controller 200 generates the authoring encoding parameters. Based on these authoring encoding parameters, the authoring encoder EC encodes the source streams St1, St3, and St5 to generate an authoring title bitstream.

As a result of evaluating the authoring edit parameter conditions contained in the user's editing control command data St7R, the authoring editor parameter setting means 110 outputs the editing parameter data, that is, data indicative of the authoring edit parameters and the editing condition values, as editing information data St302 usable by the editing information display 106.

The editing information display 106 is equivalent to the above-described display, and by checking the editing parameters and editing condition values shown on the display, a user can reenter correct editing commands using the editing information input means 102.

An authoring encoder EC comprising an editing information generator 100 with a different configuration from that shown in FIG. 37 is described next below with reference to FIG. 2 and FIG. 38. In the editing information generator 100 shown in FIG. 38, the authoring editor parameter setting means 110 of the editing information generator 100 shown in FIG. 37 is replaced by an editing information convertor 111. In addition, the editing information converter 104 outputs the scenario data St7 simultaneously to this editing information convertor 111 and the encoding system controller 200. Based on the scenario data St7, the encoding system controller 200 generates editing control command data St7 in the same manner as the authoring editor parameter setting means 110 shown in FIG. 37, and determines whether the encoded user editing command content satisfies the conditions of the authoring edit parameters. The encoding system controller 200 then embeds data indicative of the result of this evaluation in the editing control command data St7', which it outputs as shown in FIG. 2 to the editing information convertor 111 in the editing information generator 100.

The editing information convertor 111 outputs editing information data St302 as scenario data St7 similarly to the authoring editor parameter setting means 110 (FIG. 37). In addition, the editing information convertor 111 includes the evaluation result contained in the edit control command data St7' input from the encoding system controller 200 in the editing information data St302 output from the editing information convertor 111.

Figure 39:
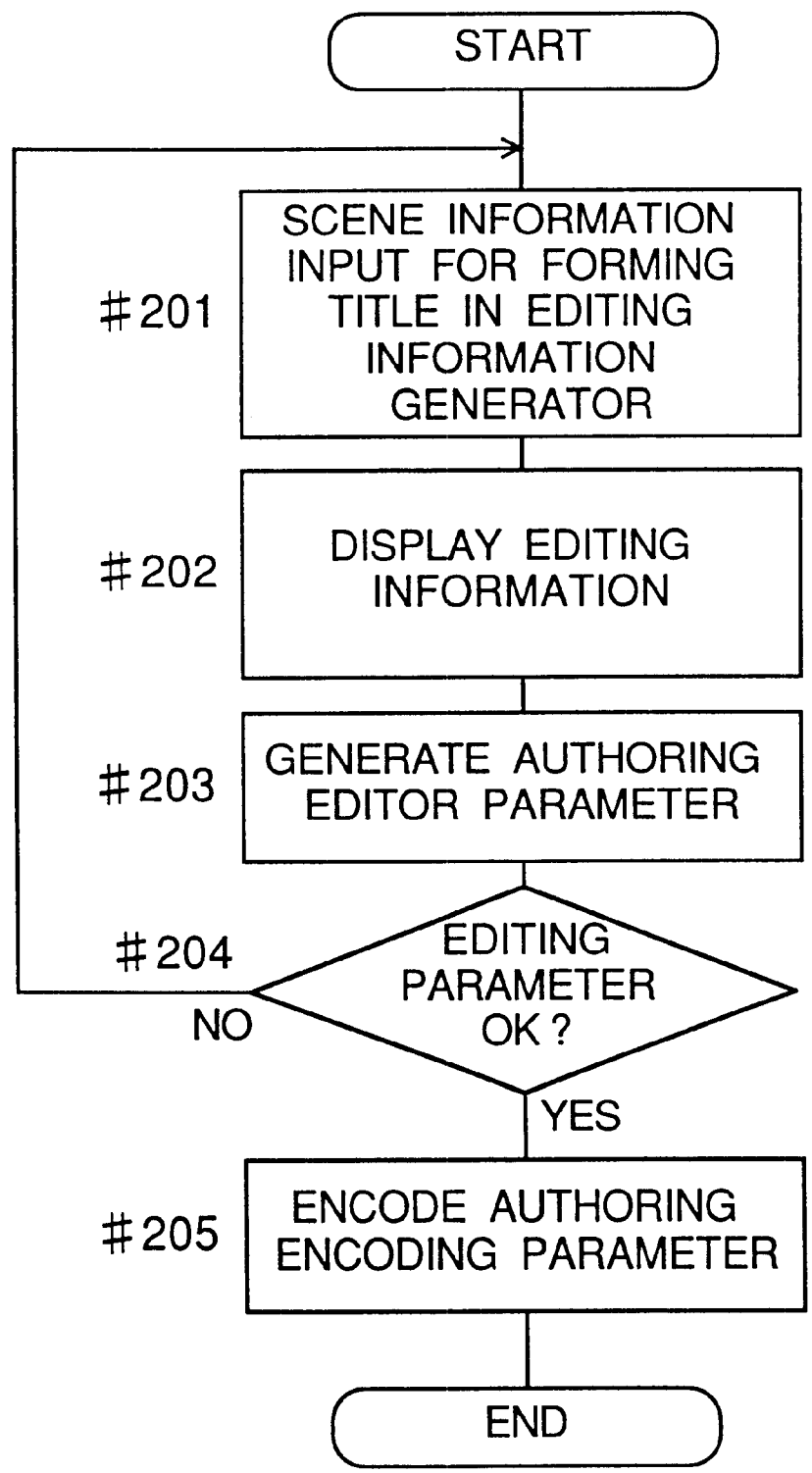
FIG. 39 is a flow chart of the operation of the editing information generator shown in FIG. 37 and FIG. 39.

Next, the operation of the editing information generator 100 shown in FIG. 37 is described first with reference to the flow chart in FIG. 39.

At step #201, the user enters desired title editing instructions using the editing information generator 100 for the source streams St1, St3, and St5 displayed on the editing information display 106.

At step #202, the editing information converter 104 generates the scenario data St7, the authoring editor parameter setting means 110 generates the editing parameter data St302, and the editing information display 106 presents the content of the editing instructions for the user.

At step #203, the authoring editor parameter setting means 110 generates editing command data St7R based on the scenario data St7.

At step #204, it is determined whether editing command data St7R satisfies the authoring editor parameter conditions. If it is determined that the conditions are met, the editing control command data St7R is output as the scenario data St7 (FIG. 2) to the encoding system controller 200.

However, if it is determined in step #204 that the authoring editor parameter conditions are not met, the editing information data St302 is output to the editing information display 106, and control loops back to step #201. The loop of step #201, #202, #203, and #204 is thus repeated until the editing control commands input by the user satisfy the authoring editor parameter conditions.

At step #205, the encoding system controller 200 generates the authoring encoding parameters based on this editing control command data. The authoring encoder EC then encodes the St1, St3, and St5 based on the authoring encoding parameters to generate an authoring title bitstream.

Figure 38:
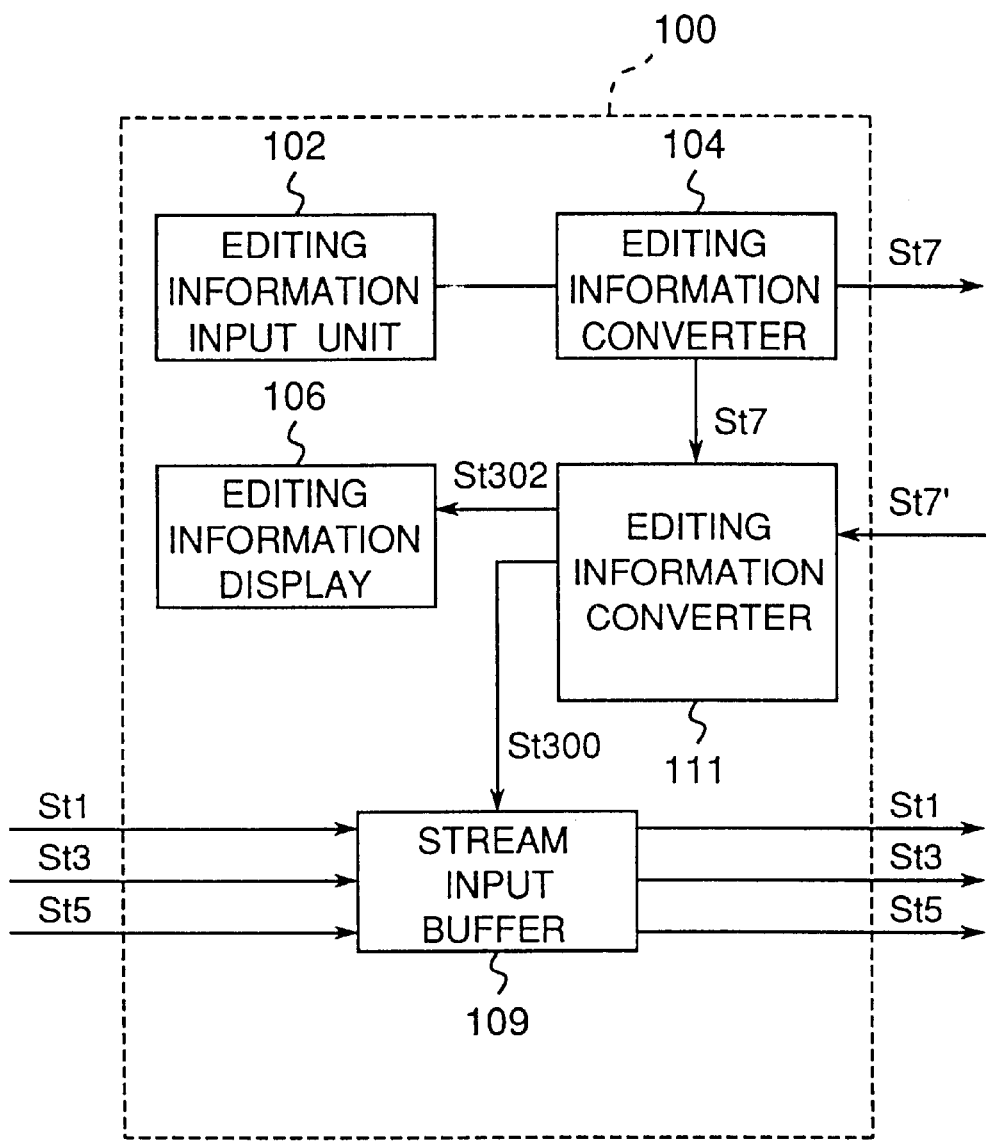
FIG. 38 is a block diagram of the structure of a second embodiment of an editing information generator according to the present invention shown in FIG. 12.

The operation of a editing information generator 100 as shown in FIG. 38 is also basically the same as the flow chart shown in FIG. 39, except that in steps #203 and #204 the encoding system controller 200 (FIG. 2), and not the authoring editor parameter setting means 110 (FIG. 37), generates edit control command data St7' based on scenario data St7, and determines whether the authoring editor parameter conditions are met.

Authoring encoder parameters exemplary of the present invention are described briefly next. To simplify this description, the authoring encoder parameters are assumed below to comprise a group of four parameters: S_TIME, which is indicative of the start and end times of material corresponding to a scene; SRS_KIND, which is indicative of the type of material; SN_KIND, which is indicative of the type of scene; and SN_PBI, which is indicative of the presentation information of the scene. The start and end times of material corresponding to a scene (S_TIME) is information about the start time and the end time of an input source for scene encoding; on a digital VCR tape, for example, this would be the encoding start and stop times of the tape source. The material type (SRS_KIND) is information indicating whether the material is telecine material or not. The scene type (SN_KIND) indicates whether the scene is a multiangle scene, or a parental lock scene. The presentation order information of a scene (SN_PBI) is information that indicates what title information is used in a scene, and the presentation sequence of that title information. If a scene is used in a plurality of titles, scene presentation information SN_PBI is generated for that scene for each title in which it is used. It will be obvious that more than these four parameters will be generated depending upon the edited content.

<1.4> Authoring Decoder DCD

Figure 3:
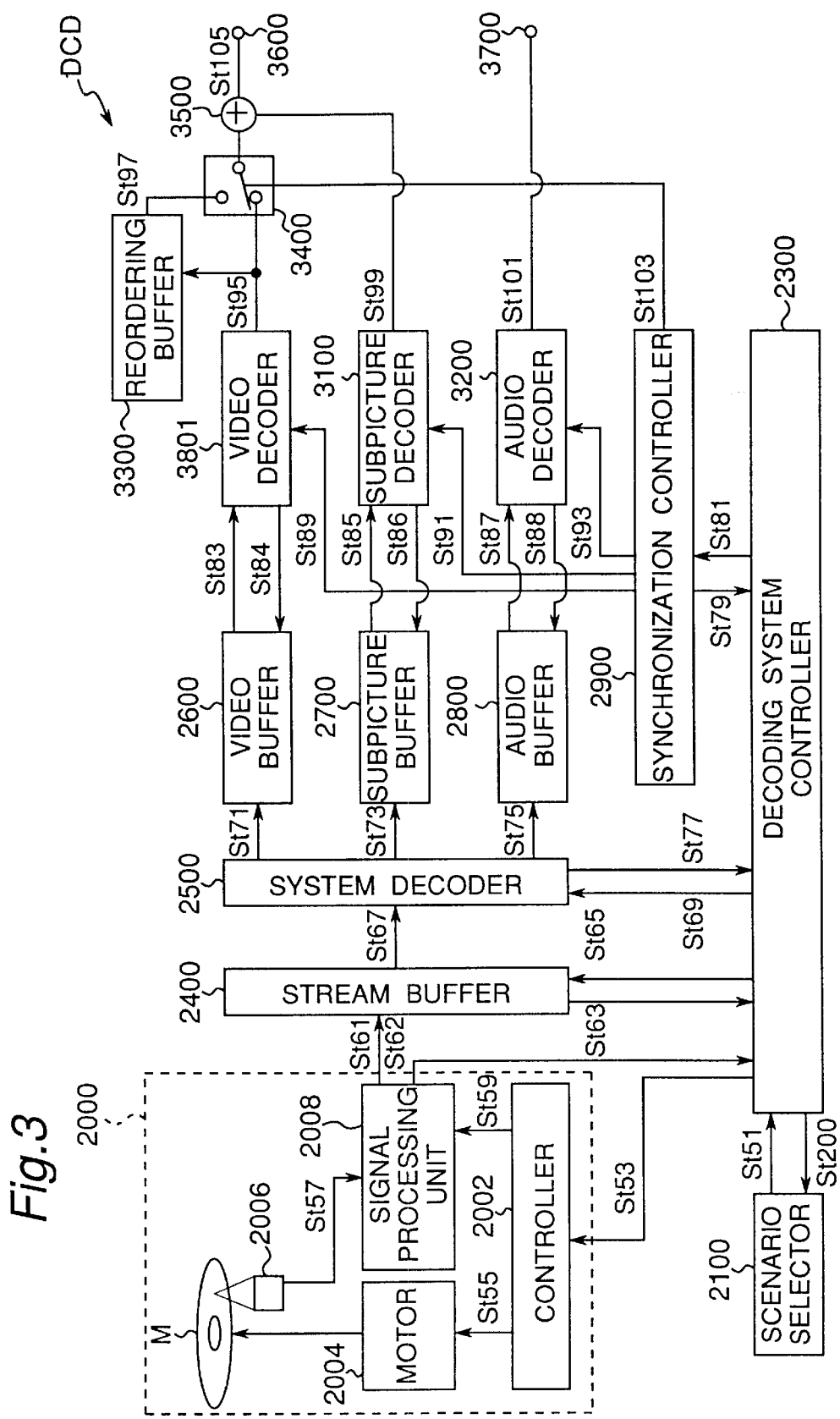
FIG. 3 is a block diagram of a structure of a DVD authoring decoder according to the present invention.

Referring next to FIG. 3, a preferred embodiment of an authoring decoder DC when a multimedia bitstream authoring system according to the present invention is applied to a DVD system as described above. An authoring encoder DCD (hereafter, a "DVD decoder") appropriate to a DVD system decodes a multimedia bitstream MBS edited by a DVD encoder ECD according to the present invention to present the content of each title according to a user-selected scenario. It should be noted that in the present embodiment of the invention a multimedia bitstream St45 encoded by a DVD encoder EC is recorded to a recording medium M.

An authoring decoder DCD comprises a multimedia bitstream reproduction unit 2000, a scenario selector 2100, a decoding system controller 2300, a stream buffer 2400, a system decoder 2500, a video buffer 2600, a subpicture buffer 2700, an audio buffer 2800, a synchronization controller 2900, a subpicture decoder 3100, an audio decoder 3200, a reordering buffer 3300, a selector 3400, a synthesizer 3500, a video data output terminal 3600, an audio data output terminal and a video decoder 3801.

Note that the selector 3400 is connected to the synchronization controller 2900, and receives therefrom input of selection command signal St103.

The multimedia bitstream reproduction unit 2000 comprises a recording medium drive unit 2004 for driving the recording medium M, a reading head unit 2006 for reading information recorded to the recording medium M and generating a binary read signal St57, a signal processing unit 2008 for generating a reproduction bitstream St61 by variously processing the read signal ST57, and a controller 2002. The controller 2002 is connected to the decoding system controller 2300 from which it receives a multimedia bitstream reproduction command signal St53, and generates reproduction control signals St55 and St59 for controlling, respectively, the recording medium drive unit (motor) 2004 and signal processing unit 2008.

So that the user-selected parts of the video, subpicture, and audio components of the multimedia title edited by the authoring encoder EC are reproduced, the decoder DCD comprises a scenario selector 2100 whereby scenario data can be output to appropriately instruct the authoring decoder DC so that the corresponding scenario is selected and reproduced.

The scenario selector 2100 generates scenario selection data St51, and based thereon the decoding system controller 2300 generates a reproduction instruction signal St53 for controlling operation of the multimedia bitstream reproduction unit 2000. The decoding system controller 2300 further extracts the user's reproduction instruction information from the scenario data St51, and generates the decoding information table required for decoding control. The decoding information table is described in detail below with reference to FIG. 32 and FIG. 33. The decoding system controller 2300 also extracts title information recorded to the recording medium M from file data area FDS information in the stream reproduction data St63, and thereby generates title information St200; the extracted title information includes video manager VMG, VTS information VTSI, PGC information C_PBI #j, and cell playback time (C_PBTM).

<1.5> Scenario Selection Data St51 Generation

Figure 40:
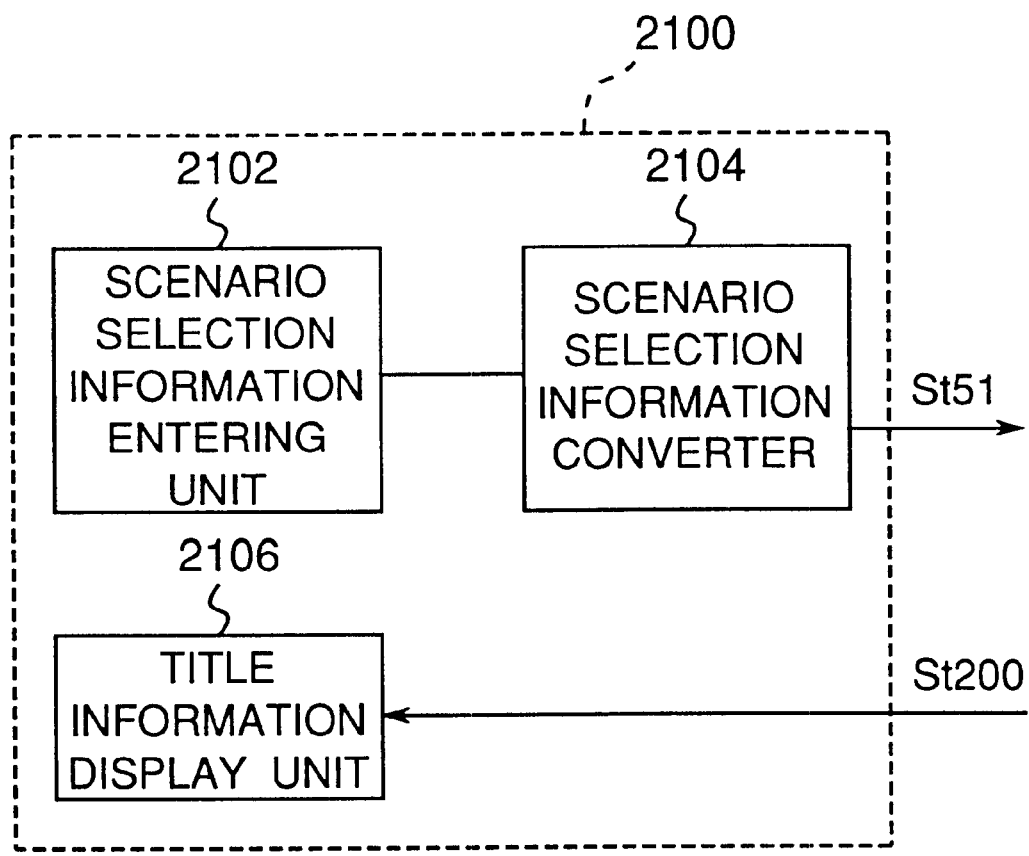
FIG. 40 is a block diagram of the structure of a scenario selector according to the present invention shown in FIG. 3.

The scenario selector 2100 is described next in detail below with reference to FIG. 40. The scenario selector 2100 comprises a scenario selection information entering means 2102, a scenario selection information converter 2104, and a title information display unit 2106.

The scenario selection information entering means 2102 accepts scenario selection data input by a user-operable means such as a remote control device, or as a computer file or other type of electronic data containing scenario selection information.

The scenario selection information converter 2104 converts information from the scenario selection information entering means 2102 to coding information St51 that can be processed by the decoding system controller 2300. The title information display unit 2106 is a title information display unit for presenting the reproduced title information St200 (FIG. 3). For example, when a plurality of titles are contained on a disk, the title information display unit 2106 presents image information needed for title selection on a remote control or other device. It should be further noted that this title information display unit 2106 is not necessarily part of scenario selector 2100, and the image information needed for title selection can be presented on a CRT or other display apparatus connected to the video data output terminal 3600.

Returning to FIG. 3, the stream buffer 2400 has a particular buffer capacity, and temporarily stores reproduction signal bitstream St61 input from the multimedia bitstream reproduction unit 2000, and extracts the stream address information and initial synchronization value information to generate stream control data St63. The stream buffer 2400 is connected to the decoding system controller 2300, and decodes the generated stream control data St63 for supply to the decoding system controller 2300.

The synchronization controller 2900 is connected to the decoding system controller 2300, receives therefrom the initial synchronization value information (SCR), sets an internal system clock (STC), and supplies a reset system clock St79 to the decoding system controller 2300.

The decoding system controller 2300 generates a stream read signal St65 at a specific interval based on system clock St79, and supplies the stream read signal St65 to the stream buffer 2400.

The data read unit in this case is a packet. The decoding system controller 2300 compares the SCR in the stream control data extracted from the stream buffer 2400 with the system clock St79 from the synchronization controller 2900; when the system clock St79 exceeds the SCR in St63, the decoding system controller 2300 generates read request signal St65. Note that this read control operation is applied in packet units, and thus controls packet transfers.

Based on read signal St65, the stream buffer 2400 outputs reproduction bitstream St61 at a specific interval.

The decoding system controller 2300 also generates a decoding stream instruction signal St69 based on scenario selection data St51, and outputs the decoding stream instruction signal St69 to the system decoder 2500. The decoding stream instruction signal St69 indicates the stream IDs of the video, subpicture, and audio streams corresponding to the selected scenario.

Based on the instructions in the decoding stream instruction signal St69, the system decoder 2500 separately outputs the video, subpicture, and audio streams input from the stream buffer 2400 to the video buffer 2600, subpicture buffer 2700, and audio buffer 2800 as video encoding stream St71, subpicture encoding stream St73, and audio encoding stream St75, respectively.

When a title contains a plurality of audio data streams for audio in different languages, for example Japanese, English, and French dialogues, and a plurality of subpicture data streams for subtitles, for example, in different languages, for example Japanese subtitles, English subtitles, and French subtitles, an ID is assigned to each stream. That is, as described with reference to FIG. 7, a stream ID is assigned to video data and MPEG audio data, and a substream ID is assigned to subpicture data, AC3audio data, linear PCM, and navigation pack NV data. While the user is not aware of the ID, the user selects the language in which to present the audio or subtitles using the scenario selector 2100. If English audio is selected, the ID corresponding to the English audio is transferred to the decoding system controller 2300 as scenario selection data St51. The decoding system controller 2300 then forwards that ID to the system decoder 2500 in St69.

Based on the instructions in the decoding stream instruction signal St69, the system decoder 2500 separately outputs the video, subpicture, and audio streams input from the stream buffer 2400 to the video buffer 2600, subpicture buffer 2700, and audio buffer 2800 as video encoding stream St71, subpicture encoding stream St73, and audio encoding stream St75, respectively. That is, when the stream ID input from the scenario selector 2100 matches the packet ID transferred from the stream buffer 2400, the system decoder 2500 transfers the packets to the corresponding buffers (video buffer 2600, subpicture buffer 2700, audio buffer 2800).

In addition, the system decoder 2500 detects the reproduction start time (PTS) and decoding start time (DTS) for the smallest control unit in each stream St67, and generates timing information signal St77. This timing information signal St77 is passed through the decoding system controller 2300, and supplied to the synchronization controller 2900 as synchronization control data St81.

Using the synchronization control data St81, the synchronization controller 2900 determines the decoding start timing for each stream so that after decoding the streams are in a particular sequence. Based on this decoding timing, the synchronization controller 2900 generates and supplies a video stream decoding start signal St89 to the video decoder 3801. The synchronization controller 2900 similarly generates and supplies a subpicture stream decoding start signal St91 and audio stream decoding start signal St93 to the subpicture decoder 3100 and audio decoder 3200, respectively.

The video decoder 3801 produces and outputs a video output request signal St84 to the video buffer 2600 based on the video stream decoding start signal St89. In response to the video output request signal St84, the video buffer 2600 outputs the video stream St83 to the video decoder 3801. The video decoder 3801 detects the reproduction time information contained in the video stream St83, and nullifies the video output request signal St84 when the received bit length of the video stream St83 is equivalent to the reproduction time. As a result, a video stream length corresponding to a particular reproduction time is decoded by the video decoder 3801, and the reproduced video signal St95 is output to the reordering buffer 3300 and selector 3400.

The video encoding stream is encoded using interframe correlation, and when viewed in frame units, the presentation sequence and encoding stream sequence do not match. Presentation in the decoding sequence is therefore not possible. As a result, decoded frames are temporarily stored to the reordering buffer 3300. St103 is controlled by the synchronization controller 2900 to obtain the presentation sequence, and switches the output to the synthesizer 3500 between output St95 of video decoder 3801 and the output from the reordering buffer St97.

The subpicture decoder 3100 similarly generates and supplies subpicture output request signal St86 to the subpicture buffer 2700 based on the subpicture decoding start signal St91. The subpicture buffer 2700 outputs the subpicture stream St85 to the subpicture decoder 3100 in response to the video output request signal St84. The subpicture decoder 3100 decodes a length of the subpicture stream St85 corresponding to a specific reproduction time based on the reproduction time information contained in the subpicture stream St85, and thus reproduces and outputs a subpicture signal St99 to the synthesizer 3500.

The synthesizer 3500 superimposes the output of selector 3400 and subpicture signal St99 to generate and output video signal St105 to the video output terminal 3600.

The audio decoder 3200 generates and outputs audio output request signal St88 to the audio buffer 2800 based on the audio decoding start signal St93. The audio buffer 2800 outputs audio stream St87 to the audio decoder 3200 in response to the audio output request signal St88. The audio decoder 3200 decodes a length of the audio stream St87 corresponding to a specific reproduction time based on the reproduction time information contained in the audio stream St87, and outputs to the audio output terminal 3700.

It is thus possible to reproduce a user-selected multimedia bitstream MBS in real-time in response to a users scenario selection. That is, each time a user selects a different scenario, the title content desired by the user can be reproduced by means of the authoring decoder DCD reproducing a multimedia bitstream MBS corresponding to the selected scenario.

It should be noted that the decoding system controller 2300 can supply title information signal St200 to the scenario selector 2100 by such means as the above-noted infrared communications device. The scenario selector 2100 can extract and present on an internal display, the title information recorded to an optical disk M from the file data area FDS information in the stream reproduction data St63 contained in the title information signal St200, and thereby enable interactive scenario selection by the user.

It should be further noted that the stream buffer 2400, video buffer 2600, subpicture buffer 2700, audio buffer 2800, and reordering buffer 3300 are functionally different and are therefore represented above as separate buffers. However, a single memory buffer can be made functionally equivalent to these separate buffers by using on a time-share basis a memory buffer that operates at several times the read/write rate required by these separate buffers.

As described above, an authoring system according to the present invention can generate a multimedia bitstream conforming to a plurality of selectable scenarios by real-time or batch encoding multimedia source data such that a plurality of branchable substreams of the smallest content editing units of the basic title content are arranged in a specific time-base relationship.

In addition, a multimedia bitstream encoded in this manner can be reproduced according to a desired scenario selected from among the plural scenarios. During reproduction, it is also possible to select (switch to) a scenario different from the selected scenario, and (dynamically) reproduce a multimedia bitstream corresponding to the newly selected scenario. It is also possible to dynamically select and reproduce a particular scene from among a plurality of scenes during reproduction of title content following a selected scenario.

As thus described, an authoring system according to the present invention can encode and not only reproduce but repeatedly reproduce a multimedia bitstream MBS in real-time. An authoring system according to the present invention described above is described below with application to a DVD system, and particularly to seamless connection editing.

<2.1> Parental Lock Control and Multiangle Control

Parental lock control and multiangle control in the present invention are described below. The presentation time of video data from which images have been cut according to the viewer level setting for parental lock control is shorter than that of the other video data. In addition, the length of video data that is alternatively reproduced according to parental lock control varies.

In multiangle control, the reproduction time of each video data option within a particular angle view is the same because the audio and video parts of each angle view are reproduced in parallel to the same time base. It is important to note here that "reproduction time" is used in a broad sense, and refers to the time during which data is read from disc, converted to audio and video signals, and audio and video are output. It is not to be narrowly interpreted and understood to mean only the time for reading from disc, or only the time required to finish decoding the read data. Furthermore, even though the reproduction time within a particular angle view is the same, the video content differs. As a result, the data quantity compressed by the MPEG-2 method is variable, and the data quantity in each converted angle view will, of course, also vary.

One technology that is a background to parental lock control and multiangle control is alternative reproduction of common video data. A problem in implementing alternative reproduction is sustaining video data reproduction without interruption between the selected video data segments. However, when video data is arranged in a continuous recording area on an optical disc, only one video data segment can be placed adjacent to the preceding and following video data segments. A data seek operation is therefore required to reproduce non-adjacent video data, and continuous video reproduction is interrupted.

The delay imposed by a seek operation of a certain duration can be absorbed by causing the disc reproduction apparatus to buffer reproduction data during reproduction. However, when the alternative reproduction period is long, the buffer capacity required by the disc reproduction apparatus increases, and may be exceeded. A buffer overflow occurs when this happens. To reduce the delay time of any seek operation, a technology known as "interleaved recording" is used.

In interleaved recording the video data is segmented into interleave units of a particular size, and alternative reproduction periods are formed by arranging these interleave units in an alternating pattern in the continuous recording area of the optical disc. The seek distance of any seek operation can thus be suppressed to the size of the interleave unit, and reproduction can be sustained without causing a buffer overflow even when the alternative reproduction period continues for an extended period of time. A reproduction method that can be used for parental lock control and multiangle control without a buffer overflow occurring is described below.

<2.2> Segmenting an Alternative Reproduction Period for Parental Lock Control

When forming an alternative reproduction period for parental lock control, it is necessary to form the segments both so that a buffer overflow as described above does not occur, and so that a buffer underflow, which occurs when the video data that should be reproduced is not in the buffer, does not occur in the disc reproduction apparatus. The performance of the disc reproduction apparatus, including the buffer size and the seek speed, must be considered to form an alternative reproduction period so that a buffer overflow does not occur.

That is, if JMP is the maximum jump time of the disc reproduction apparatus that will not result in video interruption, the minimum Mmin number of segments M of the video data divided into interleave units to form an alternative reproduction period is defined by the following equation $$Mmin \geq VOBMaxTime/JMT \qquad (1)$$

where JMT is derived from the buffer size and seek performance, and VOBMaxTime is the longest video data segment associated with the alternative reproduction period. With equation (1), the number of interleave units into which video data forming an alternative reproduction period is segmented must be a value greater than or equal to M, in which case a problem with the buffer overflowing occurs during interleave unit reproduction, and if there is a jump, a buffer underflow occurs because there is not sufficient data stored in the buffer.

In addition, to prevent a buffer underflow from occurring, the jump must be completed by the time decoding the video data in one interleave unit present in the buffer before the jump is completed, and the video data of the interleave unit decoded next after the jump must be completely reproduced in the buffer.

That is, if JT is the time needed for a jump (for example, 0.4 sec), BitRate is the data input transfer rate to the track buffer of the reproduction apparatus (for example, a constant 10 Mbps), and ILUM is the data size of an interleave unit, the reproduction time (ILUMT) assured by video data in the buffer must be greater than longest time needed to prepare for decoding the next video data when a jump occurs, and must satisfy the following equation.

$$ILUMT > JT + (ILUM/BitRate) \qquad (2)$$

The number of segments M of the alternative reproduction period can thus be obtained by the following equation.

$$M = VOBTime/ILUMT \qquad (3)$$

where VOBTime is the reproduction time of each video data block in the alternative reproduction period.

If the minimum value of video data in the alternative reproduction period is VOBminTime, the maximum Mmax number of interleave unit segments M is expressed by the following equation.

$$Mmax \leq VOBminTime/(JT+(ILUM/BitRate)) \quad (4)$$

That is, if the maximum number of interleave unit segments M is less than maximum segments Mmax, a buffer underflow problem will occur in the disc reproduction apparatus.

Thus, as described above, the video data must be segmented into M values (Mmin, Mmax) satisfying equations (1), and (4) when,forming an alternative reproduction period.

<2.3> An Example of Limit Values of an Alternative Reproduction Period for Parental Lock Control A specific example of control values used in an alternative reproduction period for parental lock control are shown below.

Using the values:

VOB maximum bit rate: 8 Mbps

VOBminTime: 4.0 sec

VOBTime: 120 sec min

ILUMT>0.4+8*2/10=2.0 (sec), based on equation 2,

JMT=250 MBIT/8=31.25 (sec), based on equation 1,

Mmax≦VOBminTime/ILUMT=4.0/2.0=1, from equation 4,

M=VOBTime/JMT=120/31.25=3.84, from equation 3. In this case, the values obtained from equations 3 and 4 are mutually incompatible, and an error results.

<2.4> Dividing an Alternative Reproduction Period for Angles

When forming alternative reproduction periods for multi-angle control, the number of segments in the period must be determined with consideration given to the buffer overflow problem described above, while at the same time assuring that the video data is structured with an even distribution of video data. This is because, unlike with parental lock control, it must be possible to dynamically change the video in response to user instructions during reproduction. If the length of the video data varies, it is not possible to synchronize with the video after the angle is changed, and audio presentation may be interrupted.

For the video data structure to be the same before and after an angle change, the GOP structures constituting the image data in the video data must be equal. Note that "equal GOP structures" as used here means that the number of GOP and the number of pictures in each GOP contained in the corresponding interleave units are the same. That is, encoding the elementary streams containing the video information from which the video data constituting an angle view is generated must be controlled to satisfy these limitations during elementary stream encoding.

A typical example of when this problem occurs is when the source material is film (24 frames/sec) that has been telecine converted. Telecine conversion is a process whereby a film source, which is recorded at 24 frames per second, is converted to a conventional television signal requiring field interpolation to achieve the required 30 frames per second. When telecine converted material is then converted to MPEG data, the fields inserted by interpolation are redundant. Therefore, to improve the compression rate, reverse telecine conversion is applied to restore the original 24 fps rate before compression as MPEG data.

However, while this reverse telecine conversion reduces the overall number of frames from 30 to 24, the video data may not be uniformly converted at this rate, and may be locally converted at a variable rate between 24 to 30 frames per second. Applying this reverse telecine conversion process to video data that is part of an angle view may result in a picture count that is not constant, and the GOP structure of each VOB may then differ.

The picture count, which is one condition of equal GOP structures, is described in detail below.

The picture count as used herein refers more precisely to the number of reproduced pictures contained in a GOP. Furthermore, the encoded frames of a GOP and the number of reproduced pictures do not necessarily match. When a source signal is encoded from 30 fps to 24 fps during reverse television conversion, the number of pictures clearly decreases. When this happens, information indicating which field(s) were removed, and when the fields should be reproduced, is written to the encoded stream as the RFF flag and TFF flag. (RFF: Repeat First Field; TFF: Top Field First). As a result, if the picture count for which the flag (RFF) is on differs, the reproduction time will differ even in GOPs having the same number of encoded frames.

In addition, the number of audio data channels and the number of subpicture data channels contained in the video data must also be equal. This is because if the number of channels differs, a channel selected before the video data changed may not exist after the video data is changed. That is, it is necessary during elementary stream encoding to encode only those parts of the audio data or subpicture data providing the same number of channels.

The data structure of a DVD system related to the present invention is described further below with reference to FIG. 5, FIG. 6, FIG. 7, and FIG. 8.

<2.5> Multiscene Control

If the requirements of parental lock control playback and multi-angle control playback described above are satisfied by individually recording a separate title with the content required to present every possible scenario, the same number of titles as possible scenarios must be prepared and recorded to the recording medium with each title containing substantially the same scene data with only slight differences therebetween. This means that the same data will be repeatedly recorded to a large part of the recording medium, significantly impairing the utilization efficiency of the available storage capacity of the recording medium. Furthermore, even if the storage capacity of the recording medium is very large, as it is on DVD media, it will be impossible to record enough titles for every possible request. While this problem can be considered solvable by increasing the capacity of the recording medium, this is not particularly desirable when effective use of available system resources is considered.

Using multiscene control, which is described in outline below, in a DVD system, titles that can be reproduced according to many different scenarios can be assembled using a minimal amount of data, thereby enabling effective use of recording media and other system resources.

More specifically, titles that can be reproduced according to many different scenarios are assembled from basic scene periods comprising data common to a plurality of titles, and multiscene periods comprising the groups of scenes that vary according to the selected scenario. During reproduction, the user can freely and at any time select a specific scene in any of the multiscene periods. It should be noted that multiscene control in the cases of parental lock control playback and multi-angle control playback is described below with reference to FIG. 9.

<3.1> Data Structure in a DVD System

Figure 5:
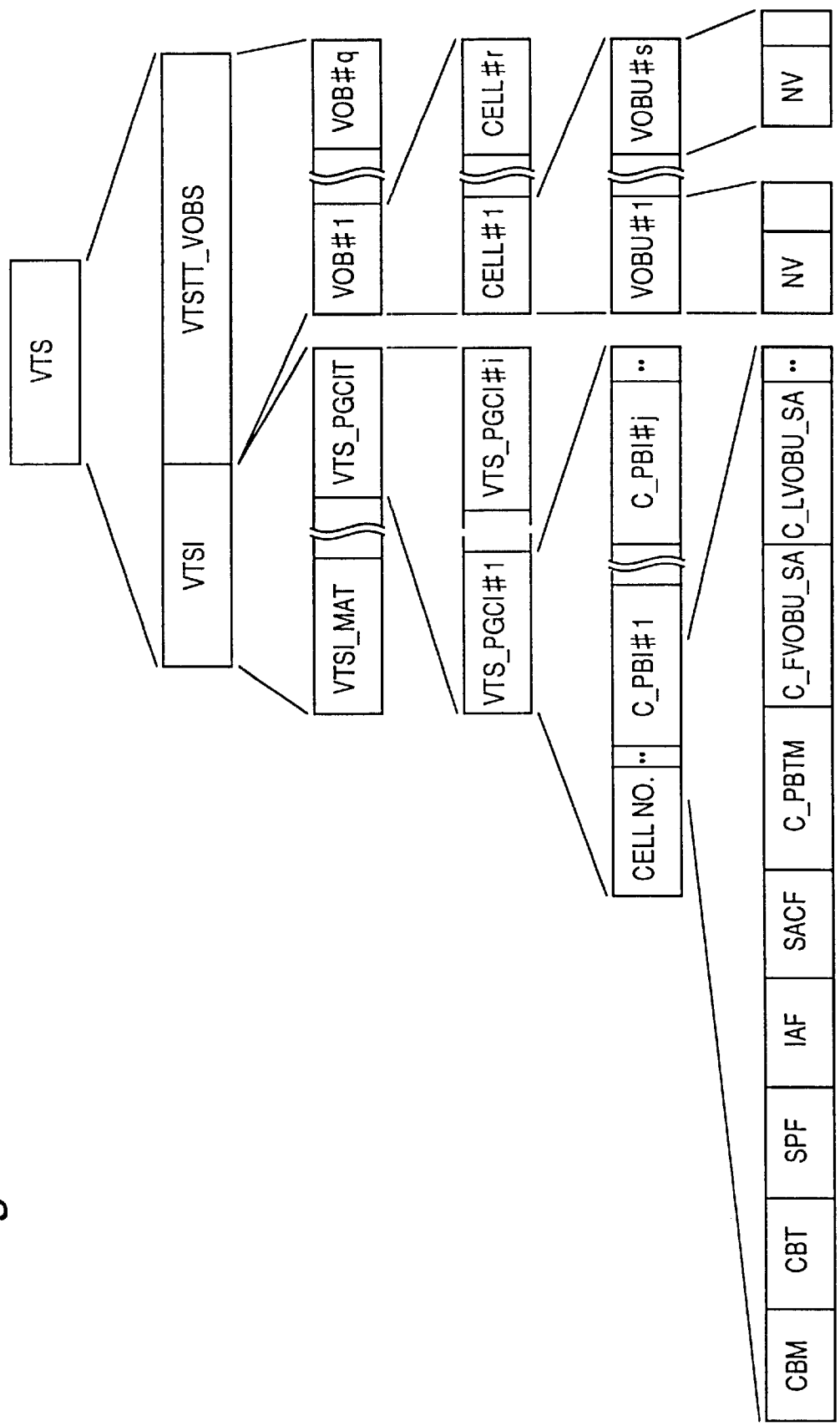
FIG. 5 is a typical diagram of a VTS data structure, which is part of a bitstream according to the present invention.

The internal structure of a video title set VTS as shown in FIG. 1 is shown in FIG. 5. A video title set VTS comprises VTS information (VTSI) representing the management information for the entire disc, and VOBS for VTS titles (VTSTT_VOBS), which is the system stream of the multimedia bitstream. The VTS information is described first below, and the VOBS for a VTS title is then described.

VTS information comprises, primarily, a VTSI management table (VTSI_MAT), and VTSPGC information table (VTS_PGCIT).

The VTSI management table records the internal format of the video title set VTS, the number of selectable audio streams contained in the video title set VTS, the number of subpictures, and the location where the video title set VTS is stored.

The VTSPGC information management table is a table recording i (where i is a natural number) PGC data VTS_PGCI#1 to VTS_PGCI#i indicative of the program chain (PGC) controlling the reproduction sequence. Each PGC information entry VTS_PGCI#i is information indicative of a program chain, and comprises j (where j is a natural number) cell reproduction data C_PBI#1 to C_PBI#j. Each cell reproduction data C_PBI#j contains control information related to the reproduction and reproduction sequence of a cell.

Conceptually, a program chain PGC describes the story of a title, which is formed by recording the reproduction sequence of the cells (described below). When the VTS information is information related to a menu, for example, the VTS information is stored to a buffer in the reproduction apparatus when reproduction starts, and is referenced by the reproduction apparatus when the "menu" button on a remote control device is pressed during playback, thus causing the top menu selection #1, for example, to be presented. If a hierarchical menu structure is used, then program chain information VTS_PGCI#1, for example, may be the main menu displayed when the "menu" button is pressed, #2 to #9 may be submenus corresponding to numbers on the remote control keypad, and #10 and up may be submenus another layer down on the hierarchy. In another possible configuration, #1 may be a the top menu selection displayed when the "menu" button is pressed, and #2 and up may be voice instructions reproduced when the corresponding button is pressed on the numeric keypad.

The menus are also expressed by a plurality of program chains specified in this table, and can be configured in any desired manner, whether they are hierarchical menus, menus containing voice instructions, or menu design.

In addition, if a movie is represented by the program chain, it is stored in the buffer of the reproduction apparatus when reproduction starts, and the reproduction apparatus references the reproduction sequence written to the PGC to reproduce the system stream.

A "cell" as used herein is all or part of the system stream, and used as the access point for reproduction. For example, if a movie is recorded, a cell can be used as the chapters into which a title is segmented.

It should be noted that each of the entered PGC information C_PBI#j contains cell reproduction processing information and a cell information table. Reproduction processing information comprises the reproduction time, number of times a cell is repeated, and other processing information required for cell reproduction. More specifically, the reproduction processing information includes the block mode (CBM), cell block type (CBT), seamless playback flag (SPF), interleaved allocation flag (IAF), STC discontinuity flag (STCDF), cell presentation time (C_PBTM), seamless angle change flag (SACF), the first cell VOBU start address (C_FVOBU_SA), and the last cell VOBU start address (C_LVOBU_SA).

Figure 10:
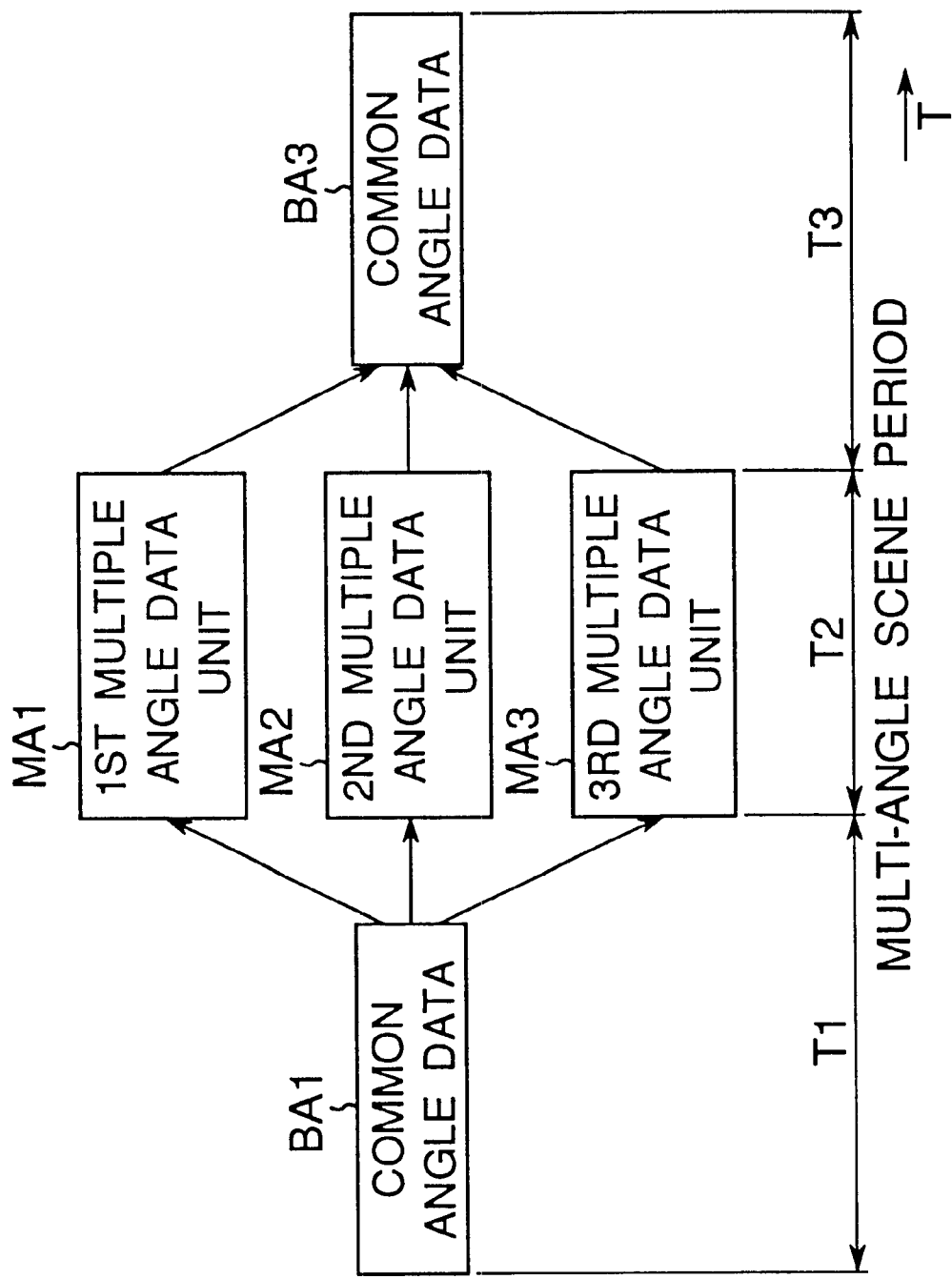
FIG. 10 is a typical diagram of system stream connection during multi-viewpoint control.
Figure 11:
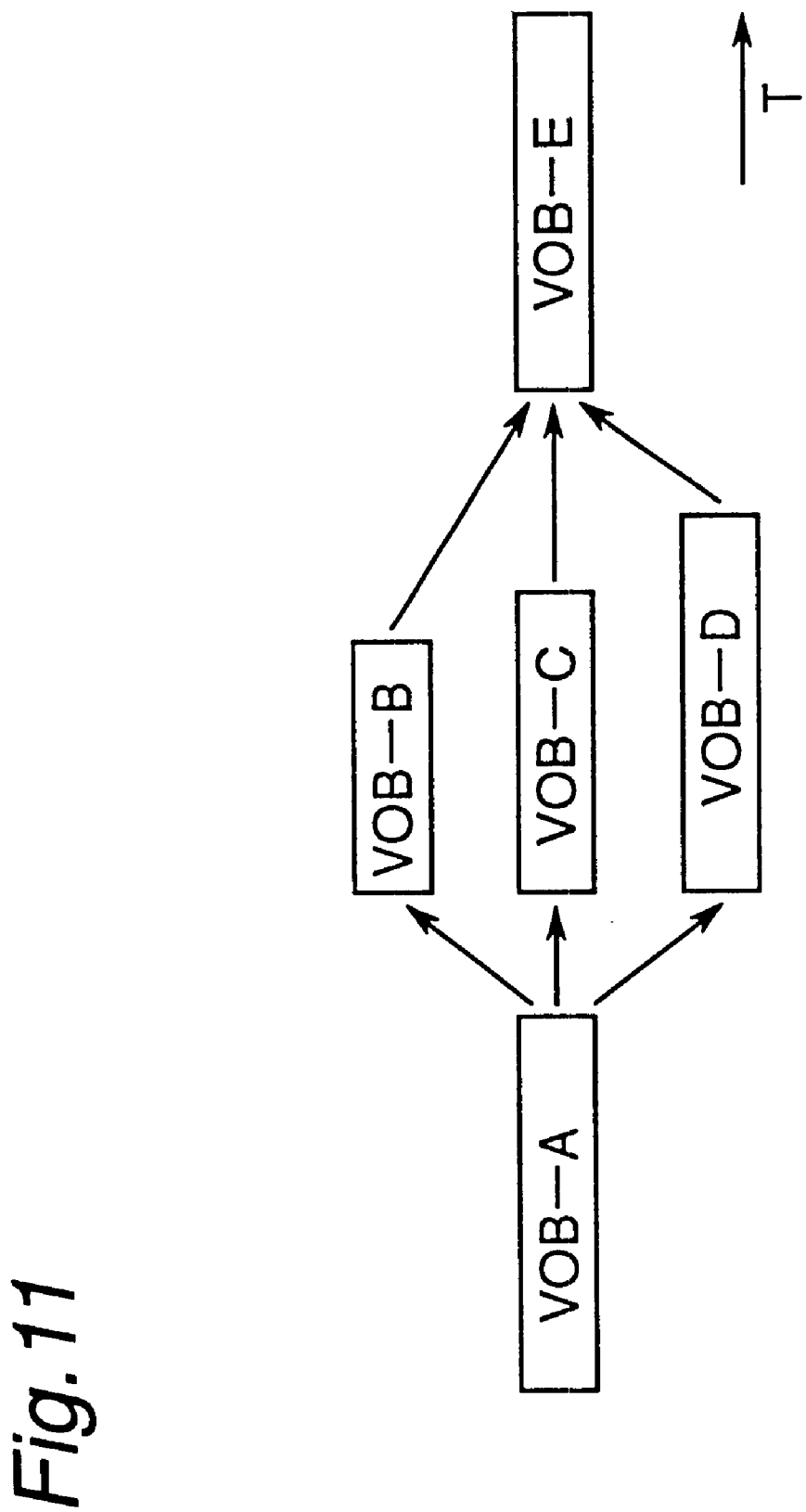
FIG. 11 is a typical diagram of an exemplary VOB during multiscene control.

"Seamless reproduction" as used herein is the ability in a DVD system to reproduce a multimedia source containing, for example, video, audio, and ancillary video information without interruption of the data or information. It is described in detail with reference to FIG. 10 and. FIG. 11.

The block mode CBM is indicative of a plurality of cells constitute one functional block; the cell reproduction information of each cell in a functional block is consecutively arranged in the PGC information. The CBM of the cell reproduction information placed at the beginning is a value indicating the "first cell in the block"; the CBM of the cell reproduction information placed at the end is a value indicating the "last cell in the block"; and the CBM of the reproduction information arranged between the first and last cells is a value indicating a "cell inside the block."

The cell block type CBT is indicative of the type of block indicated by the block mode CBM. For example, when a multi-angle control function is enabled, cell information for reproducing each angle is defined as the functional block described above, and the block type CBT in the cell reproduction information of each cell in that block is then set to a value indicating an "angle."

The seamless playback flag (SPF) indicates whether the corresponding cell is to be linked and played back seamlessly with the cell or cell block reproduced immediately therebefore. To seamlessly reproduce a given cell with the preceding cell or cell block, the seamless playback flag SPF is set to 1 in the cell playback information for that cell; otherwise SPF is set to 0.

The interleaved allocation flag IAF stores a value identifying whether the cell is in an interleaved block. If the cell is part of an interleaved block, the interleaved allocation flag IAF is set to 1; otherwise it is set to 0.

The STC discontinuity flag STCDCF identifies whether the system time clock STC used for synchronization must be reset when the cell is played back; when resetting the system time clock STC is necessary, the flag is set to 1; otherwise it is set to 0.

The seamless angle change flag SACF stores a value indicating whether a cell in a multi-angle period should be connected seamlessly at an angle change. If the angle change is seamless, the seamless angle change flag SACF is set to 1; otherwise it is set to 0.

The cell presentation time (C_PBTM) expresses the cell presentation time with video frame precision.

The last cell VOBU start address C_LVOBU_SA is the VOBU start address of the last cell in the block. The value of this address is expressed as the distance from the logic sector of the first cell in the VTS title VOBS (VTSTT_VOBS) as measured by the number of sectors. The first cell VOBU start address C_FVOBU_SA is the VOBU start address of the first cell in a block, and is expressed as the distance from the logic sector of the first cell in the VTS title VOBS (VTSTT_VOBS) as measured by the number of sectors.

The VTS title VOBS, that is, one multimedia system stream data VTSTT_VOBS, is described next. The system stream data VTSTT_VOBS comprises i (where i is a natural number) system streams SS, each of which is referred to as a "video object" VOB. Each video object VOB #1 to VOB #i comprises at least one video data block interleaved with up to a maximum eight audio data blocks and up to a maximum 32 subpicture data blocks.

Each video object VOB comprises q (where q is a natural number) cells C #1 to C #q. Each cell C comprises r (where r is a natural number) video object units VOBU #1 to VOBU #r.

Each video object unit VOBU comprises plural GOP, and an equivalent time-length of audio and subpictures. Note that the GOP corresponds to the video encoding refresh cycle. Each video object unit VOBU also starts with an NV pack, that is, the control data for that VOBU. The structure of the NV packs is described with reference to FIG. 7.

Figure 6:
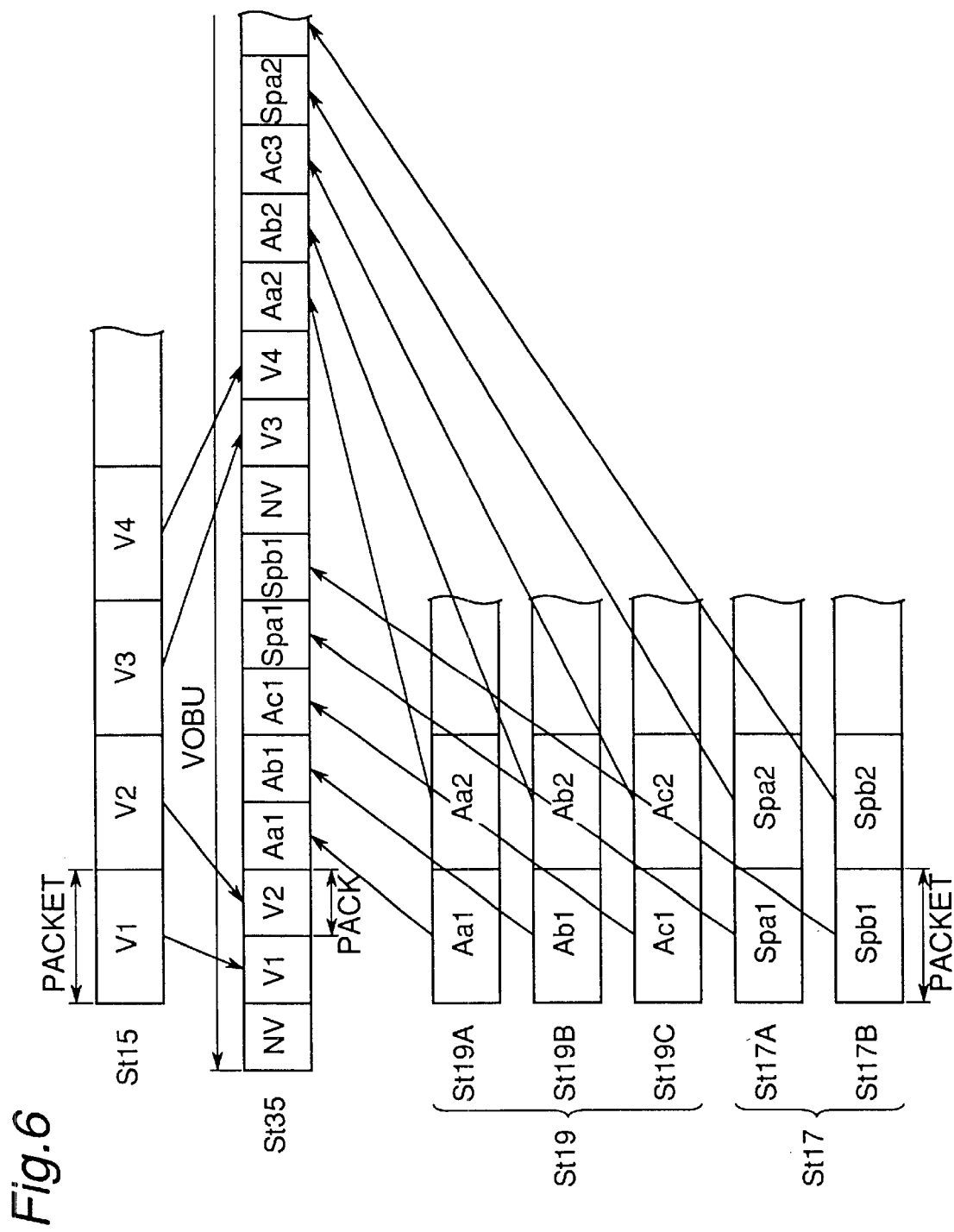
FIG. 6 is a typical diagram of a detailed data structure of a system stream.
Figure 12:
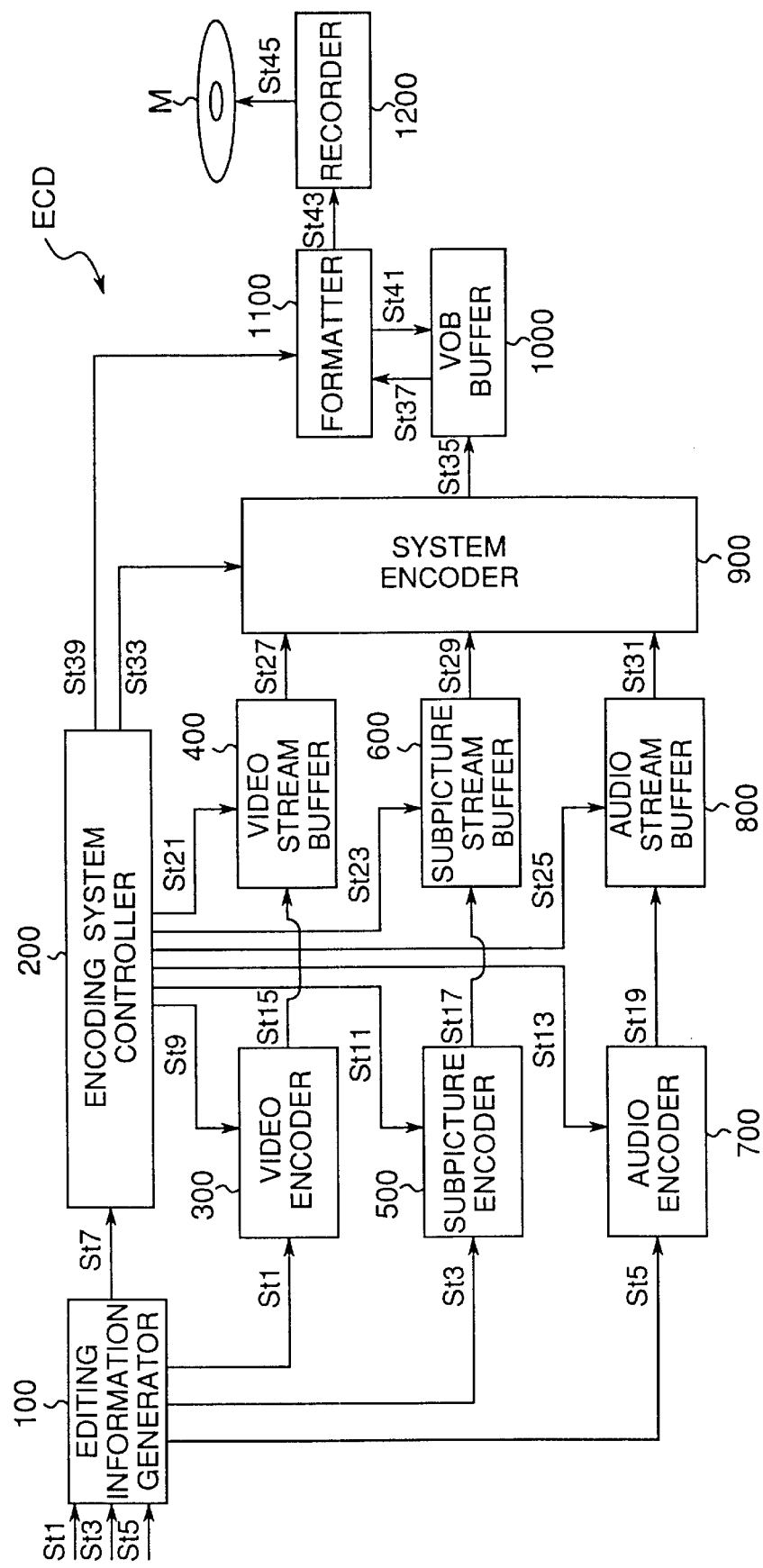
FIG. 12 is a block diagram of a DVD authoring encoder according to the present invention.

The system stream St35 is encoded by the encoder EC described with reference to FIG. 12, that is, the internal structure of the video zone VZ, is described with reference to FIG. 6. Note that the video encoding stream St15 shown in FIG. 12 is the compressed one-dimensional video data stream encoded by the video encoder 300. The audio encoding stream St19 is likewise the compressed one-dimensional audio data stream multiplexing the right and left stereo audio channels encoded by the audio encoder 700. Note that the audio signal shall not be limited to a stereo signal, and can also be a multichannel surround-sound signal. Note, further, that the audio encoding stream St19 is not input as a single stream, but as three audio source streams St19A, St19B, and St19C. Thus, a total six compressed data streams are interleaved to a single system stream St35.

The subpicture encoding stream St17, that is, the ancillary video data stream, is also input as two source streams St17A and St17B. Thus, a total six compressed data streams are interleaved to a single system stream St35.

The system stream St35 is a one-dimensional array of packs with a byte size corresponding to the logic sectors LS #n having a 2048-byte capacity. A stream control pack is placed at the beginning of the system stream St35, that is, at the beginning of the VOBU. This stream control pack is called the "navigation pack NV", and records the data format in the system stream and other control information.

The video encoding stream St15, the audio encoding streams St19A, St19B, and St19C, and the subpicture encoding stream St17, and St17A and St17B, are packetized in byte units corresponding to the system stream packs. These packets are shown in FIG. 6 as packets V1, V2, V3, V4 . . . and Aa1, Aa2, . . . , Ab1, Ab2, . . . , Act, Act, . . . , Spa1, Spa2, . . . , and Spb1, Spb2, . . . . As shown in FIG. 6, these packets are interleaved in the appropriate sequence as system stream St35, thus forming a packet stream, with consideration given to the decoder buffer size and the time required by the decoder to expand the video and audio data packets. In the example shown in FIG. 6, the packet stream is interleaved in the sequence V1, V2, Aa1, Ab1, Act, Spat, Spb1.

As a result of significantly increased recording/playback capacity, high speed recording/playback, and performance improvements in the signal processing LSI in a DVD system, plural audio data streams and plural subpicture data streams (graphics data) can be recorded interleaved with a single video data stream as an MPEG system stream, thereby enabling the user to select the specific audio data and subpicture data to be reproduced during playback.

The video data is encoded according to the MPEG specification with the GOP being the unit of compression. In general, each GOP contains 15 frames in the case of an NTSC signal, but the specific number of frames compressed to one GOP is variable. The stream management pack, which describes the management data containing, for example, the relationship between interleaved data, is also interleaved at the GOP unit interval. Because the GOP unit is based on the video data, changing the number of video frames per GOP unit changes the interval of the stream management packs. This interval is expressed in terms of the presentation time on the digital video disk within a range from 0.4 sec. to 1.0 sec. referenced to the GOP unit. If the presentation time of contiguous plural GOP units is less than 1 sec., the management data packs for the video data of the plural GOP units is interleaved to a single stream.

These management data packs are referred to as navigation packs NV in the DVD system. The data from one NV pack to the packet immediately preceding the next NV pack forms one video object unit VOBU. In general, one contiguous playback unit that can be defined as one scene is called a video object VOB, and each video object VOB contains plural video object units VOBU. Data sets of plural video objects VOB form a VOB set (VOBS). Note that these data units were first used in DVD.

When plurality of these data streams are interleaved, the navigation packs NV defining the relationship between the interleaved packs must also be interleaved at a defined unit known as the pack number unit. Each GOP is normally a unit containing approximately 0.5 sec. of video data, which is equivalent to the presentation time required for 12 to 15 frames, and one stream management packet is generally interleaved with the number of data packets required for this presentation time.

Figure 7:
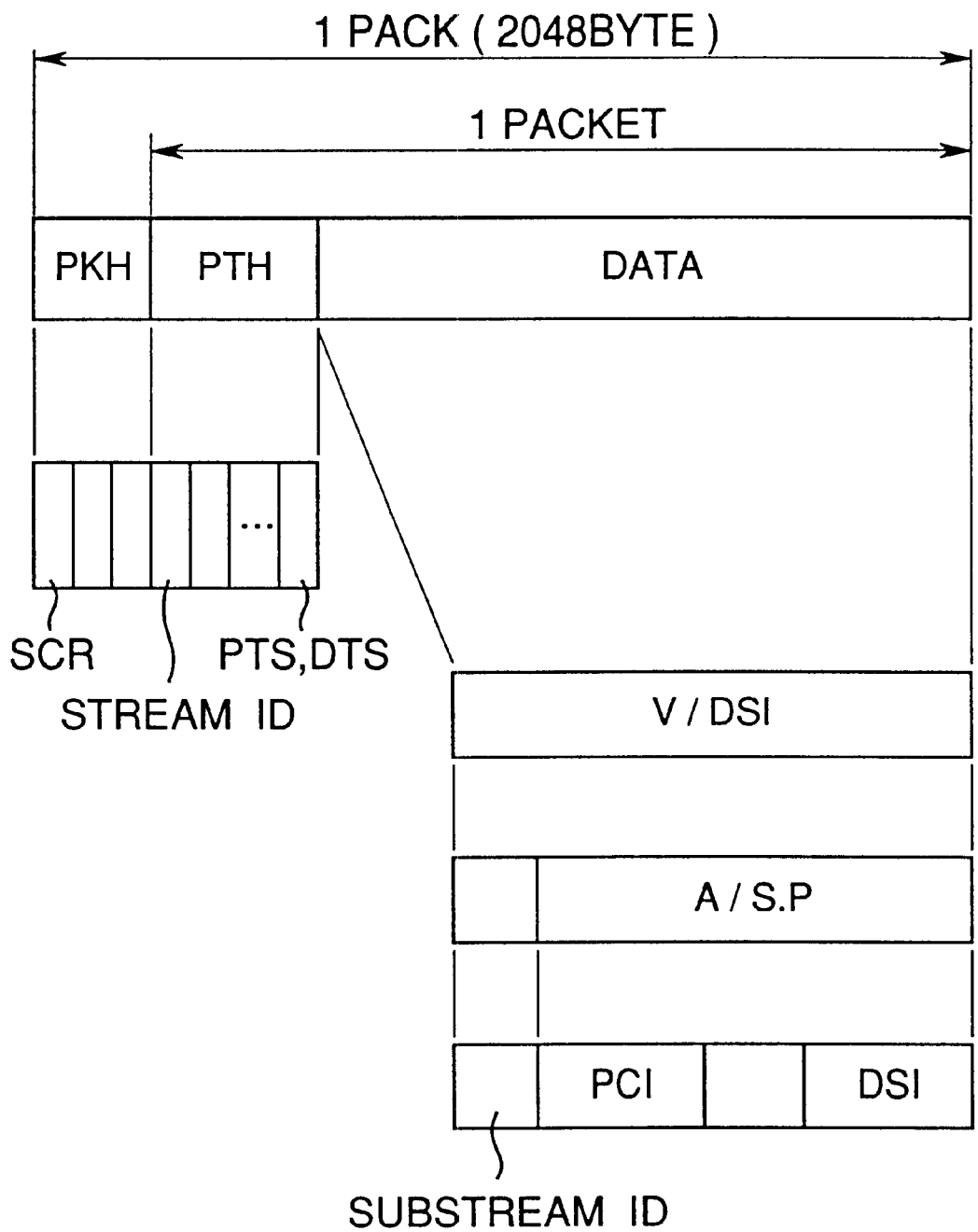
FIG. 7 is a typical diagram of a packet data structure of a system stream.

The stream management information contained in the interleaved video, audio, and subpicture data packets constituting the system stream is described below with reference to FIG. 7. As shown in FIG. 7, the data contained in the system stream is recorded in a format packed or packetized according to the MPEG-2 standard. The packet structure is essentially the same for video, audio, and subpicture data. One pack in the DVD system has a 2048 byte capacity as described above, and contains a pack header PKH and one packet PES; each packet PES contains a packet header PTH and data block.

The pack header PKH records the time at which that pack is to be sent from stream buffer 2400 to system decoder 2500 (see FIG. 3), that is, the system clock reference SCR defining the reference time for synchronized audio-visual data playback. The MPEG standard assumes that the system clock reference SCR is the reference clock for the entire decoder operation. With such disk media as the digital video disk, however, time management specific to individual disk players can be used, and a reference clock for the decoder system is therefore separately provided.

The packet header PTH similarly contains a presentation time stamp PTS and a decoding time stamp DTS, both of which are placed in the packet before the access unit (the decoding unit). The presentation time stamp PTS defines the time at which the video data or audio data contained in the packet should be output as the playback output after being decoded, and the decoding time stamp DTS defines the time at which the video stream should be decoded. Note that the presentation time stamp PTS effectively defines the display start timing of the access unit, and the decoding time stamp DTS effectively defines the decoding start timing of the access unit. If the PTS and DTS are the same time, the DTS is omitted.

The packet header PTH also contains an 8-bit field called the stream ID identifying the packet type, that is, whether the packet is a video packet containing a video data stream, a private packet, or an MPEG audio packet.

Private packets under the MPEG-2 standard are data packets of which the content can be freely defined. Private packet 1 in this embodiment of the invention is used to carry audio data other than the MPEG audio data, and subpicture data; private packet 2 carries the PCI packet and DSI packet.

Private packets 1 and 2 each comprise a packet header, private data area, and data area. The private data area contains an 8-bit sub-stream ID indicating whether the recorded data is audio data or subpicture data. The audio data defined by private packet 2 may be defined as any of eight types #0 to #7 of linear PCM or AC-3 encoded data. Subpicture data may be defined as one of up to 32 types #0 to #31. The data area is the field to which data compressed according to the MPEG-2 specification is written if the stored data is video data; linear PCM, AC-3, or MPEG encoded data is written if audio data is stored; or graphics data compressed by run length coding is written if subpicture data is stored.

MPEG-2-compressed video data may be compressed by constant bit rate (CBR) or variable bit rate (VBR) coding. With constant bit rate coding, the video stream is input continuously to the video buffer at a constant rate. This contrasts with variable bit rate coding in which the video stream is input intermittently to the video buffer, thereby making it possible to suppress the generation of unnecessary code. Both constant bit rate and variable bit rate coding can be used in the DVD system.

Because MPEG video data is compressed with variable length coding, the data quantity in each GOP is not constant. The video and audio decoding times also differ, and the time-base relationship between the video and audio data read from an optical disk, and the time-base relationship between the video and audio data output from the decoder, do not match. The method of time-base synchronizing the video and audio data is therefore described in detail below, but is described briefly below based on constant bit rate coding.

Figure 8:
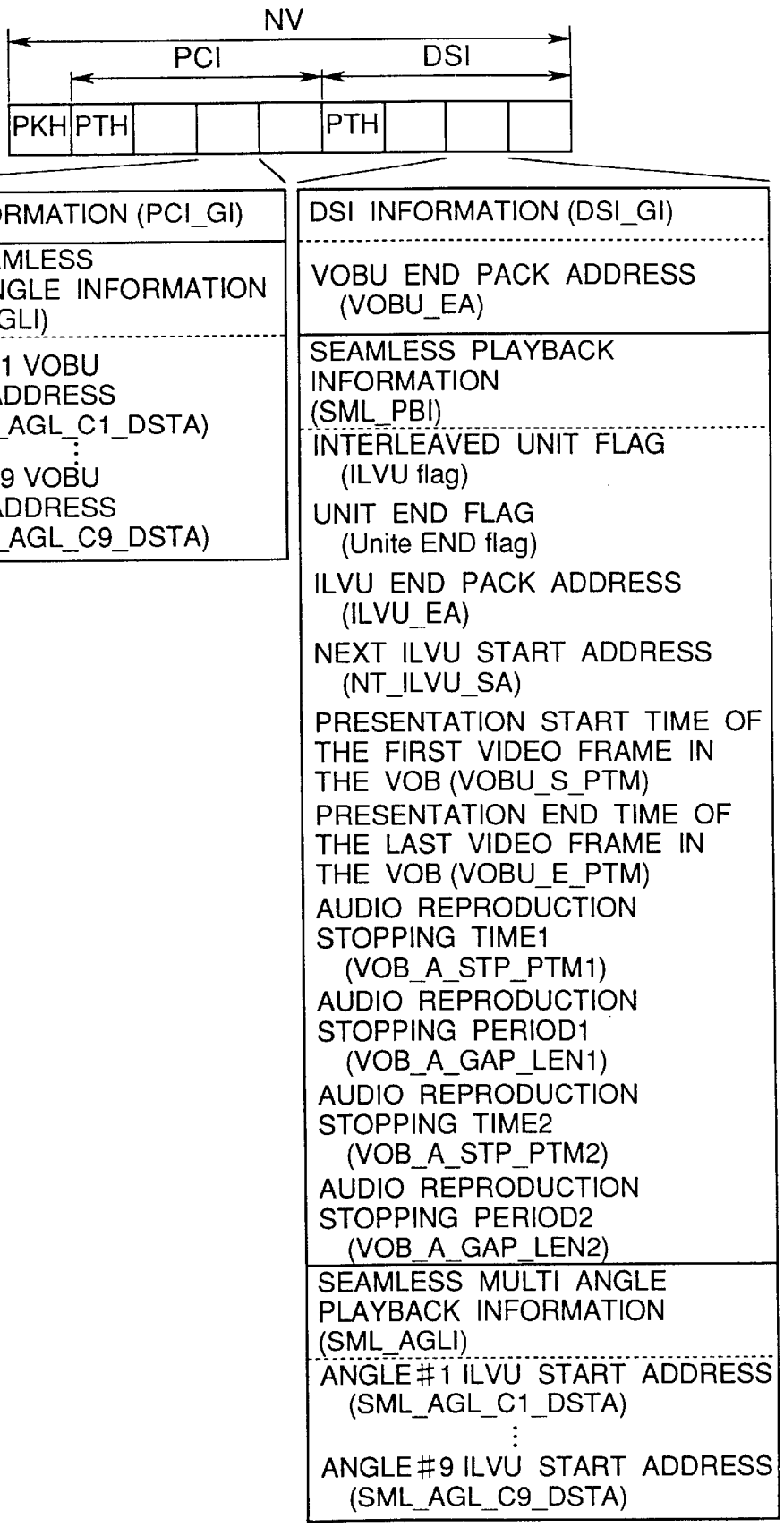
FIG. 8 is a typical diagram of a data structure of an NV packet according to the present invention.

The navigation pack NV structure is shown in FIG. 8. Each navigation pack NV starts with a pack header PKH, and contains a PCI packet and DSI packet.

As described above, the pack header PKH records the time at which that pack is to be sent from stream buffer 2400 to system decoder 2500 (see FIG. 3), that is, the system clock reference SCR defining the reference time for synchronized audio-visual data playback.

Each PCI packet contains PCI Information (PCI_GI) and Angle Information for Non-seamless playback (NMSL_AGLI).

The PCI Information (PCI_GI) declares the display time of the first video frame (VOBU_S_PTM), and the display time of the last video frame (VOBU_E_PTM), in the corresponding video object unit VOBU with system clock precision (90 kHz).

The Angle Information for Non-seamless multi-angle playback (NMSL_AGLI) states the read start address of the corresponding video object unit VOBU when the angle is changed, expressed as the number of sectors from the beginning of the video object VOB. Because there are nine or fewer angles in this example, there are nine angle address declaration cells (NMSL_AGL_C1_DSTA to NMSL_AGL_C9_DSTA).

Each DSI packet contains DSI Information (DSI_GI), Seamless Playback Information (SML_PBI), and Angle Information for Seamless multi-angle playback (SML_AGLI).

The DSI Information (DSI_GI) declares the address of the last pack in the video object unit VOBU (VOBU_EA) expressed as the number of sectors from the beginning of the video object unit VOBU.

While seamless playback is described in detail later, it should be noted that the continuously read data units must be interleaved (multiplexed) at the system stream level as an interleaved unit ILVU in order to seamlessly reproduce split or combined titles. Plural system streams interleaved with the interleaved unit ILVU as the smallest unit are defined as an interleaved block.

The Seamless Playback Information (SML_PBI) is declared to seamlessly reproduce the stream interleaved with the interleaved unit ILVU as the smallest data unit. The Seamless Playback Information (SML_PBI) contains an Interleaved Unit Flag (ILVU flag) identifying whether the corresponding video object unit VOBU is an interleaved block. The ILVU flag indicates whether the video object unit VOBU is in an interleaved block, and is set to 1 when it is. Otherwise the ILVU flag is set to 0.

When a video object unit VOBU is in an interleaved block, a Unit END flag is declared to indicate whether the video object unit VOBU is the last VOBU in the interleaved unit ILVU. Because the interleaved unit ILVU is the data unit for continuous reading, the Unit END flag is set to 1 if the VOBU currently being read is the last VOBU in the interleaved unit ILVU. Otherwise the Unit END flag is set to 0.

When a video object unit VOBU is in an interleaved block, an Interleaved Unit End Address (ILVU_EA) identifying the address of the last pack in the ILVU to which the VOBU belongs is written. This address is expressed as the number of sectors from the navigation pack NV of that VOBU. In addition when a video object unit VOBU is in an interleaved block, the starting address of the next interleaved unit ILVU (NT_ILVU_SA) is also declared. This address is expressed as the number of sectors from the navigation pack NV of that VOBU.

When two system streams are seamlessly connected but the audio components of the two system streams are not contiguous (the audio is different), particularly immediately before and after the seam, it is necessary to pause the audio output to synchronize the audio and video components of the system stream following the seam. With an NTSC signal, for example, the video frame cycle is approximately 33.33 msec while the AC-3 audio frame cycle is 32 msec.

To enable this resynchronization, audio reproduction stopping times 1 and 2, that is, Audio Stop PTM 1 in VOB (VOB_A_STP_PTM1), and Audio Stop PTM2 in VOB (VOB_A_STP_PTM2), indicating the time at which the audio is to be paused; and audio reproduction stopping periods 1 and 2, that is, Audio Gap Length 1 in VOB (VOB_A_GAP_LEN1) and Audio Gap Length 2 in VOB (VOB_A_GAP_LEN2), indicating for how long the audio is to be paused, are also declared. Note that these times are specified at the system clock precision (90 kHz).

The Angle Information for Seamless multi-angle playback (SML_AGLI) declares the read start address when the angle is changed. Note that this field is valid when seamless, multi-angle control is enabled. This address is also expressed as the number of sectors from the navigation pack NV of that VOBU. Because there are nine or fewer angles, there are nine angle address declaration cells (SML_AGL_C1_DSTA to SML_AGL_C9_DSTA).

<3.2> DVD Encoder

A preferred embodiment of an authoring encoder ECD in which the multimedia bitstream authoring system according to the present invention is applied to a DVD system as described above is described below and shown in FIG. 12. It will be obvious that the authoring encoder ECD applied to the DVD system, referred to below as a DVD encoder, is substantially identical to the authoring encoder EC shown in FIG. 2.

The basic difference between these encoders is the replacement in the DVD encoder ECD of the video zone formatter 1300 of the authoring encoder EC above with a VOB buffer 1000 and formatter 1100. It will also be obvious that the bitstream encoded by this DVD encoder ECD is recorded to a DVD medium M. The operation of this DVD encoder ECD is therefore described below in comparison with the authoring encoder EC described above. It should be noted that in the authoring encoder ECD shown in FIG. 12, the edit control command data St7' from the encoding system controller 200 is not fed back to the editing information generator 100, but this is not a real problem, and further description thereof is thus omitted below.

As in the above authoring encoder EC, the encoding system controller 200 generates control signals St9, St11, St13, St21, St23, St25, St33, and St39 based on the scenario data St7 describing the user-defined editing instructions input from the scenario editor 100, and controls the video encoder 300, subpicture encoder 500, and audio encoder 700 in the DVD encoder ECD. Note that, similar to the editing instruction content of the authoring system described above, the editing instruction content in the DVD system contains what source data is selected from all or a subset of the source data containing plural titles within a defined time period, and how the selected source data is reassembled to reproduce the scenario (sequence) intended by the user. Additionally, the editing instruction content in the DVD system contains the following information. Specifically, the editing instructions further contain such information as: the number of streams contained in the editing units, which are obtained by splitting a multi-title source stream into blocks at a constant time interval; the number of audio and subpicture data cells contained in each stream, and the subpicture display time and period; whether the user content is selected from plural streams including, for example, parental lock control or multi-angle control; and the method of connecting scenes when the angle is switched among the multiple viewing angles.

The scenario data St7 of the DVD encoder ECD also contains control information on a video object VOB unit basis. This information is required to encode the media source stream, and specifically includes such information as whether there are multiple angles, and whether the title is a multi-rated title enabling parental lock control. When multiple angle viewing is enabled, the scenario data St7 also contains the stream encoding bit rate reflecting the disk capacity and data interleaving for multi-angle control or parental lock control, the start and end times of each control period, and whether a seamless connection should be made between the preceding and following streams.

The encoding system controller 200 extracts this information from the scenario data St7, and generates the encoding information table and encoding parameters required for encoding control. The encoding information table and encoding parameters are described with reference to FIG. 13, FIG. 14, and FIG. 15 below. It should be noted that these encoding information tables and encoding parameters are shown by way of example when the authoring encoding parameters are generated for DVD seamless authoring.

The stream encoding data St33 contains the system stream encoding parameters and system encoding start and end timing values required by the DVD system to generate the VOBs. These system stream encoding parameters include the conditions for connecting one video object VOB with those before and after, the number of audio streams, the audio encoding information and audio IDs, the number of subpictures and the subpicture IDs, the video playback starting time information VPTS, and the audio playback starting time information APTS. The title sequence control signal St39 supplies the multimedia bitstream MBS formatting start and end timing information and formatting parameters declaring the reproduction control information and interleave information.

Based on the video encoding parameter and encoding start/end timing signal St9, the video encoder 300 encodes a specific part of the video stream St1 to generate an elementary stream conforming to the MPEG-2 Video standard defined in ISO-13818. This elementary stream is output to the video stream buffer 400 as video encoding stream St15.

Note that while the video encoder 300 generates an elementary stream conforming to the MPEG-2 Video standard defined in ISO-13818, specific encoding parameters are input via the video encoding parameter signal St9, including the encoding start and end timing, bit rate, the encoding conditions for the encoding start and end, the material type, including whether the material is an NTSC or PAL video signal or telecine converted material, and whether the encoding mode is set for either open GOP or closed GOP encoding The MPEG-2 coding method is basically an interframe coding method using the correlation between frames. That is, the frame being coded (the target frame) is coded by referencing the frames before and after the target frame. However, intra-coded frames, that is, frames that are coded based solely on the content of the target frame, are also inserted to avoid error propagation and enable accessibility from mid-stream (random access). The coding unit containing at least one intra-coded frame "intra-frame") is called a GOP.

A GOP in which coding is closed completely within that GOP is known as a "closed GOP." A GOP containing a frame coded with reference to a frame in a preceding GOP is an "open GOP." It is therefore possible to reproduce a closed GOP using only that GOP. Reproducing an open GOP, however, also requires the presence of the preceding GOP.

The GOP is often used as the access unit. For example, the GOP may be used as the playback start point for reproducing a title from the middle, as a transition point in a movie, or for fast-forward play and other special reproduction modes. High speed reproduction can be achieved in such cases by reproducing only the intra-frame coded frames in a GOP or by reproducing only frames in GOP units.

Based on the subpicture stream encoding parameter signal St11, the subpicture encoder 500 encodes a specific part of the subpicture stream St3 to generate a variable length coded bitstream of bitmapped data. This variable length coded bitstream data is output as the subpicture encoding stream St17 to the subpicture stream buffer 600.

Based on the audio encoding signal St13, the audio encoder 700 encodes a specific part of the audio stream St5 to generate the encoded audio data. This encoded audio data may be data based on the MPEG-1 audio standard defined in ISO-11172 and the MPEG-2 audio standard defined in ISO-13818, AC-3 audio data, or PCM (LPCM) data. Note that the methods and means of encoding audio data according to these standards are known and commonly available.

The video stream buffer 400 is connected to the video encoder 300 and stores the video encoding stream St15 input from the video encoder 300. The video stream buffer 400 is also connected to the encoding system controller 200, and based on the timing signal St21 outputs the stored video encoding stream St15 as the time-delayed video encoding stream St27.

The subpicture stream buffer 600 is similarly connected to the subpicture encoder 500 and stores the subpicture encoding stream St17 input from the subpicture encoder 500. The subpicture stream buffer 600 is also connected to the encoding system controller 200, and based on the timing signal St23 outputs the stored subpicture encoding stream St17 as time-delayed subpicture encoding stream St29.

The audio stream buffer 800 is similarly connected to the audio encoder 700 and stores the audio encoding stream St19 input from the audio encoder 700. The audio stream buffer 800 is also connected to the encoding system controller 200, and based on the timing signal St25 outputs the audio encoding stream St19 as the time-delayed audio encoding stream St31.

The system encoder 900 is connected to the video stream buffer 400, subpicture stream buffer 600, and audio stream buffer 800, and receives therefrom time-delayed video encoding stream St27, time-delayed subpicture encoding stream. St29, and time-delayed audio encoding stream St31. The system encoder 900 is also connected to the encoding system controller 200, and receives therefrom St33 containing the encoding parameter data for system encoding. Note that the system encoder 900 multiplexes the time-delayed streams St27, St29, and St31 based on the encoding parameter data and encoding starustop timing signal St33 to generate title editing units (VOBs) St35.

The VOB buffer 1000 temporarily stores the video objects VOBs produced by the system encoder 900. The formatter 1100 reads the delayed video objects VOB from the VOB buffer 1000 based on the title sequence control signal St39 to generate one video zone VZ, and adds the file system VFS to generate St43.

The stream St43 edited according to the user-defined scenario is then sent to the recorder 1200. The recorder 1200 processes the edited multimedia bitstream MBS to data St43 in a format determined by the recording medium M, and then records it to the recording medium M.

<3.3> DVD Decoder

<3.3.1> Multiscene

The concept of multiple angle scene control according to the present invention is described below with reference to FIG. 9. As described above, a multiscene period is constructed from basic scene periods containing data common to each title, and multi-scene periods comprising groups of different scenes corresponding to the various scenario requests. In the figure, scenes 1, 5, and 8 are the common scenes. The angle scenes between scenes 1 and 5, and the parental lock control scenes between scenes 5 and 8, are the multi-scene periods.

Scenes taken from different angles, that is, angles 1, 2, and 3 in this example, can be dynamically selected and reproduced during playback in the multi-angle scene period. In the parental lock control period, however, only one of the available scenes, scenes 6 and 7, having different content can be selected, and must be selected statically before playback begins.

Which of these scenes from the multi-scene periods is to be selected and reproduced is defined by the user operating the scenario selector 2100, thereby generating the scenario selection data St51. In scenario 1 in the figure, the user can freely select any of the multi-angle scenes, and scene 6 has been preselected for output in the parental lock control scene period. Similarly in scenario 2, the user can freely select any of the multi-angle scenes, and scene 7 has been preselected for output in the parental lock control scene period.

Figure 9:
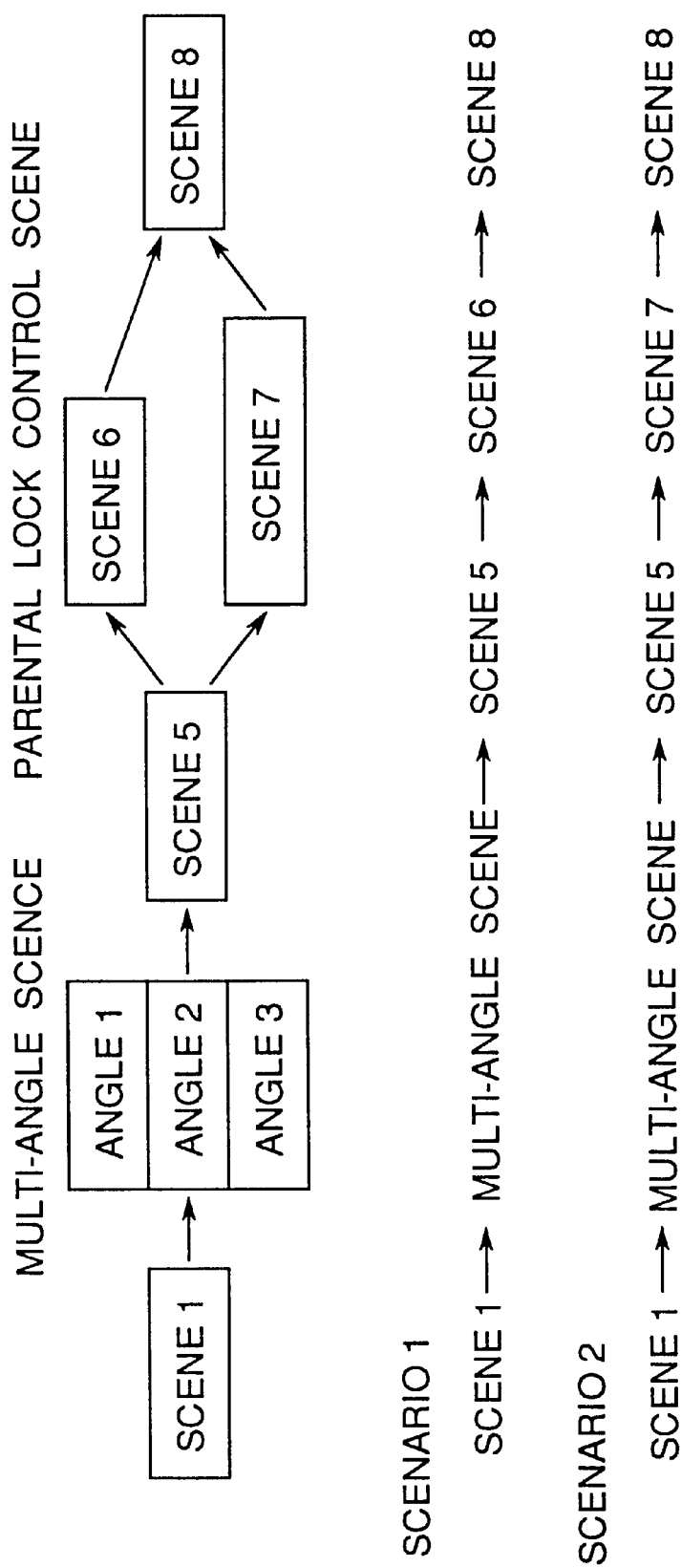
FIG. 9 is a typical diagram of an exemplary multiscene control scenario in a DVD system according to the present invention.

The program chain information VTS_PGCI in a DVD data structure for multi-scene control as shown in FIG. 9 is described next below with reference to FIG. 16 and FIG. 17.

Figure 16:
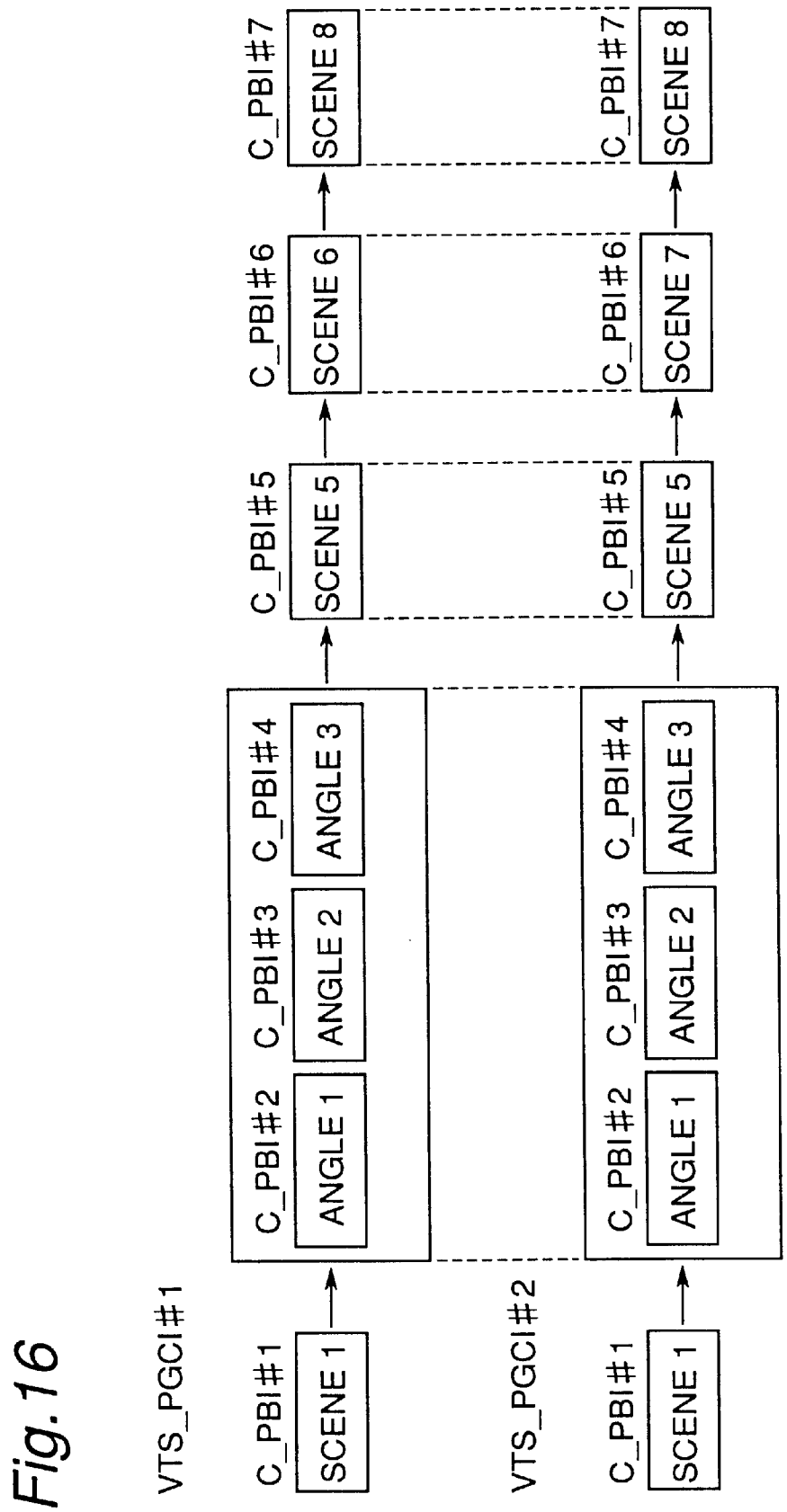
FIG. 16 is a typical diagram of a program chain structure in DVD multiscene control according to the present invention.

The user-selected scenarios shown in FIG. 9 are shown in FIG. 16 using the notation of a VTSI data structure representing the internal structure of a video title set in the DVD data structure shown in FIG. 5.

More specifically, in FIG. 16, scenario 1 and scenario 2 shown in FIG. 9 are shown as the two program chains VTS_PGC#1 and VTS_PGC#2 of the program chain information VRS_PGCIT in VTSI of FIG. 5. More specifically, VTS_PGC#1 describing scenario 1 consists of cell playback information C_PBI#1 corresponding to scene 1, cell playback information C_PBI#2, C_PBI#3, and C_PBI#4 within a multi-angle cell block corresponding to a multi-angle scene, cell playback information C_PBI#5 corresponding to scene 5, cell playback information C_PBI#6 corresponding to scene 6, and cell playback information C_PBI#7 corresponding to scene 8.

Likewise, VTS_PGCI#2 describing scenario 2 consists of cell playback information C_PBI#1 corresponding to scene 1, cell playback information C_PBI#2, C_PBI#3, and C_PBI#4 within a multi-angle cell block corresponding to a multi-angle scene, cell playback information C_PBI#5 corresponding to scene 5, cell playback information C_PBI#6 corresponding to scene 7, and C_PBI#7 corresponding to scene 8.

In the DVD data structure, a scene, which is one reproduction control unit for a scenario, is represented as a DVD data structure unit called a "cell," which is thus used to construct user-selectable scenarios in the DVD structure.

Figure 17:
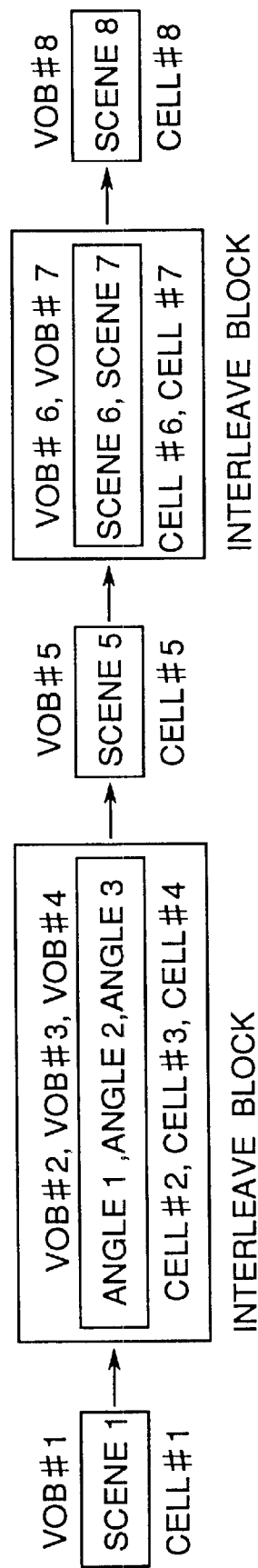
FIG. 17 is a typical diagram of a VOB structure in DVD multiscene control according to the present invention.

The user-selected scenarios shown in FIG. 9 are shown in FIG. 17 using the notation of a VOB data structure VTSTT_VOBS representing multimedia bitstream for a video title set in the DVD data structure shown in FIG. 5.

As specifically shown in FIG. 17, the two scenarios 1 and 2 use the VOB data for one title in common. Individual scenes common to each scenario are placed in non-interleaved blocks, that is, to contiguous blocks, as independent VOB units. In this figure, these are VOB#1 corresponding to scene 1, VOB#5 corresponding to scene 5, and VOB#8 corresponding to scene 8.

In the multi-angle scenes common to scenario 1 and scenario 2, one VOB constitutes one angle, and the VOB are interleaved in an interleave block to enable seamless reproduction of each angle and switching between angles. In FIG. 17, VOB #2 represents angle 1, VOB #3 represents angle 2, and VOB #4 represents angle 3.

Scene 6 and scene 7, that is, the scenes unique to scenario 1 and scenario 2, are also placed in an interleaved block to enable seamless reproduction of the scenes in each unique scenario, and to enable seamless reproduction to the common scenes before and after.

As described above, the user-requested scenario shown in FIG. 9 can be realized in a DVD data structure by utilizing the video title playback control information shown in FIG. 16, and the title playback VOB data structure shown in FIG. 17.

<3.3.2> Seamless Playback

The seamless playback capability mentioned above with regard to the DVD system data structure is described below. Note that seamless playback refers to the reproduction in a digital video disk system of multimedia data including video, audio, and subpicture data without intermittent breaks in the data or information between basic scene periods, between basic scene periods and multi-scene periods, and between multi-scene periods.

Hardware factors contributing to intermittent playback of this data and title content include decoder underflow, that is, an imbalance between the source data input speed and the decoding speed of the input source data.

Other factors relate to the properties of the playback data. When the playback data is data that must be continuously reproduced for a constant time unit in order for the user to understand the content or information, e.g., audio data, data continuity is lost when the required continuous presentation time cannot be sustained. Reproduction of such information whereby the required continuity is sustained is referred to as "continuous information reproduction," or "seamless information reproduction." Reproduction of this information when the required continuity cannot be sustained is referred to as "non-continuous information reproduction," or "non-seamless information reproduction." It is obvious that continuous information reproduction and non-continuous information reproduction are, respectively, seamless and non-seamless reproduction.

Note that seamless reproduction can be further categorized as seamless data reproduction and seamless information reproduction. Seamless data reproduction is defined as preventing physical blanks or interruptions in the data playback (intermittent reproduction) as a result of a buffer underflow, for example. Seamless information reproduction is defined as preventing apparent interruptions in the information as perceived by the user (intermittent presentation) during intellection of information from the playback data where there are no actual physical breaks in the actual reproduction of data.

<3.3.3> Details of Seamless Playback

A specific method enabling seamless reproduction as thus described is described later below with reference to FIG. 10 and FIG. 11.

<3.4.1> Interleaving

The DVD data system streams described above are recorded using an appropriate authoring encoder EC as a movie or other multimedia title on a DVD recording medium.

Supplying a single movie in a format enabling the movie to be used in a plurality of different cultural regions or countries requires the script to be recorded in the various languages used in those regions or countries. It may even necessitate editing the content to conform to the mores and moral expectations of different cultures. Even using such a large-capacity storage system as the DVD system, however, it is necessary to reduce the bit rate, and therefore the image quality, if a plurality of full-length titles edited from a single common source title are recorded to a single disk. This problem can be solved by recording the common parts of plural titles only once, and recording the segments different in each title for each different title only. This method makes it possible to record a plurality of titles for different countries or cultures to a single optical disk without reducing the bit rate, and, therefore, retaining high image quality.

As shown in FIG. 9, the titles recorded to a single optical disk contain basic scene periods of scenes common to all scenarios, and multi-scene periods containing scenes specific to certain scenarios, to provide parental lock control and multi-angle scene control functions.

In the case of the parental lock control function, titles containing sex scenes, violent scenes, or other scenes deemed unsuitable for children, that is, so-called "adult scenes," are recorded with a combination of common scenes, adult scenes, and children's scenes. These title streams are achieved by arraying the adult and children's scenes to multi-scene periods between the common basic scene periods.

Multi-angle control can be achieved in a conventional single-angle title by recording plural multimedia scenes obtained by recording the subjects from the desired plural camera angles to the multi-scene periods arrayed between the common basic scene periods. Note, however, that while these plural scenes are described here as scenes recorded from different camera angles (positions), it will be obvious that the scenes may be recorded from the same camera angle but at different times, data generated by computer graphics, or other video data.

When data is shared between different scenarios of a single title, it is obviously necessary to move the laser beam LS from the common scene data to the non-common scene data during reproduction, that is, to move the optical pickup to a different position on the DVD recording medium RC1. The problem here is that the time required to move the optical pickup makes it difficult to continue reproduction without creating breaks in the audio or video, that is, to sustain seamless reproduction. This problem can be theoretically solved by providing a track buffer (stream buffer 2400) to delay data output an amount equivalent to the worst access time. In general, data recorded to an optical disk is read by the optical pickup, appropriately processed, and temporarily stored to a track buffer. The stored data is subsequently decoded and reproduced as video or audio data.

<3.4.2> Definition of Interleaving

To thus enable the user to selectively cut scenes and choose from among a plurality of scenes, non-selected scene data is necessarily recorded and inserted between common scene data and selective scene data because the data units associated with individual scenes are contiguously recorded to the recording tracks of the recording medium. If data is then read in the recorded sequence, non-selected scene data must be accessed before accessing and decoding the selected scene data, and seamless connection of the selected scenes is difficult. The excellent random access characteristics of the DVD system, however, make seamless connection between a plurality of scenes possible.

In other words, by splitting scene-specific data into a plurality of units of a specified data size, and interleaving a plurality of split data units for different scenes in a predefined sequence within the jumping range whereby a data underflow state does not occur, it is possible to reproduce the selected scenes without data interruption by intermittently accessing and decoding the data specific to the selected scenes using these split data units. In other words, seamless data reproduction can be sustained.

<3.4.3> Structure of Interleave Blocks and Units

An interleaving method enabling seamless data reproduction according to the present invention is described below with reference to FIG. 11 and FIG. 18. Shown in FIG. 11 is a case from which reproduction can branch from one video object VOB-A to one of a plurality of video objects VOB-B, VOB-C, and VOB-D, and then merge back gain to a single video object VOB-E. The actual arrangement of these blocks recorded o a data recording track TR on disk is shown in FIG. 18.

Figure 18:
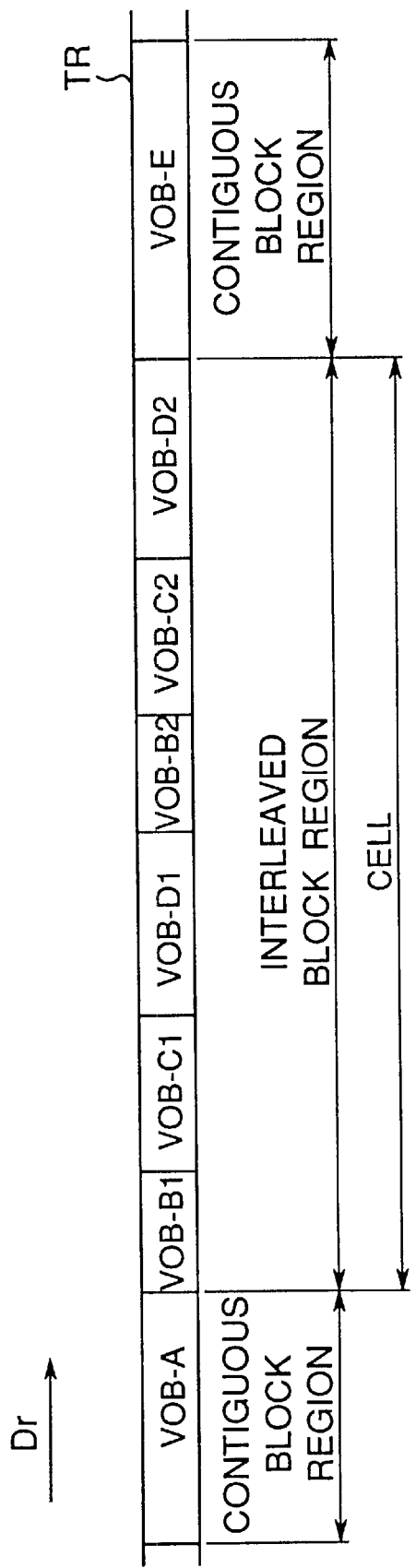
FIG. 18 is a typical diagram of a data structure for search information in a navigation pack NV according to the present invention.

Referring to FIG. 18, VOB-A and VOB-E are video objects with independent playback start and end times, and are in principle arrayed to contiguous block regions. As shown in FIG. 11, the playback start and end times of VOB-B, VOB-C, and VOB-D are aligned during interleaving. The interleaved data blocks are then recorded to a contiguous region of the disk as an interleaved block region. The contiguous block regions and interleaved block regions are then written to disk in the track path Dr direction in the playback sequence. A plurality of video objects VOB, that is, VOBS, arrayed to the data recording track TR are shown in FIG. 18.

Referring to FIG. 18, data regions to which data is continuously arrayed are called "blocks," of which there are two types: "contiguous block regions" in which VOB with discrete starting and end points are contiguously arrayed, and "interleaved block regions" in which plural VOB with aligned starting and end points are interleaved. The respective blocks are arrayed as shown in FIG. 34 in the playback sequence, that is, block 1, block 2, block 3, . . . block 7.

Figure 34:
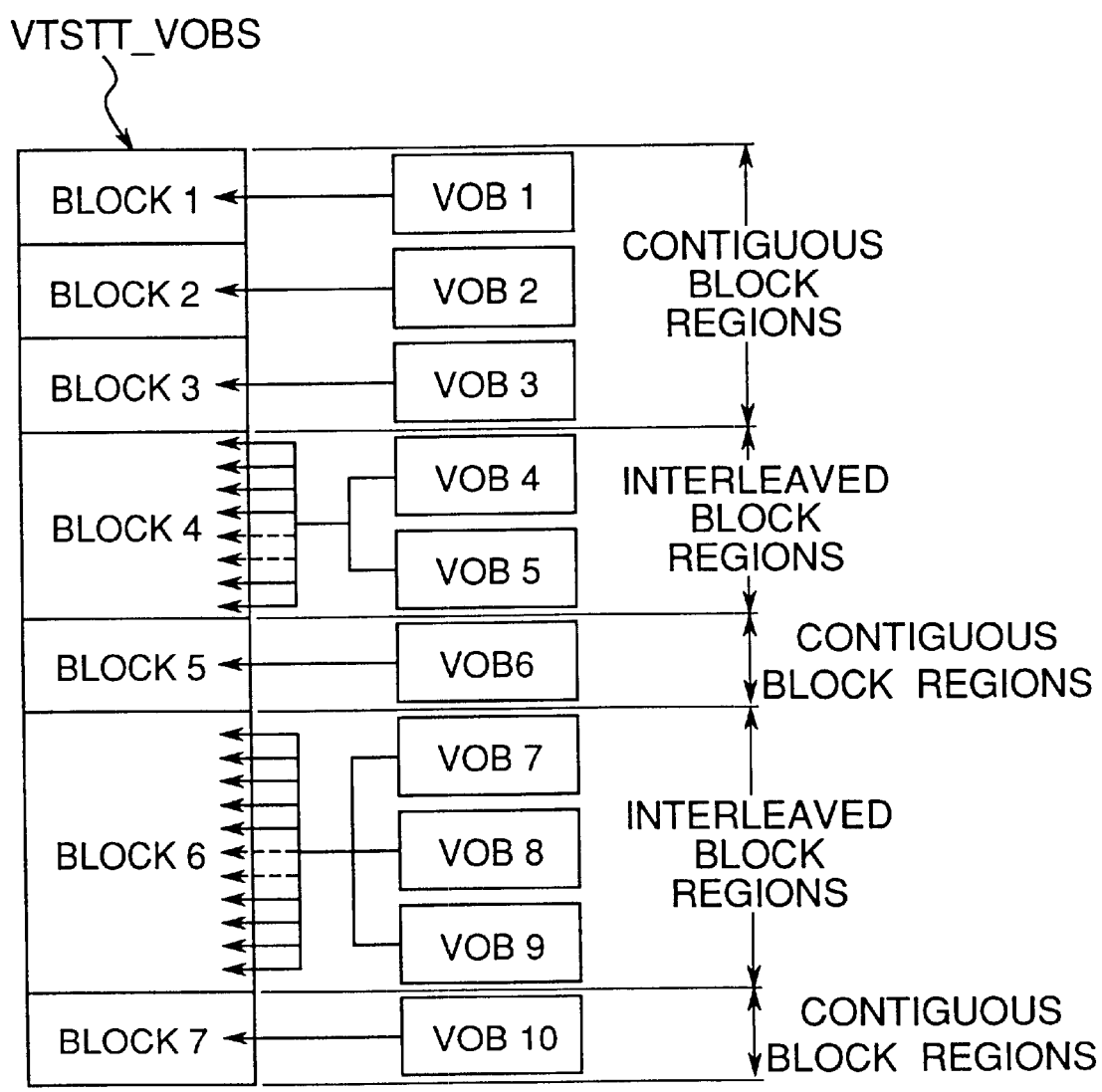
FIG. 34 is a typical diagram showing the structure of system stream data.

As shown in FIG. 34, a VTS title VOBS (VTSTT_VOBS) consist of blocks 1, 2, 3, 4, 5, 6, and 7. Block 1 contains VOB 1 alone. Blocks 2, 3, 5, and 7 similarly discretely contain VOBS 2, 3, 6, and 10. Blocks 2, 3, 5, and 7 are thus contiguous block regions.

Block 4, however, contains VOB 4 and VOB 5 interleaved together, while block 6 contains three VOB, VOB 7, VOB 8, and VOB 9, interleaved together. Blocks 4 and 6 are thus interleaved block regions.

The internal data structure of the contiguous block regions is shown in FIG. with VOB-i and VOB-j arrayed as the contiguous blocks in the VOBS. As described with reference to FIG. 5, VOB-i and VOB-j in a contiguous block region are further logically divided into cells as the playback unit. Both VOB-i and VOB-j in this figure are shown comprising three cells CELL #1, CELL #2, and CELL #3.

Figure 35:
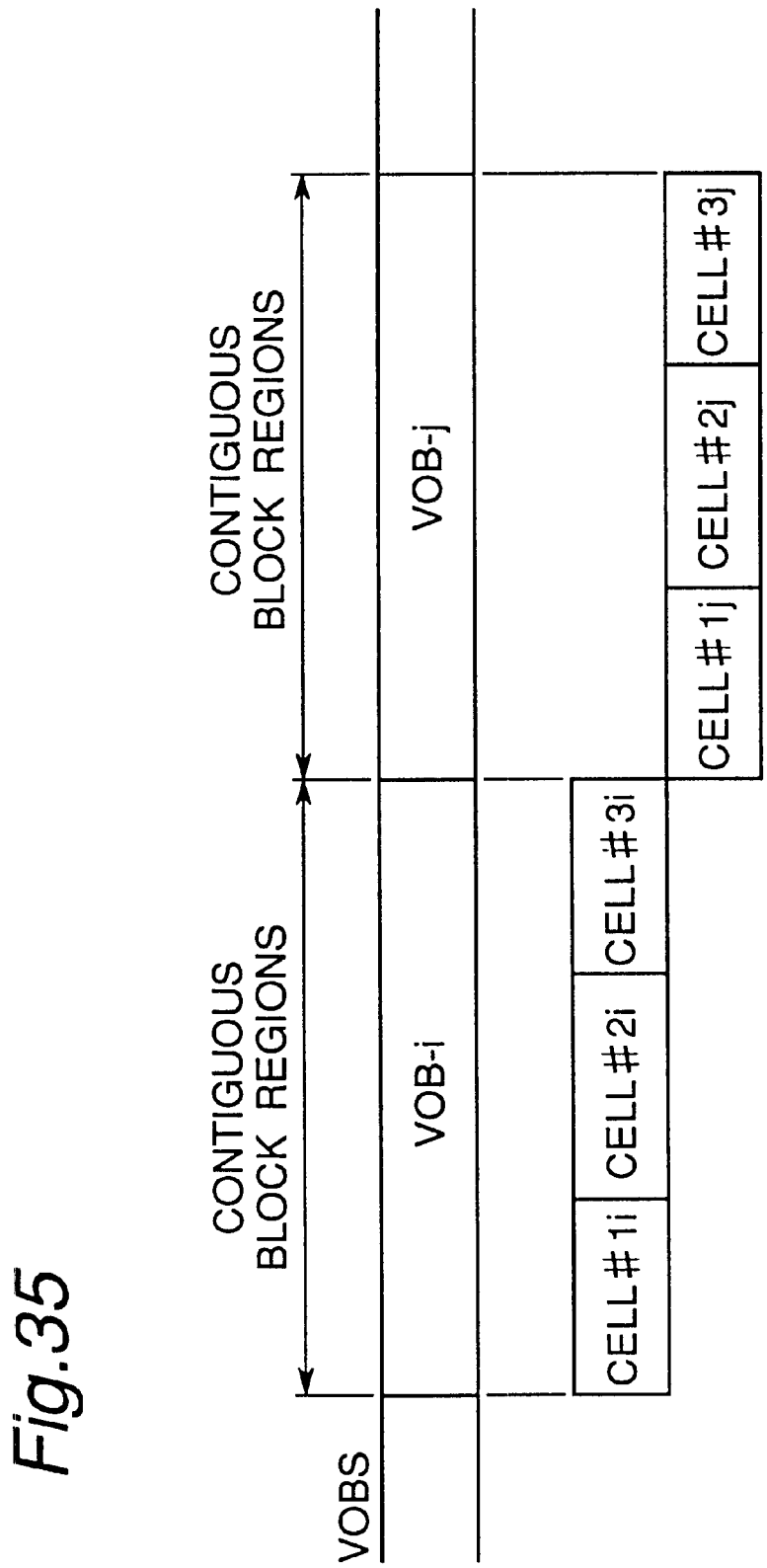
FIG. 35 is a typical diagram showing the data structure in contiguous blocks.

Each cell comprises one or more video object unit VOBU with the video object unit VOBU defining the boundaries of the cell. Each cell also contains information identifying the position of the cell in the program chain (PGC below) as shown in FIG. 5. More specifically, this position information is the address of the first and last VOBU in the cell. As also shown in FIG. 35, these VOB and the cells defined therein are also recorded to a contiguous block region so that contiguous blocks are contiguously reproduced. Reproducing these contiguous blocks is therefore no problem.

Figure 36:
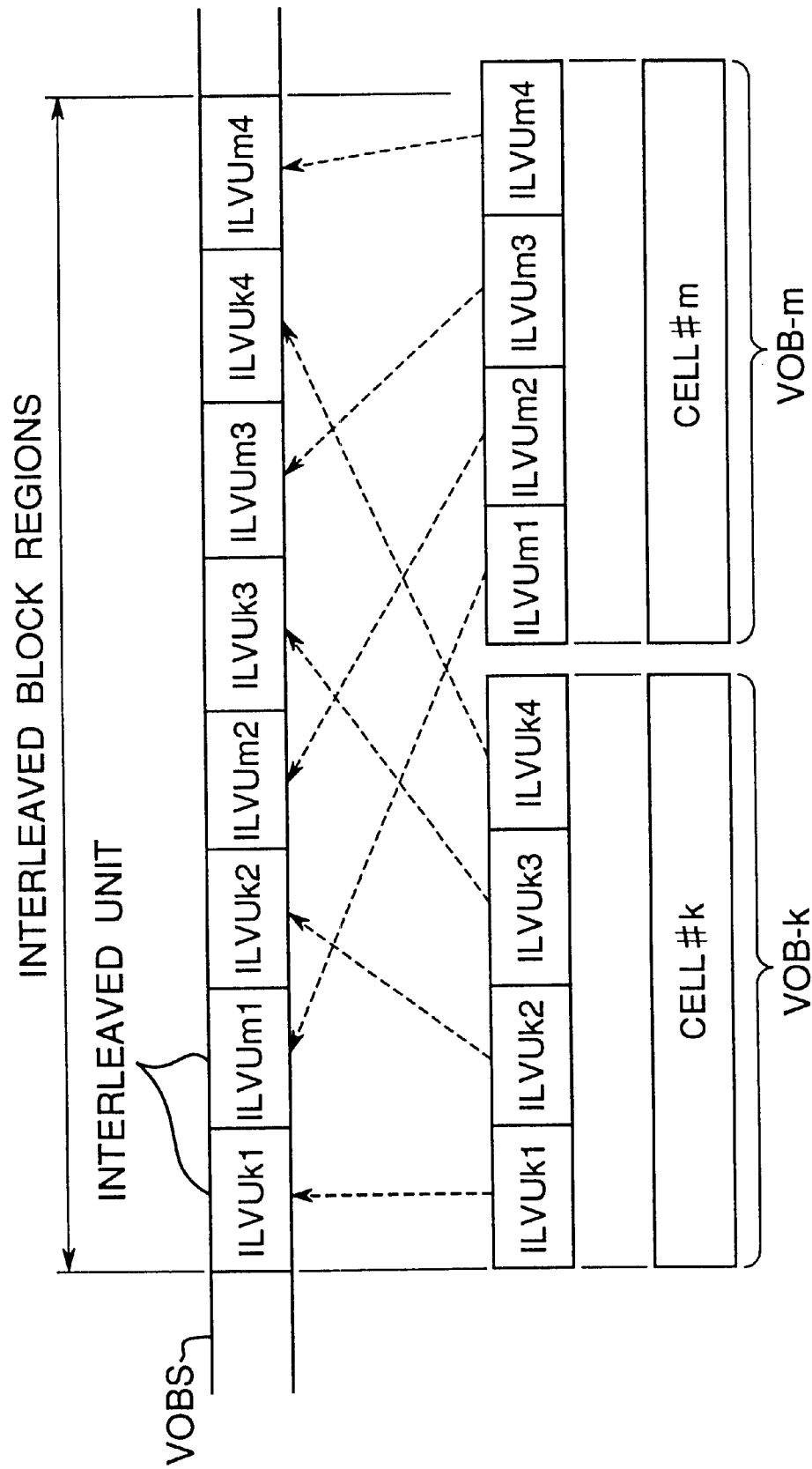
FIG. 36 is a typical diagram showing the data structure in interleaved blocks.

The internal data structure of the interleaved block regions is shown in FIG. 36. In the interleaved block regions, each video object VOB is divided into interleaved units ILVU, and the interleaved units ILVU associated with each VOB are alternately arrayed. Cell boundaries are defined independently of the interleaved units ILVU. For example, VOB-k is divided into four interleaved units ILVUk1, ILVUk2, ILVUk3, and ILVUk4, and two cells CELL #1k and CELL #2k are defined. VOB-m is likewise divided into four interleaved units ILVUm1, ILVUm2, ILVUm3, and ILVUm4, and two cells CELL #1m and CELL #2m are defined. The interleaved units ILVU thus contains both audio and video data.

In the example shown in FIG. 36, the interleaved units ILVUk1, ILVUk2, ILVUk3, and ILVUk4, and ILVUm1, ILVUm2, ILVUm3, and ILVUm4, from two different video objects VOB-k and VOB-m are alternately arrayed within a single interleaved block. By interleaving the interleaved units ILVU of two video objects VOB in this sequence, it is possible to achieve seamless reproduction branching from one scene to one of a plurality of scenes, and from one of a plurality of scenes to one scene. This interleaving process further enables seamless reproduction of scenes from various scenario threads in most cases.

<3.5.1> Multiscene Control

The concept of multiple angle scene control and multi-scene periods according to the present invention are described below.

An example of a scene recorded from a plurality of different angles has been given above. However, the scenes in a multiscene period can alternatively be scenes recorded from the same angle but at a different time, or data such as computer graphics. In other words, a multi-angle scene period is a multi-scene period.

<3.5.2> Parental Control

The concept of recording plural titles comprising alternative scenes for such functions as parental lock control and recording a director's cut is described below with reference to FIG. 4.

Figure 4:
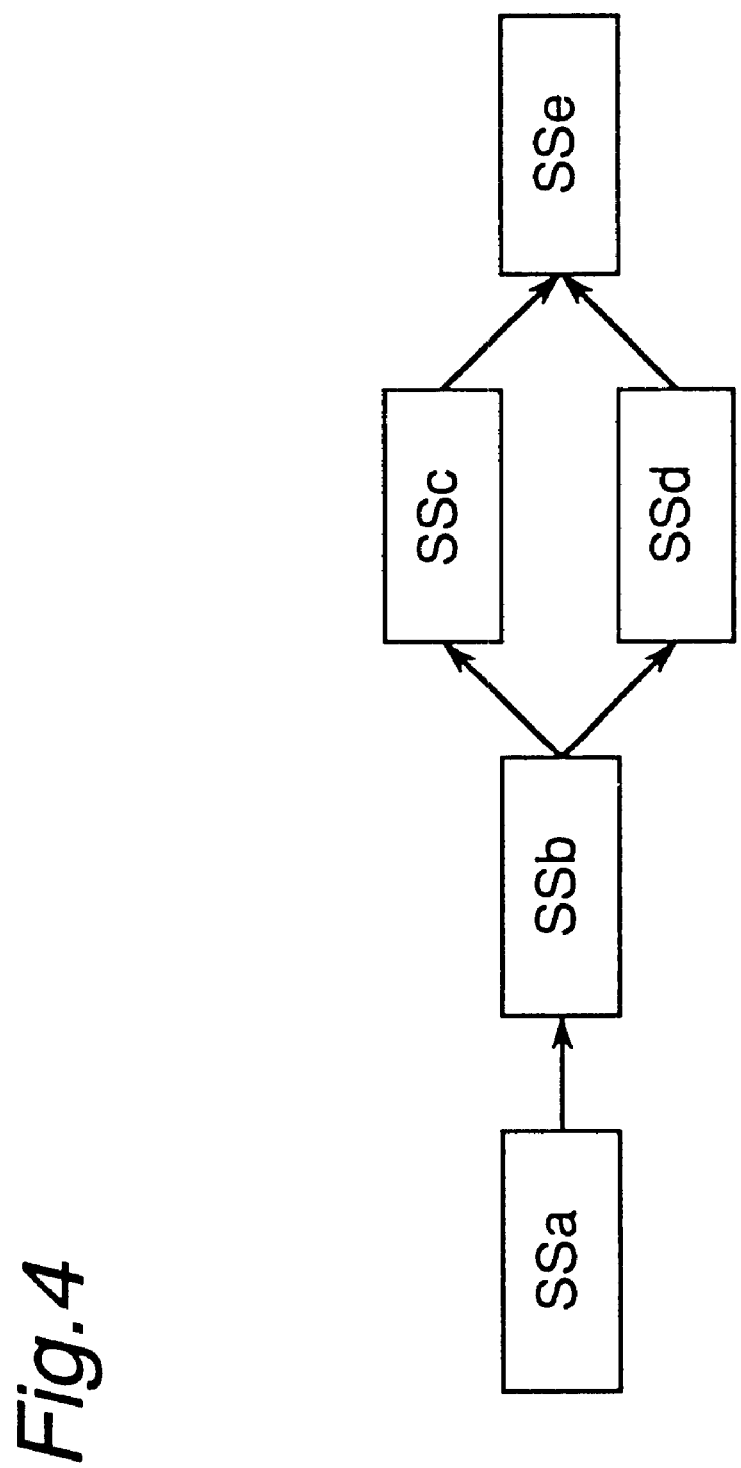
FIG. 4 is a typical diagram of an exemplary multi-rated title stream.

An example of a multi-rated title stream providing for parental lock control is shown in FIG. 4. When so-called "adult scenes" containing sex, violence, or other scenes deemed unsuitable for children are contained in a title implementing parental lock control, the title stream is recorded with a combination of common system streams SSa, SSb, and SSe, an adult-oriented system stream SSc containing the adult scenes, and a child-oriented system stream SSd containing only the scenes suitable for children. Title streams such as this are recorded as a multi-scene system stream containing the adult-oriented system stream SSc and the child-oriented system stream SSd arrayed to the multi-scene period between common system streams SSb and SSe.

The relationship between each of the component titles and the system stream recorded to the program chain PGC of a title stream thus comprised is described below.

The adult-oriented title program chain PGC1 comprises in sequence the common system streams SSa and SSb, the adult-oriented system stream SSc, and the common system stream SSe. The child-oriented title program chain PGC2 comprises in sequence the common system streams SSa and SSb, the child-oriented system stream SSd, and the common system stream SSe.

By thus arraying the adult-oriented system stream SSc and child-oriented system stream SSd to a multi-scene period, the decoding method previously described can reproduce the title containing adult-oriented content by reproducing the common system streams SSa and SSb, then selecting and reproducing the adult-oriented system stream SSc, and then reproducing the common system stream SSe as instructed by the adult-oriented title program chain PGC notation. In addition, a child-oriented title from which the adult-oriented scenes have been expurgated can be reproduced by selecting the child-oriented system stream SSd in the multi-scene period.

This method of providing in the title stream a multi-scene period containing plural alternative scenes, selecting which of the scenes in the multi-scene period are to be reproduced before playback begins, and generating plural titles containing essentially the same title content but different scenes in part, is called parental lock control.

Note that parental lock control is so named because of the intent to protect children from undesirable content. From the perspective of system stream processing, however, parental lock control is a technology for statically generating different title streams by means of the user pre-selecting specific scenes from a multi-scene period. Note, further, that this contrasts with multi-angle scene control, which is a technology for dynamically changing the content of a single title by means of the user selecting scenes from the multi-scene period freely and in real-time during title playback.

Title stream editing enabling what is known as the "director's cut" can also be achieved using this parental lock control technology. The director's cut refers to the process of editing certain scenes from a movie to, for example, shorten the total presentation time. This may be necessary, for example, to edit a feature-length movie for viewing on an airplane where the presentation time is too long for viewing within the flight time. The movie director or producer thus determines which scenes may be cut to shorten the movie. The title can then be recorded with both a full-length, unedited system stream and a director-controlled edited system stream in which the edited scenes are recorded to multi-scene periods. At the transition from one system stream to another system stream in such applications, parental lock control must be able to maintain smooth playback image output. More specifically, seamless data reproduction whereby a data underflow state does not occur in the audio, video, or other buffers, and seamless information reproduction whereby no unnatural interruptions are audibly or visibly perceived in the audio and video playback, are necessary.

<3.5.3> Multi-angle Control

Figure 19:
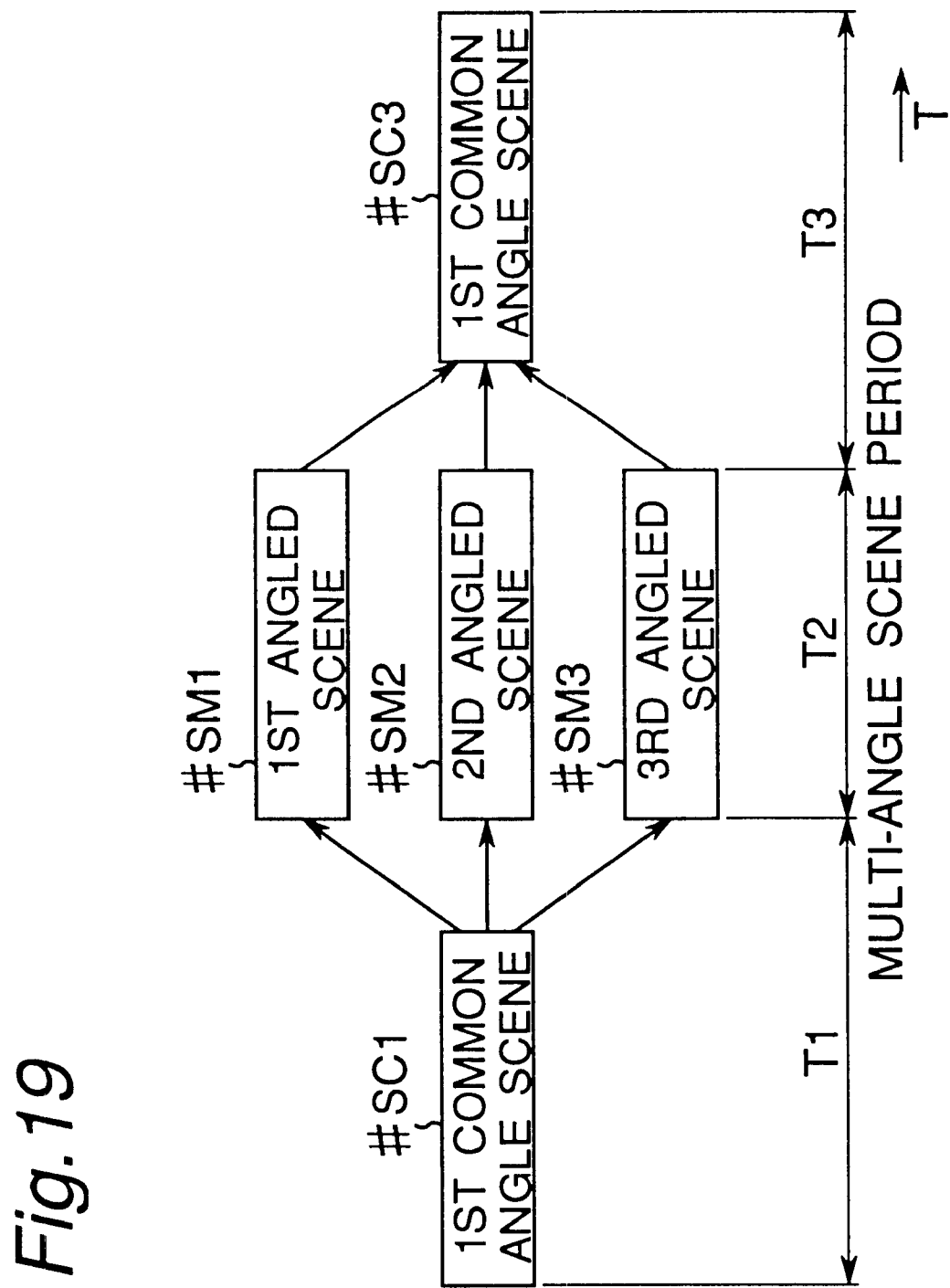
FIG. 19 is a typical diagram showing the concept of multi-angle control.

The concept of multi-angle scene control in the present invention is described next with reference to FIG. 19. In general, multimedia titles are obtained by recording both the audio and video information (collectively "recording" below) of the subject over time T. The blocks #SC1, #SM1, #SM2, #SM3, and #SC3 represent the multimedia scenes obtained at recording unit times T1, T2, and T3 by recording the subject at respective camera angles. Scenes #SM1, #SM2, and #SM3 are recorded at mutually different (first, second, and third) camera angles during recording unit time T2, and are referenced below as the first, second, and third multi-angle scenes.

Note that the multi-scene periods referenced herein are assumed to comprise scenes recorded from different angles. The scenes may, however, be recorded from the same angle but at different times, or they may be computer graphics data or other data. The multi-angle scene periods are thus multi-scene periods from which a plurality of scenes can be selected for presentation in the same time period, whether or not the scenes are actually recorded at different camera angles.

Scenes #SC1 and #SC3 are scenes recorded at the same common camera angle during recording unit times T1 and T3, that is, before and after the multi-angle scenes. These scenes are therefore called "common angle scenes." Note that one of the multiple camera angles used in the multi-angle scenes is usually the same as the common camera angle.

To understand the relationship between these various angle scenes, multi-angle scene control is described below using by way of example only a live broadcast of a baseball game.

The common angle scenes #SC1 and #SC3 are recorded at the common camera angle, which is here defined as the view from center field on the axis through the pitcher, batter, and catcher.

The first angled scene #SM1 is recorded at a first multi-camera angle, that is, the camera angle from the backstop on the axis through the catcher, pitcher, and batter. The second angled scene #SM2 is recorded at a second multi-camera angle, that is, the view from center field on the axis through the pitcher, batter, and catcher. Note that the second angled scene #SM2 is thus the same as the common camera angle in this example. It therefore follows that the second angled scene #SM2 is the same as the common angle scene #SC2 recorded during recording unit time T2. The third angled scene #SM3 is recorded at a third multi-camera angle, that is, the camera angle from the backstop focusing on the infield.

The presentation times of the multiple angle scenes #SM1, #SM2, and #SM3 overlap in recording unit time T2; this period is called the "multi-angle scene period." By freely selecting one of the multiple angle scenes #SM1, #SM2, and #SM3 in this multi-angle scene period, the viewer is able to change his or her virtual viewing position to enjoy a different view of the game as though the actual camera angle is changed. Note that while there appears to be a time gap between common angle scenes #SC1 and #SC3 and the multiple angle scenes #SM1, #SM2, and #SM3 in the figure, this is simply to facilitate the use of arrows in the figure for easier description of the data reproduction paths reproduced by selecting different angled scenes. That there is no actual time gap during playback will be obvious.

Multi-angle scene control of the system stream based on the present invention is described next with reference to FIG. 10 from the perspective of connecting data blocks. The multimedia data corresponding to common angle scene #SC is referenced as common angle data BA, and the common angle data BA in recording unit times T1 and T3 are referenced as BA1 and BA3, respectively. The multimedia data corresponding to the multi-angle scenes #SM1, #SM2, and #SM3 are referenced as first, second, and third angle scene data MA1, MA2, and MA3. As previously described with reference to FIG. 19, scenes from the desired angled can be viewed by selecting one of the multiple angle data units MA1, MA2, and MA3. There is also no time gap between the common angle data BA1 and BA3 and the multiple angle data units MA1, MA2, and MA3.

In the case of an MPEG system stream, however, intermittent breaks in the playback information can result between the reproduced common and multiple angle data units depending upon the content of the data at the connection between the selected multiple angle data unit MA1, MA2, and MA3 and the first common angle data BA1 before the angle selected in the multi-angle scene period or the common angle data BA3 following the selected angle. The result in this case is that the title stream is not naturally reproduced as a single contiguous title, that is, seamless data reproduction is achieved but non-seamless information reproduction results.

The multi-angle selection process whereby one of plural scenes is selectively reproduced from the multi-angle scene period with seamless presentation of information before and after scene changes is described below with application in a DVD system using FIG. 10.

Changing the scene angle, that is, selecting one of the multiple angle data units MA1, MA2, and MA3, must be completed before reproduction of the preceding common angle data BA1 is completed. It is extremely difficult, for example, to change to a different angle data unit MA2 during reproduction of common angle data BA1. This is because the multimedia data has a variable length coded MPEG data structure, which makes it difficult to find the data break points (boundaries) in the selected data blocks. The video may also be disrupted when the angle is changed because inter-frame correlations are used in the coding process. The GOP processing unit of the MPEG standard contains at least one refresh frame, and closed processing not referencing frames belonging to another GOP is possible within this GOP processing unit.

In other words, if the desired angle data, for example, MA3, is selected before reproduction reaches the multi-angle scene period, and at the latest by the time reproduction of the preceding common angle data BA1 is completed, the angle data selected from within the multi-angle scene period can be seamlessly reproduced. However, it is extremely difficult while reproducing one angle to select and seamlessly reproduce another angle within the same multi-angle scene period. It is therefore difficult when in a multi-angle scene period to dynamically select a different angle unit presenting, for example, a view from a different camera angle.

<3.6.1> Flow Chart: Encoder

The encoding information table generated by the encoding system controller 200 based on the scenario data St7 is described below referring to FIG. 13.

The encoding information table contains VOB set data streams containing a plurality of VOB corresponding to the scene periods beginning and ending at the scene branching and connecting points, and VOB data streams corresponding to each scene. The VOB set data streams shown in FIG. 13 are described in detail below.

Figure 13:
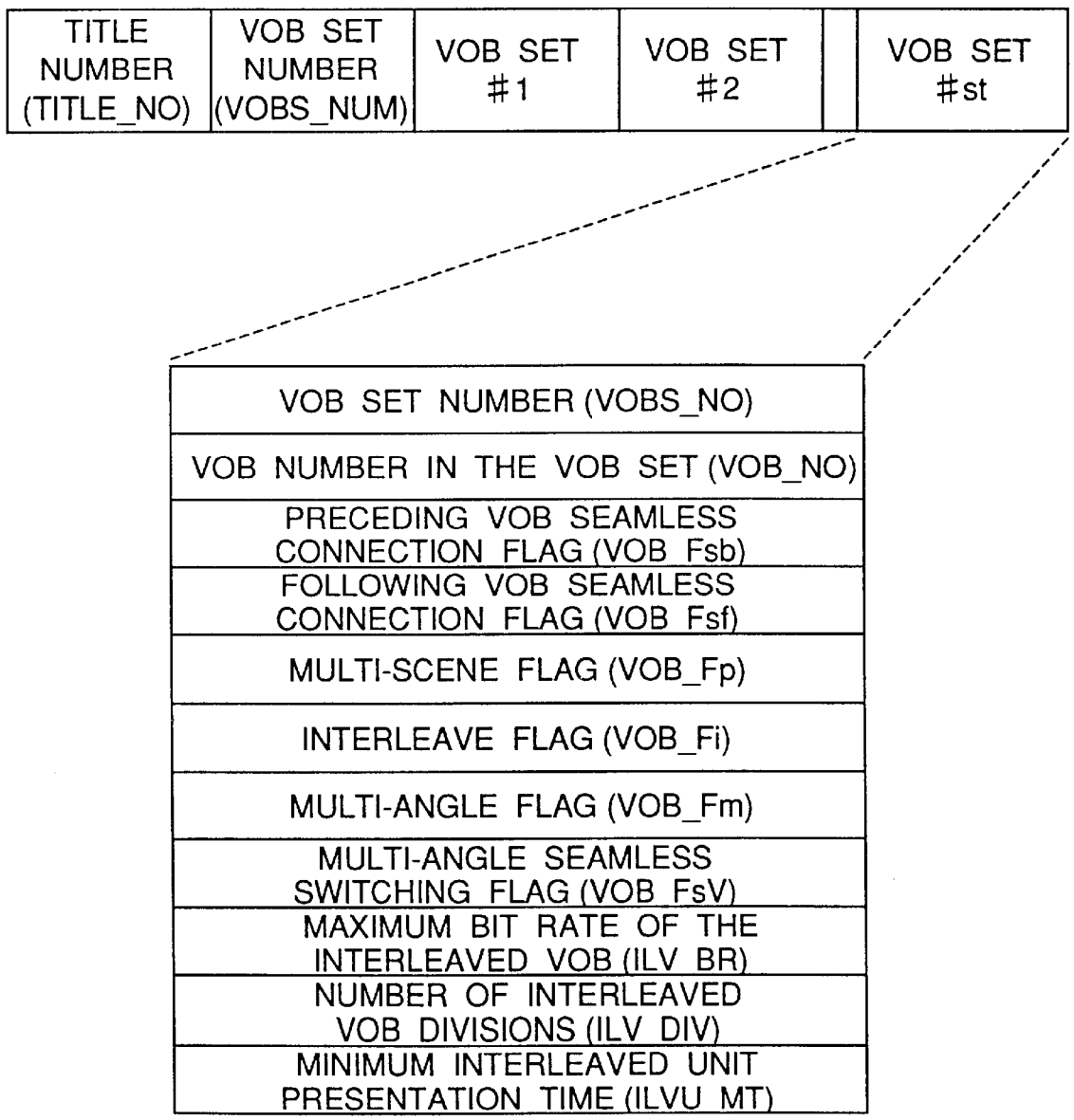
FIG. 13 is a typical diagram of a VOB set data sequence according to the present invention.
Figure 20:
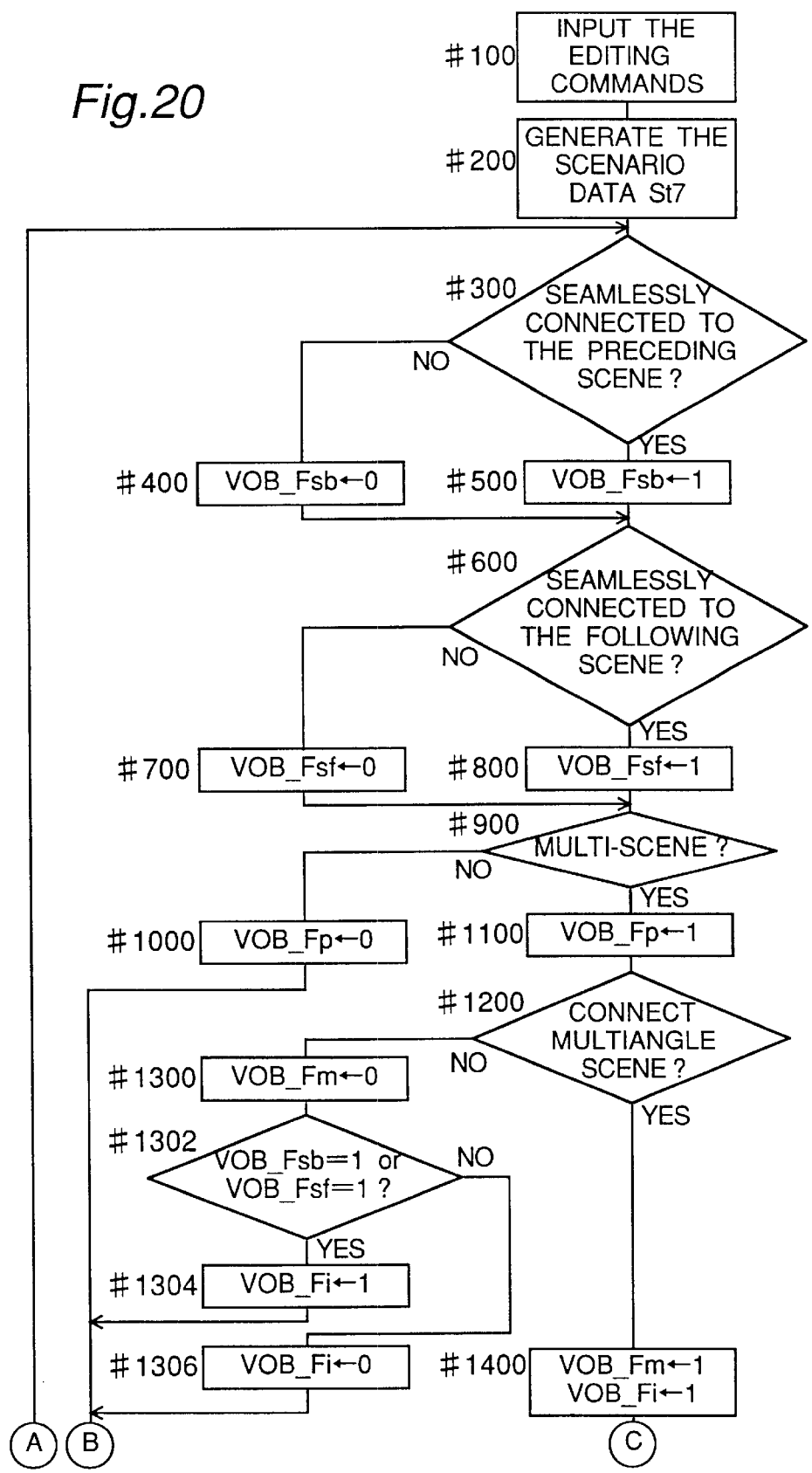
FIG. 20 is a flow chart showing a first part of an encoding control method according to the present invention.

Thee VOB set data streams shown in FIG. 13 are the encoding information tables generated at step #100 in FIG. 20 by the encoding system controller 200 for creating the DVD multimedia stream based on the user-defined title content.

The user-defined scenario contains branching points from common scenes to plural scenes, or connection points to other common scenes. The VOB corresponding to the scene period delimited by these branching and connecting points is a VOB set, and the data generated to encode a VOB set is the VOB set data stream. When a multiscene period is contained in a VOB set data stream, the title number specified by the VOB set data stream is the title number TITLE_NO of the VOB set data stream.

The VOB Set data structure in FIG. 13 shows the data content for encoding one VOB set in the VOB set data stream. The VOB set data structure comprises: the VOB set number VOBS_NO, the VOB number VOB_NO in the VOB set, the preceding VOB seamless connection flag VOB_Fsb, the following VOB seamless connection flag VOB_Fsf, the multi-scene flag VOB_Fp, the interleave flag VOB_Fi, the multi-angle flag VOB_Fm, the multi-angle seamless switching flag VOB_FsV, the maximum bit rate of the interleaved VOB ILV_BR, the number of interleaved VOB divisions ILV_DIV, and the minimum interleaved unit presentation time ILVU_MT.

The VOB set number VOBS_NO is a number identifying the VOB set, and is assigned based on the reproduction sequence of the title scenario.

The VOB number VOB_NO is a number identifying the VOB, and is assigned, for example, throughout a title scenario based on the reproduction sequence of the title scenario.

The preceding VOB seamless connection flag VOB_Fsb indicates whether a seamless connection with the preceding VOB is required for scenario reproduction.

The following VOB seamless connection flag VOB_Fsf indicates whether there is a seamless connection with the following VOB during scenario reproduction.

The multi-scene flag VOB_Fp identifies whether the VOB set comprises plural video objects VOB.

The interleave flag VOB_Fi identifies whether the VOB in the VOB set are interleaved.

The multi-angle flag VOB_Fm identifies whether the VOB set is a multi-angle set.

The multi-angle seamless switching flag VOB_FsV identifies whether angle changes within the multi-angle scene period are seamless or not.

The maximum bit rate of the interleaved VOB ILV_BR defines the maximum bit rate of the interleaved VOBs.

The number of interleaved VOB divisions ILV_DIV identifies the number of interleave units in the interleaved VOB.

The minimum interleave unit presentation time ILVU_MT defines the time that can be reproduced when the bit rate of the smallest interleave unit at which a track buffer data underflow state does not occur is the maximum bit rate of the interleaved VOB ILV_BR during interleaved block reproduction.

The encoding information table for each VOB generated by the encoding system controller 200 based on the scenario data St7 is described below referring to FIG. 14. The VOB encoding parameters described below and supplied to the video encoder 300, subpicture encoder 500, audio encoder 700, and system encoder 900 for stream encoding are produced based on this encoding information table.

Figure 14:
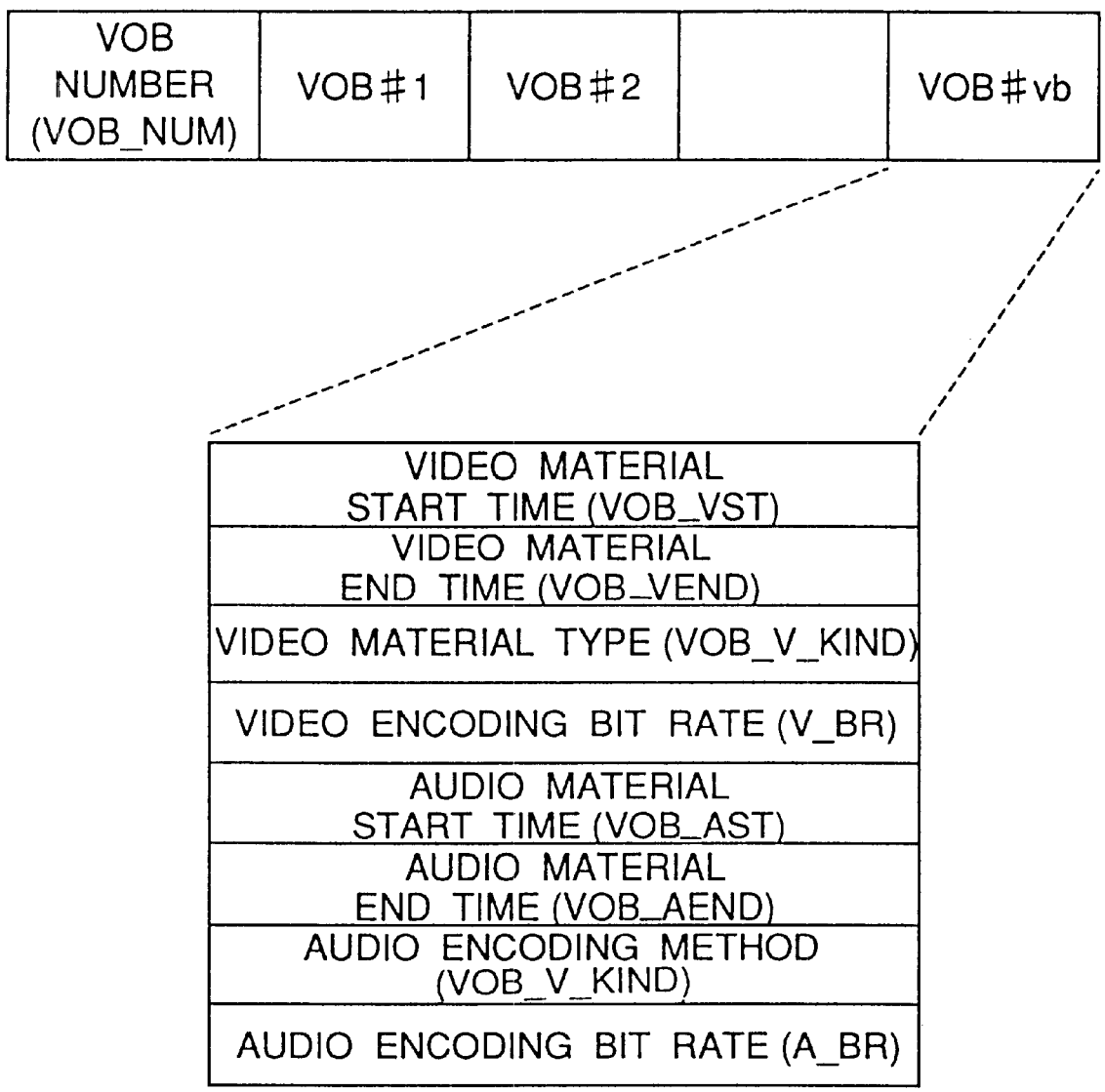
FIG. 14 is a typical diagram of a VOB data stream structure according to the present invention.

The VOB data streams shown in FIG. 14 are the encoding information tables generated at step #100 in FIG. 20 by the encoding system controller 200 for creating the DVD multimedia stream based on the user-defined title content.

The encoding unit is the video object VOB, and the data generated to encode each video object VOB is the VOB data stream. For example, a VOB set comprising three angle scenes comprises three video objects VOB. The data structure shown in FIG. 14 shows the content of the data for encoding one VOB in the VOB data stream.

The VOB data structure contains the video material start time VOB_VST, the video material end time VOB_VEND, the video signal type VOB_V_KIND, the video encoding bit rate V_BR, the audio material start time VOB_AST, the audio material end time VOB_AEND, the audio coding method VOB_A_KIND, and the audio encoding bit rate A_BR.

The video material start time VOB_VST is the video encoding start time corresponding to the time of the video signal.

The video material end time VOB_VEND is the video encoding end time corresponding to the time of the video signal.

The video material type VOB_V_KIND identifies whether the encoded material is in the NTSC or PAL format, for example, or is telecine-converted video material.

The video encoding bit rate V_BR is the bit rate at which the video signal is encoded.

The audio material start time VOB_AST is the audio encoding start time corresponding to the time of the audio signal.

The audio material end time VOB_AEND is the audio encoding end time corresponding to the time of the audio signal.

The audio coding method VOB_A_KIND identifies the audio encoding method as AC-3, MPEG, or linear PCM, for example.

The audio encoding bit rate A_BR is the bit rate at which the audio signal is encoded.

The encoding parameters supplied to the video, audio, and system encoders 300, 500 and 900 for VOB encoding are shown in FIG. 15. The encoding parameters include: the VOB number VOB_NO, video encoding start time V_STTM, video encoding end time V_ENDTM, the video encoding mode V_ENCMD, the video encoding bit rate V_RATE, the maximum video encoding bit rate V_MRATE, the GOP structure fixing flag GOP_FXflag, the video encoding GOP structure GOPST, the initial video encoding data V_INST, the last video encoding data V_ENDST, the audio encoding start time A_STTM, the audio encoding end time A_ENDTM, the audio encoding bit rate A_RATE, the audio encoding method A_ENCMD, the audio start gap A_STGAP, the audio end gap A_ENDGAP, the preceding VOB number B_VOB NO, and the following VOB number F_VOB NO.

The VOB number VOB_NO is a number identifying the VOB, and is assigned throughout the title scenario based on the position of the VOB in the reproduction sequence of the title scenario.

The video encoding start time V_STTM is the start time of video material encoding.

The video encoding end time V_ENDTM is the end time of video material encoding.

The video encoding mode V_ENCMD is an encoding mode for declaring whether reverse telecine conversion shall be accomplished during video encoding to enable efficient coding when the video material is telecine-converted material.

The video encoding bit rate V_RATE is the average bit rate of video encoding.

The maximum video encoding bit rate V_MRATE is the maximum bit rate of video encoding.

The GOP structure fixing flag GOP_FXflag specifies whether encoding is accomplished without changing the GOP structure in the middle of the video encoding process. This is a useful parameter for enabling seamless scene changing in a multi-angle scene period.

The video encoding GOP structure GOPST is the GOP structure data from encoding.

The initial video encoding data V_INST sets the initial value of the VBV buffer (decoding buffer) at the start of video encoding. This is a useful parameter for declaring seamless reproduction with the preceding video encoding stream.

The last video encoding data V_ENDST sets the end value of the VBV buffer (decoding buffer) at the end of video encoding. This is a useful parameter for declaring seamless reproduction with the following video encoding stream.

The audio encoding start time A_STTM is the start time of audio encoding.

The audio encoding end time A_ENDTM is the end time of audio encoding.

The audio encoding bit rate A_RATE is the bit rate used for audio encoding.

The audio encoding method A_ENCMD identifies the audio encoding method as AC-3, MPEG, or linear PCM, for example.

The audio start gap A_STGAP is the time offset between the start of the audio and video presentation at the beginning of a VOB. This is a useful parameter for declaring seamless reproduction with the preceding system encoding stream.

The audio end gap A_ENDGAP is the time offset between the end of the audio and video presentation at the end of a VOB. This is a useful parameter for declaring seamless reproduction with the following system encoding stream.

The preceding VOB number B_VOB_NO is the VOB_NO of the preceding VOB when there is a seamlessly connected preceding VOB.

The following VOB number F_VOB_NO is the VOB_NO of the following VOB when there is a seamlessly connected following VOB.

The operation of a DVD encoder ECD according to the present invention is described below with reference to the flow chart in FIG. 20 and FIG. 21. Note that the steps shown with a double line are subroutines. It should be obvious that while the present embodiment is described below with reference to a DVD system, the described operation also applies to an authoring encoder EC.

At step #100, the user inputs the editing commands using the editing information generator 100 according to the desired scenario while confirming the content of the multimedia source data streams St1, St2, and St3.

At step #200, the scenario editor 100 generates the scenario data St7 containing the above edit command information according to the users editing instructions.

When generating the scenario data St7 in step #200, the user editing commands related to multi-angle and parental lock multi-scene periods in which interleaving is presumed must be input to satisfy the following conditions.

First, the VOB maximum bit rate must be set to assure sufficient image quality, and the track buffer capacity, jump performance, jump time, and jump distance of the DVD decoder DCD assumed to be used as the reproduction apparatus of the DVD encoded data must be determined. Based on these values, the reproduction time of the shortest interleaved unit is obtained from equations 3 and 4.

Based on the reproduction time of each scene in the multi-scene period, it must then be determined whether equations 5 and 6 are satisfied. If equations 5 and 6 are not satisfied, the user must change the edit commands until equations 5 and 6 are satisfied by, for example, connecting part of the following scene to each scene in the multi-scene period.

When multi-angle edit commands are used, equation 7 must be satisfied for seamless switching, and edit commands matching the audio reproduction time with the reproduction time of each scene in each angle must be entered. If non-seamless switching is used, the user must enter commands to satisfy equation 8.

At step #300, the encoding system controller 200 first determines whether the target scene is to be seamlessly connected to the preceding scene based on the scenario data St7.

A seamless connection refers to seamlessly connecting the common scene that is the presently selected target scene with any one scene selected from all scenes contained in a preceding multi-scene period when the preceding scene period is a multi-scene period comprising a plurality of scenes. Likewise, when the presently selected target scene is a multi-scene period, a seamless connection still refers to seamlessly connecting the target scene with any one of the scenes from the multi-scene period.

If step #300 returns NO, that is, the connection is non-seamless, the procedure moves to step #400.

At step #400, the encoding system controller 200 resets the preceding VOB seamless connection flag VOB_Fsb indicating whether there is a seamless connection between the target and preceding scenes. The procedure then moves to step #600.

On the other hand, if step #300 returns YES, that is, there is a seamless connection to the preceding scene, the procedure moves to step #500.

At step #500 the preceding VOB seamless connection flag VOB_Fsb is set. The procedure then moves to step #600.

At step #600 the encoding system controller 200 determines whether there is a seamless connection between the target and following scenes based on scenario data St7. If step #600 returns NO, that is, the connection is non-seamless, the procedure moves to step #700.

At step #700, the encoding system controller 200 resets the following VOB seamless connection flag VOB_Fsf indicating whether there is a seamless connection with the following scene. The procedure then moves to step #900.

However, if step #600 returns YES, that is, there is a seamless connection to the following scene, the procedure moves to step #800.

At step #800 the encoding system controller 200 sets the following VOB seamless connection flag VOB_Fsf. The procedure then moves to step #900.

At step #900 the encoding system controller 200 determines whether there is more than one connection target scene, that is, whether a multi-scene period is selected, based on the scenario data St7. As previously described, there are two possible control methods in multi-scene periods: parental lock control whereby only one of plural possible reproduction paths that can be constructed from the scenes in the multi-scene period is reproduced, and multi-angle control whereby the reproduction path can be switched within the multi-scene period to present different viewing angles.

If step #900 returns NO, that is, the connection is not between multiple scenes, the procedure moves to step #1000.

At step #1000 the multi-scene flag VOB_Fp identifying whether a multi-scene period is selected is reset, and the procedure moves to step #1800 for encoding parameter generation. The operation of step #1800 is described below.

However, if step #900 returns YES, that is, there is a multi-scene connection, the procedure moves to step #1100.

At step #1100, the multi-scene flag VOB_Fp is set, and the procedure moves to step #1200 where a multi-angle connection is evaluated.

At step #1200 it is determined whether a change can be made between plural scenes in the multi-scene period, that is, whether a multi-angle scene period is selected. If step #1200 returns NO, that is, no scene change is allowed in the multi-scene period as parental lock control reproducing only one reproduction path has been selected, the procedure moves to step #1300.

At step #1300 the multi-angle flag VOB_Fm identifying whether the target connection scene is a multi-angle scene is reset, and the procedure moves to step #1302.

At step #1302 it is determined whether either the preceding VOB seamless connection flag VOB_Fsb or following VOB seamless connection flag VOB_Fsf is set. If step #1302 returns YES, that is, the target connection scene seamlessly connects to the preceding, the following, or both the preceding and following scenes, the procedure moves to step #1304.

At step #1304 the interleave flag VOB Fi identifying whether the VOB, the encoded data of the target scene, is interleaved is set. The procedure then moves to step #1800.

However, if step #1302 returns NO, that is, the target connection scene does not seamlessly connect to the preceding or following scene, the procedure moves to step #1306.

At step #1306 the interleave flag VOB_Fi is reset, and the procedure moves to step #1800.

If step #1200 returns YES, however, that is, there is a multi-angle connection, the procedure moves to step #1400.

At step #1400, the multi-angle flag VOB_Fm and interleave flag VOB_Fi are set, and the procedure moves to step #1500.

At step #1500 the encoding system controller 200 determines whether the audio and video can be seamlessly switched in a multi-angle scene period, that is, at a reproduction unit smaller than the VOB, based on the scenario data St7. If step #1500 returns NO, that is, non-seamless switching occurs, the procedure moves to step #1600.

At step #1600 the multi-angle seamless switching flag VOB_FsV indicating whether angle changes within the multi-angle scene period are seamless or not is reset, and the procedure moves to step #1800.

However, if step #1500 returns YES, that is, seamless switching occurs, the procedure moves to step #1700.

At step #1700 the multi-angle seamless switching flag VOB_FsV is set, and the procedure moves to step #1800.

Therefore, as thus described, the procedure advances to step #1800 after the editing information is detected from the above flag settings in the scenario data St7 reflecting the user-defined editing instructions.

In step #1800, based on the user-defined editing instructions detected from the above flag settings, information is added to the encoding information tables for the VOB Set units and VOB units shown in FIG. 13 and FIG. 14 for source stream encoding, and the encoding parameters of the VOB data units shown in FIG. 15 are produced. The procedure then moves to step #1900.

The encoding parameter generation step is described in greater detail below referring to FIG. 22, FIG. 23, FIG. 24, and FIG. 25.

Based on the encoding parameters produced in step #1800, the video data and audio data are encoded in step #1900, and the procedure moves to step #2000.

Note that the subpicture data is normally inserted during video reproduction on an as-needed basis, and contiguity with the preceding and following scenes is therefore not usually necessary. Moreover, the subpicture data is normally video information for one frame, and unlike audio and video data having an extended time-base, subpicture data is usually static, and is not normally presented for a sustained period. Therefore, because the present invention relates specifically to seamless and non-seamless contiguous reproduction as described above, description of subpicture data encoding is omitted herein for simplicity.

Step #2000 causes the loop comprising step #300 to step #1900 to be repeated as many times as there are VOB Sets. This loop formats the program chain VTS_PGC#i to contain the reproduction sequence and other reproduction information for each VOB in the title (FIG. 5) in the program chain data structure, interleaves the VOBs in the multi-scene periods, and completes the VOB Set data stream and VOB data stream needed for system stream encoding. The procedure then moves to step #2100.

At step #2100, the total number of VOB Sets VOBS_NUM obtained as a result of the loop through step #2000 is added to the VOB Set data stream, the number of titles TITLE_NO defining the number of scenario reproduction paths as the number of titles in the scenario data St7 is set, and the VOB Set data stream is completed as the encoding information table. The procedure then moves to step #2200.

System stream encoding producing the VOB (VOB#i) data in the VTS title VOBS (VTSTT_VOBS) (FIG. 5) is accomplished in step #2200 based on the encoded video stream and encoded audio stream output from step #1900, and the encoding parameters in FIG. 15. The procedure then moves to step #2300.

At step #2300, the VTS information, VTSI management table VTSI_MAT, VTSPGC information table VTSPGCIT, and the program chain information VTS_PGCI#i controlling the VOB data reproduction sequence shown in FIG. 5 are produced, and formatting to, for example, interleave the VOB contained in the multi-scene periods, is accomplished. The specific steps executed in this formatting operation are described below with reference to FIG. 27, FIG. 28, FIG. 29, FIG. 30, and FIG. 31.

Figure 21:
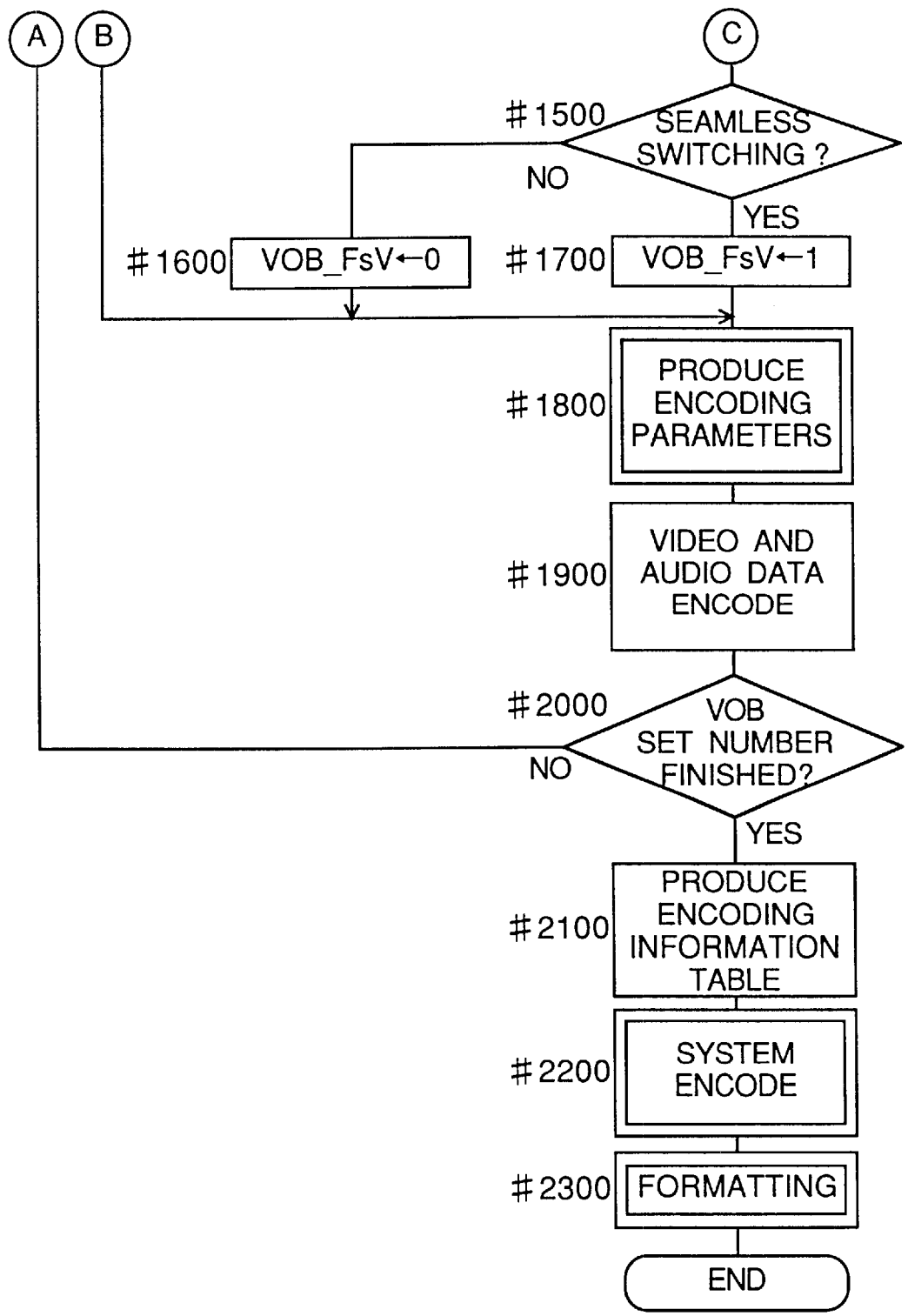
FIG. 21 is a flow chart showing a second part of the encoding control method according to the present invention shown in FIG. 20.
Figure 23:
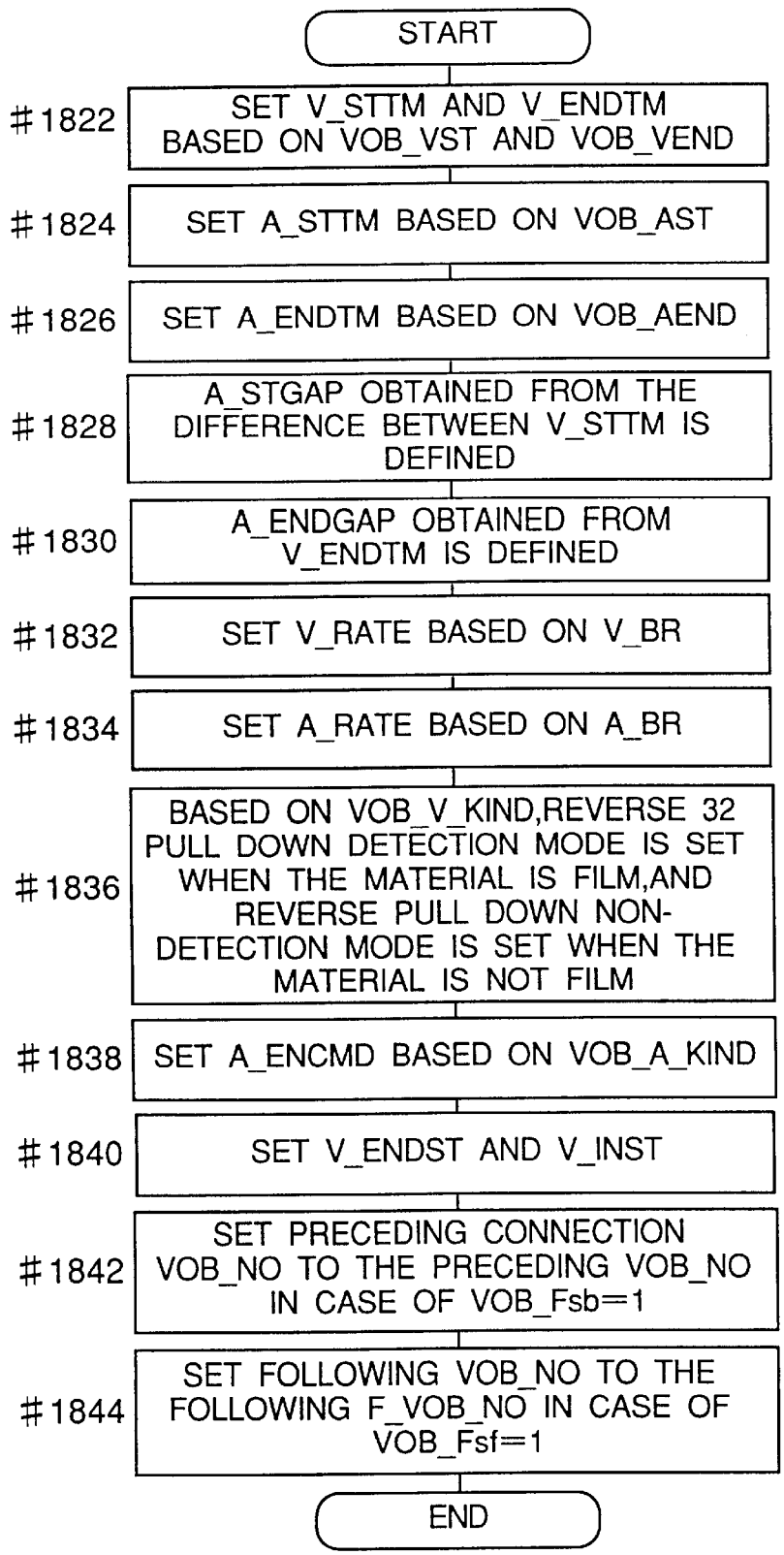
FIG. 23 is a flow chart showing the detailed operation of the common VOB data setting routine shown in FIG. 22.
Figure 24:
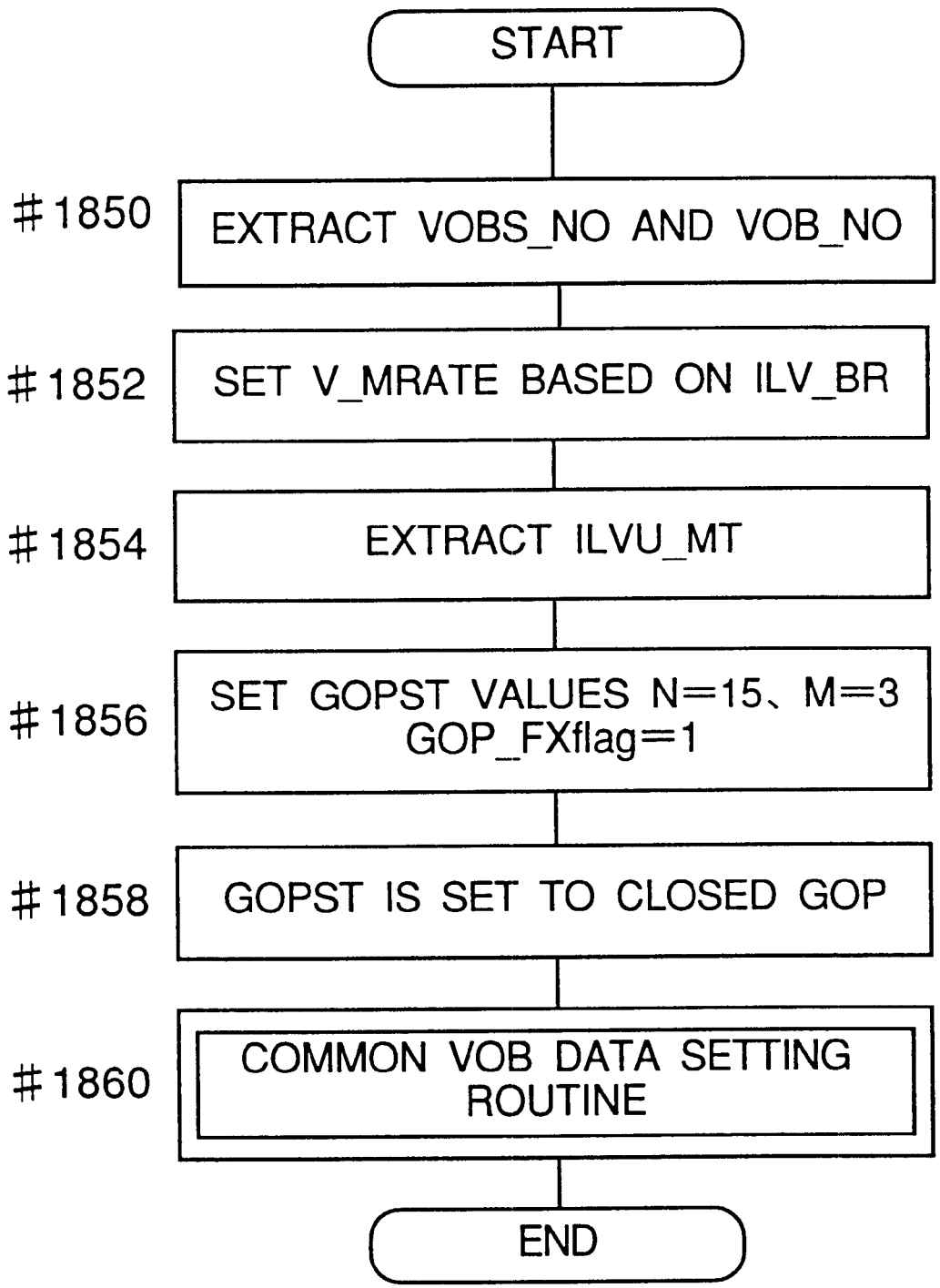
FIG. 24 is a flow chart showing the encoding parameter generation process for a seamless switching stream in multi-angle control.

The encoding parameter generation subroutine shown as step #1800 in FIG. 21 is described next with reference to FIG. 22, FIG. 23, and FIG. 24, using by way of example an operation for generating the encoding parameters for multi-angle control.

Figure 22:
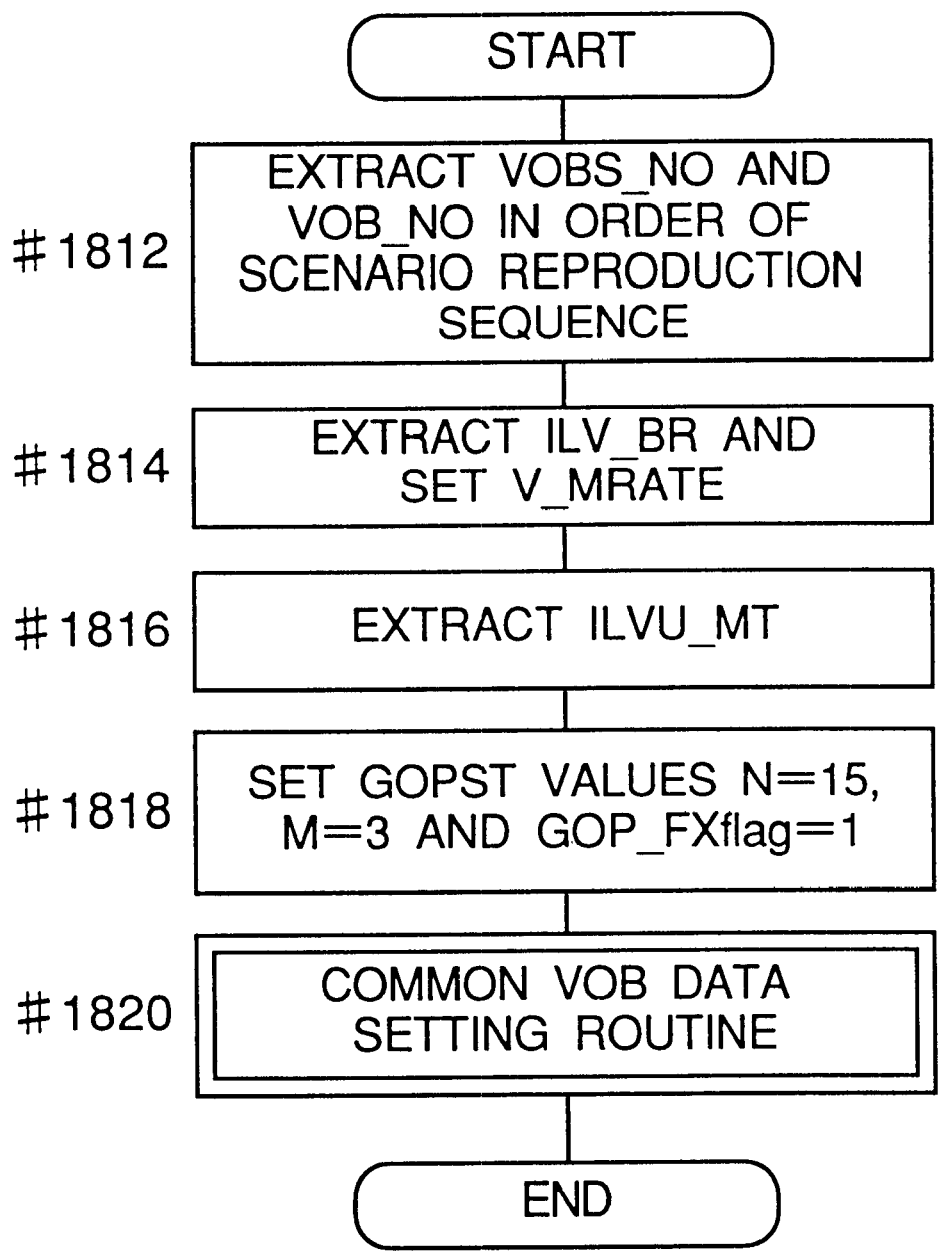
FIG. 22 is a flow chart showing the encoding parameter generation process for a non-seamless switching stream in multi-angle control.

Starting from FIG. 22, the process for generating the encoding parameters of a non-seamless switching stream with multi-angle control is described first. This stream is generated when step #1500 in FIG. 21 returns NO and the following flags are set as shown: VOB_Fsb=1 or VOB_Fsf=1, VOB_Fp=1, VOB_Fi=1, VOB_Fm =1, and VOB_FsV=0. The following operation produces the encoding information tables shown in FIG. 13 and FIG. 14, and the encoding parameters shown in FIG. 15.

At step #1812, the scenario reproduction sequence contained in the scenario data St7 is extracted, the VOB Set number VOBS_NO is set, and the VOB number VOB_NO is set for one or more VOB in the VOB Set.

At step #1814 the maximum bit rate ILV_BR of the interleaved VOB is extracted from the scenario data St7, and the maximum video encoding bit rate V_MRATE from the encoding parameters is set based on the interleave flag VOB_Fi setting (=1).

At step #1816, the minimum interleaved unit presentation time ILVU_MT is extracted from the scenario data St7.

At step #1818, the video encoding GOP structure GOPST values N=15 and M=3 are set, and the GOP structure fixing flag GOPFXflag is set (=1), based on the multi-angle flag VOB_Fp setting (=1).

Step #1820 is the common VOB data setting routine.

The common VOB data setting routine in step #1820 is described below referring to the flow chart in FIG. 23. This common VOB data setting routine produces the encoding information tables shown in FIG. 13 and FIG. 14, and the encoding parameters shown in FIG. 15.

At step #1822 the video material start time VOB_VST and video material end time VOB_VEND are extracted for each VOB from the scenario data St7, and the video encoding start time V_STTM and video encoding end time V_ENDTM are used as video encoding parameters.

At step #1824 the audio material start time VOB_AST of each VOB is extracted from the scenario data St7, and the audio encoding start time A_STTM is set as an audio encoding parameter.

At step #1826 the audio material end time VOB AEND is extracted for each VOB from the scenario data St7, and the audio encoding end time A_ENDTM, which is an audio encoding parameter, is set to a time of an audio access unit (AAU) not exceeding the VOB_AEND time. Note that the audio access unit AAU is determined by the audio encoding method.

At step #1828 the audio start gap A_STGAP obtained from the difference between the video encoding start time V_STTM and the audio encoding start time A_STTM is defined as a system encoding parameter.

At step #1830 the audio end gap A_ENDGAP obtained from the difference between the video encoding end time V_ENDTM and the audio encoding end time A_ENDTM is defined as a system encoding parameter.

At step #1832 the video encoding bit rate V_BR is extracted from the scenario data St7, and the video encoding bit rate V_RATE, which is the average bit rate of video encoding, is set as a video encoding parameter.

At step #1834 the audio encoding bit rate A_BR is extracted from the scenario data St7, and the audio encoding bit rate A RATE is set as an audio encoding parameter.

At step #1836 the video material type VOB_V_KIND is extracted from the scenario data St7. If the material is film, that is, a telecine converted material, reverse telecine conversion is set for the video encoding mode V_ENCMD, and defined as a video encoding parameter.

At step #1838 the audio encoding method VOB_A_KIND is extracted from the scenario data St7, and the encoding method is set as the audio encoding ode A_ENCMD and set as an audio encoding parameter.

At step #1840 the initial value of the initial video encoding data V_INST set in the VBV buffer is set to a value less than the VBV buffer end value of the last video encoding data V_ENDST, and is defined as a video encoding parameter.

At step #1842 the VOB number VOB_NO of the preceding connection is set to the preceding VOB number B_VOB_NO based on the setting (=1) of the preceding VOB seamless connection flag VOB_Fsb, and set as a system encoding parameter.

At step #1844 the VOB number VOB_NO of the following connection is set to the following VOB number F_VOB_NO based on the setting (=1) of the following VOB seamless connection flag VOB_Fsf, and set as a system encoding parameter.

The encoding information table and encoding parameters are thus generated for a multi-angle VOB Set with non-seamless multi-angle switching control enabled.

The process for generating the encode parameters of a seamless switching stream with multi-angle control is described below with reference to FIG. 24. This stream is generated when step #1500 in FIG. 21 returns YES and the following flags are set as shown: VOB_Fsb=1 or VOB_Fsf=1, VOB_Fp=1, VOB_Fi=1, VOB_Fm=1, and VOB_FsV =1.

The following operation produces the encoding information tables shown in FIG. 13 and FIG. 14, and the encode parameters shown in FIG. 15.

At step #1850, the scenario reproduction sequence contained in the scenario data St7 is extracted, the VOB Set number VOBS_NO is set, and the VOB number VOB_NO is set for one or more VOB in the VOB Set.

At step #1852 the maximum bit rate ILV_BR of the interleaved VOB is extracted from the scenario data St7, and is set to the maximum video encoding bit rate V_RATE based on the interleave flag VOB_Fi setting (=1).

At step #1854, the minimum interleaved unit presentation time ILVU_MT is extracted from the scenario data St7.

At step #1856, the video encoding GOP structure GOPST values N=15 and M=3 are set, and the GOP structure fixing flag GOP_FXflag is set (=1), based on the multi-angle flag VOB_Fp setting (=1).

At step #1858, the video encoding GOP structure GOPST is set to "closed GOP" based on the seamless switching flag VOB_FsV setting (=1), and the video encoding parameters are thus defined.

Step #1860 is the common VOB data setting routine. This common routine is the routine shown in FIG. 22, and has already been described. Further description thereof is thus omitted here.

The encode parameters of a seamless switching stream with multi-angle control are thus defined for a VOB Set with multi-angle control as described above.

Figure 25:
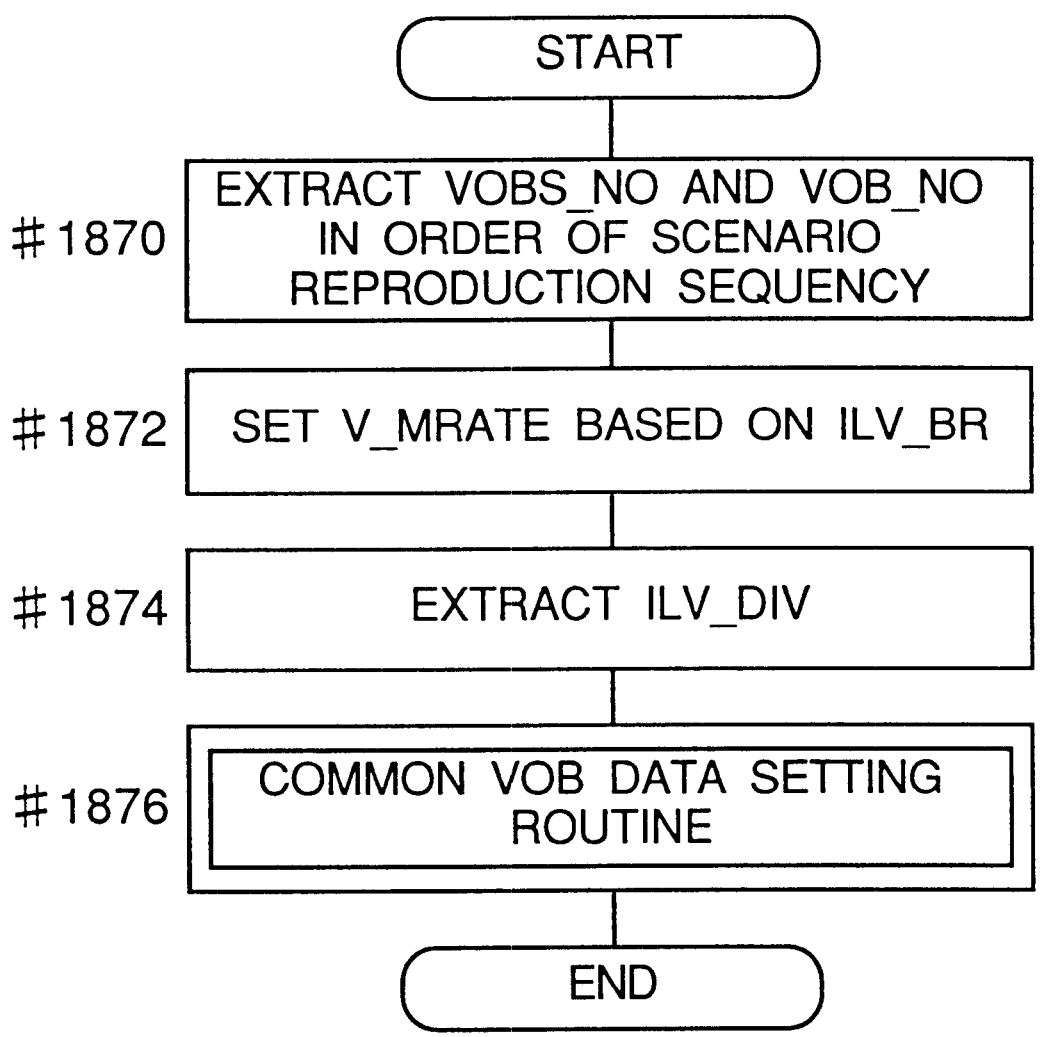
FIG. 25 is a flow chart showing the encoding parameter generation process for parental lock control.

The process for generating the encode parameters for a system stream in which parental lock control is implemented is described below with reference to FIG. 25. This stream is generated when step #1200 in FIG. 20 returns NO and step #1304 returns YES, that is, the following flags are set as shown: VOB_Fsb=1 or VOB_Fsf=1, VOB_Fp=1, VOB_Fi=1, VOB_Fm=0.

The following operation generates the encoding information tables shown in FIG. 13 and FIG. 14, and the encode parameters shown in FIG. 15.

At step #1870, the scenario reproduction sequence contained in the scenario data St7 is extracted, the VOB Set number VOBS_NO is set, and the VOB umber VOB_NO is set for one or more VOB in the VOB Set.

At step #1872 the maximum bit rate ILV_BR of the interleaved VOB is extracted from the scenario data St7, and the maximum video encoding bit rate V_RATE is set based on the interleave flag VOB_Fi setting (=1).

At step #1874 the number of interleaved VOB divisions ILV_DIV is extracted from the scenario data St7.

Step #1876 is the common VOB data setting routine. This common routine is the routine shown in FIG. 22, and has already been described. Further description thereof is thus omitted here.

The encode parameters of a system stream in which parental lock control is implemented are thus generated for a VOB Set with multi-scene selection control enabled as described above.

Figure 26:
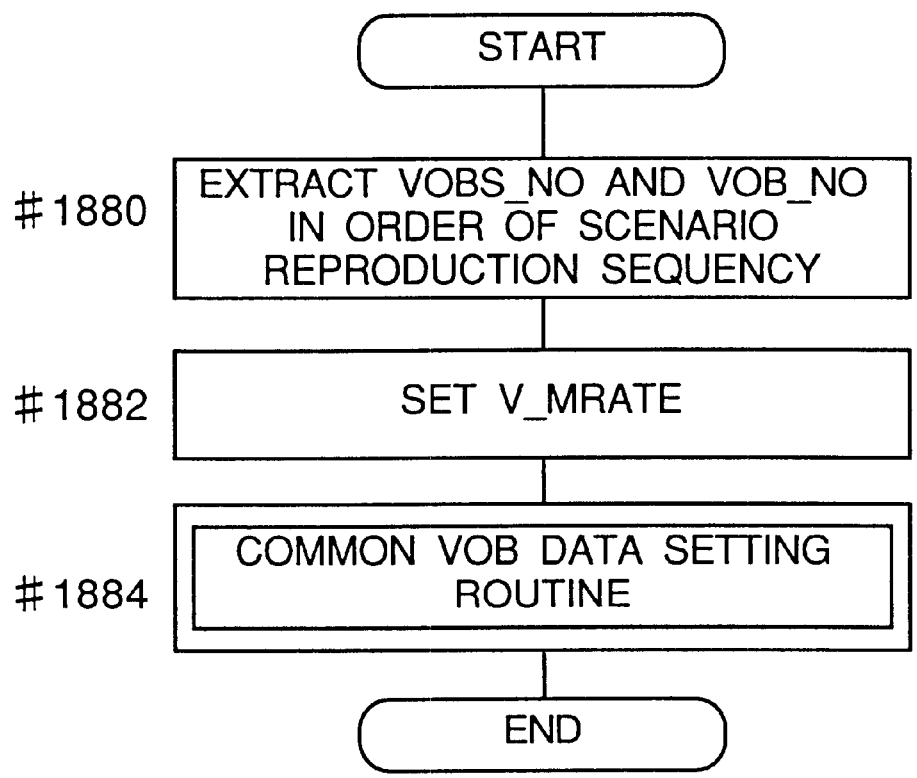
FIG. 26 is a flow chart showing the encoding parameter generation process for a single scene.

The process for generating the encode parameters for a system stream containing a single scene is described below with reference to FIG. 26. This stream is generated when step #900 in FIG. 20 returns NO, that is, when VOB_Fp=0. The following operation produces the encoding information tables shown in FIG. 13 and FIG. 14, and the encode parameters shown in FIG. 15.

At step #1880, the scenario reproduction sequence contained in the scenario data St7 is extracted, the VOB Set number VOBS_NO is set, and the VOB number VOB_NO is set for one or more VOB in the VOB Set.

At step #1882 the maximum bit rate ILV_BR of the interleaved VOB is extracted from the scenario data St7, and the maximum video encoding bit rate V_MRATE is set based on the interleave flag VOB_Fi setting (=1).

Step #1884 is the common VOB data setting routine. This common routine is the routine shown in FIG. 22, and has already been described. Further description thereof is thus omitted here.

The encoding parameters for DVD video, audio, and system stream encoding, and the DVD formatter, are thus generated as a result of generating the encoding information table and encode parameters by means of the flow charts described above.

<3.6.2> Formatter Flow Chart Descriptions

The operation of the formatter subroutine for generating a DVD multimedia stream shown as step #2300 in FIG. 21 is described next with reference to FIG. 27, FIG. 28, FIG. 29, FIG. 30, and FIG. 31.

The operation of the DVD encoder ECD 1100 according to the present invention is described with reference to the flow chart in FIG. 27. Note that those steps shown with a double line are subroutines.

At step #2310 the program chain information VTSI_PGCI is set to the video title set management table VTSI_MAT in the VTSI for the number of titles TITLE_NUM based on the number of titles TITLE_NUM in the VOB Set data stream.

At step #2312 it is determined whether multi-scene selection control is enabled based on the multi-scene flag VOB_Fp in the VOB Set data stream. If step #2312 returns NO, that is, multi-scene control is not enabled, the procedure moves to step #2314.

Step #2314 represents a subroutine of the operation of formatter 1100 of the authoring encoder EC shown in FIG. 12 for encoding a single VOB. This subroutine is described later.

If step #2312 returns YES, that is, multi-scene control is enabled, the procedure moves to step #2316.

At step #2316 it is determined whether the information is to be interleaved or not based on the interleave flag VOB Fi in the VOB Set data stream. If step #2316 returns NO, that is, the information is not to be interleaved, the procedure moves to step #2314.

At step #2318 it is determined whether multi-angle control is to be implemented based on the multi-angle flag VOB_Fm in the VOB Set data stream. If step #2318 returns NO, that is, multi-angle control is not enabled, the parental lock control routine in step #2320 is executed.

Figure 30:
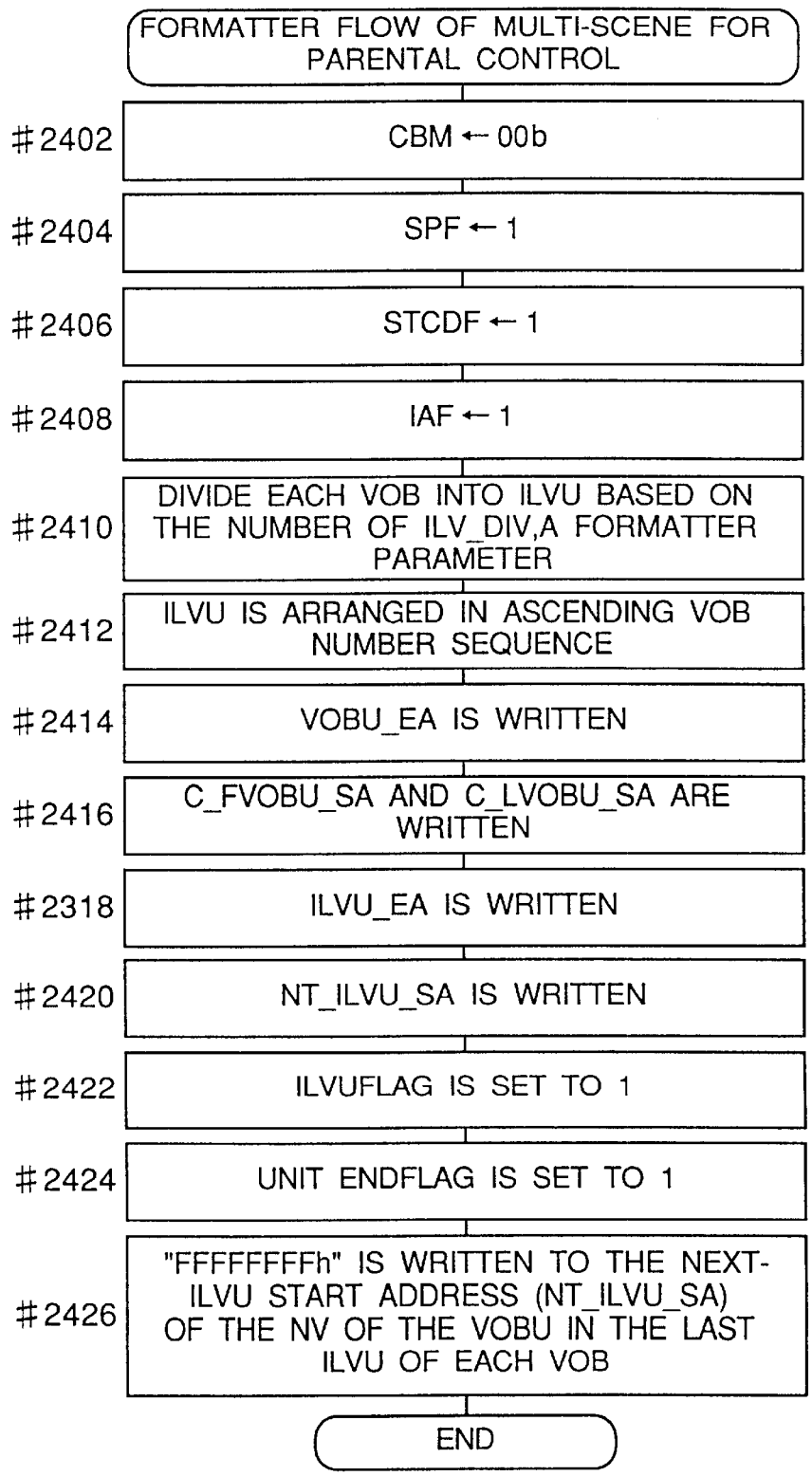
FIG. 30 is a flow chart of the operation of a formatter for parental lock control according to the present invention shown in FIG. 12.

At step #2320 the operation for formatting the VOB Set for parental lock control is executed. This subroutine is shown in FIG. 30 and described below.

If step #2318 returns YES, that is, multi-angle control is enabled, the procedure advances to step #2322.

At step #2322 it is determined whether seamless switching is required based on the multi-angle seamless switching flag VOB_FsV. If multi-angle switching is accomplished without seamless switching, that is, with non-seamless switching and step #2322 returns NO, the procedure moves to step #2326.

The multi-angle non-seamless switching control routine executed in step #2326 by the formatter 1100 of the authoring encoder EC in FIG. 12 is described later with reference to FIG. 28.

If multi-angle switching is accomplished with seamless switching control, that is, step #2322 returns YES, the procedure moves to step #2324.

The multi-angle seamless switching control routine executed in step #2324 by the formatter 1100 is described later with reference to FIG. 29.

The cell playback information CPBI set in a previous routine is recorded as the CPBI information of the VTSI in step #2328.

At step #2330 it is determined whether all VOB Sets declared by the VOB Set number have not been processed, control proceeds to step #2312.

If step #2330 returns YES, that is, all sets have been formatted, the procedure terminates.

Figure 27:
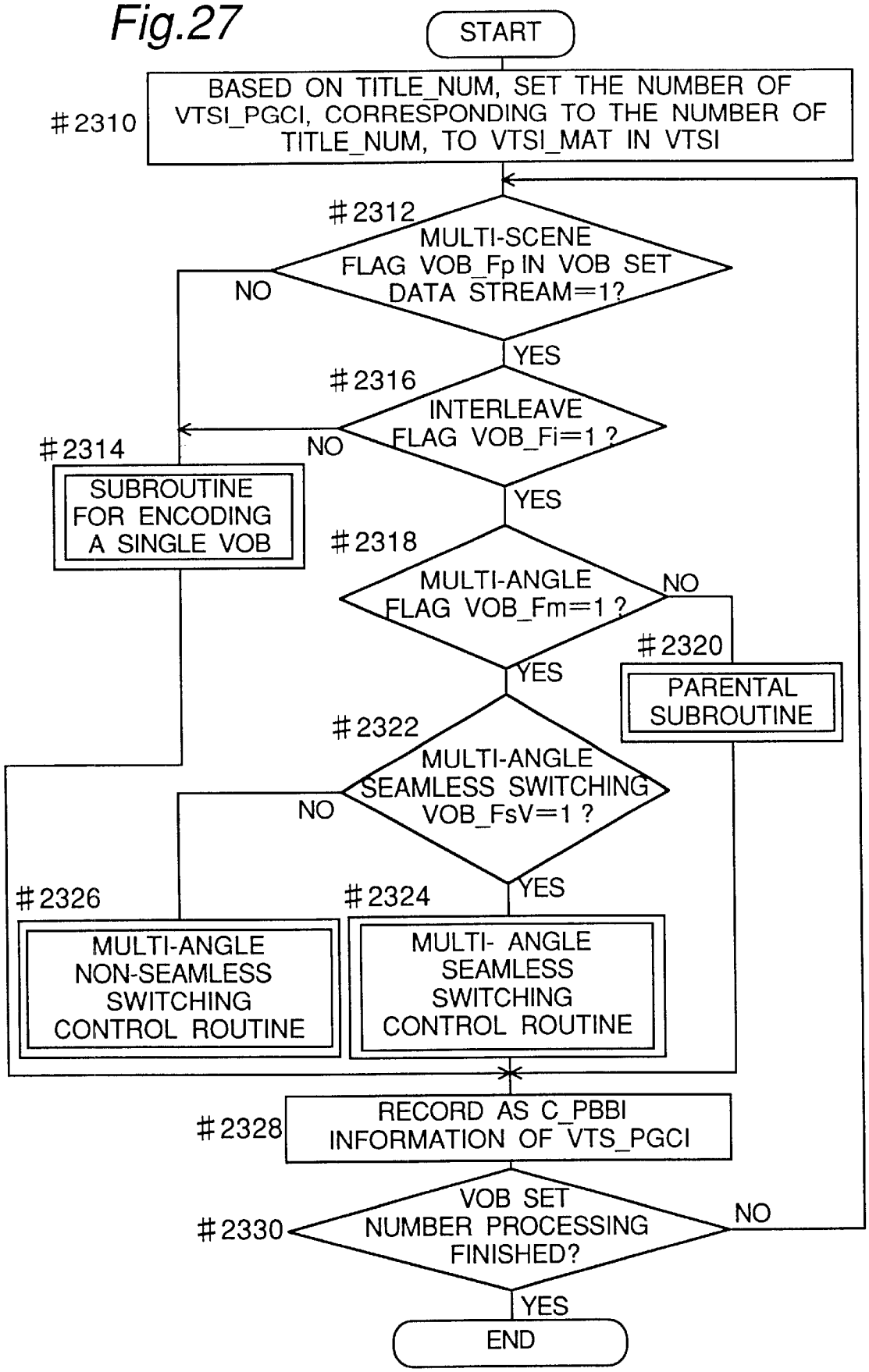
FIG. 27 is a flow chart of the operation of a DVD encoder according to the present invention shown in FIG. 12.
Figure 28:
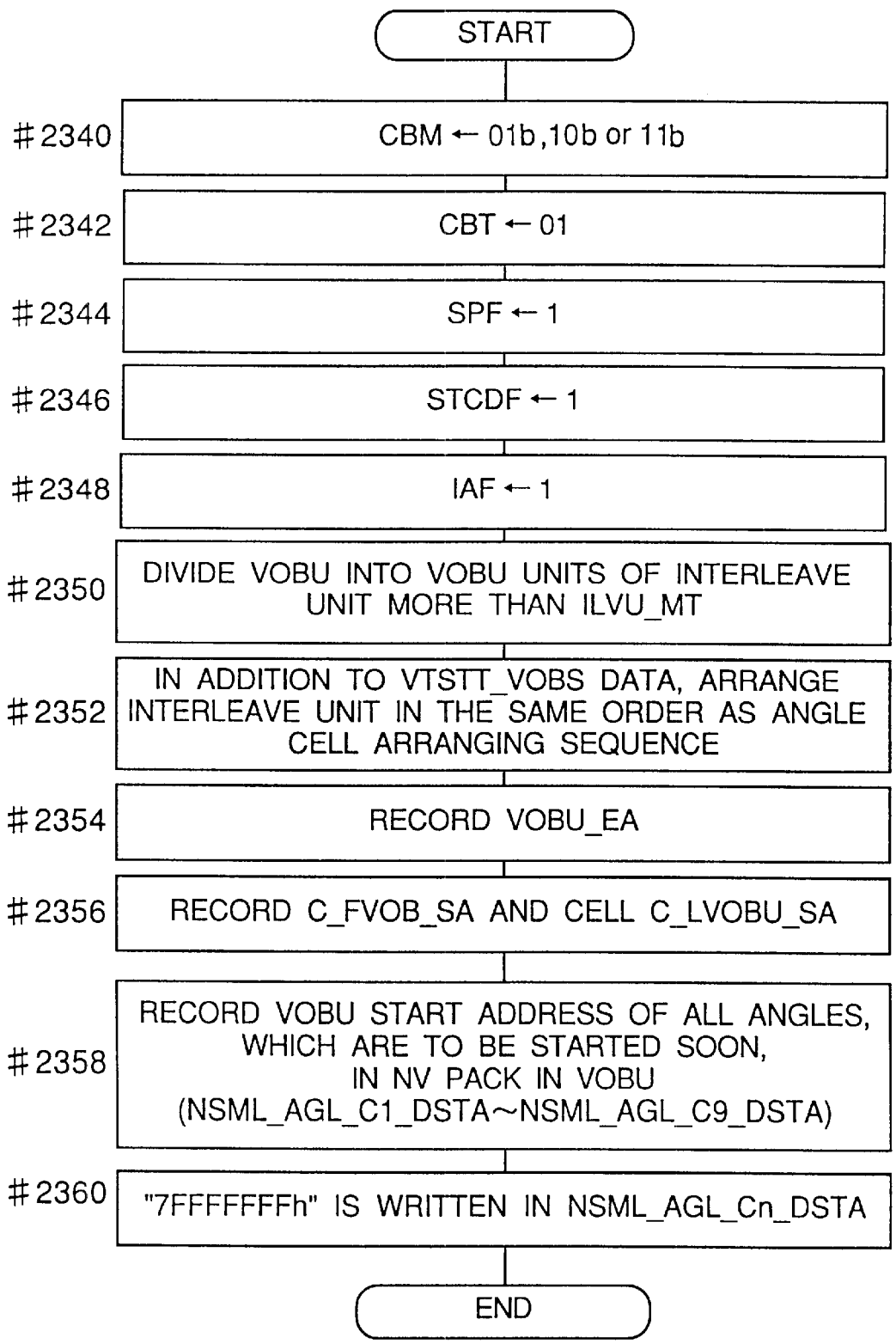
FIG. 28 is a flow chart of the operation of a formatter for non-seamless switching multi-angle control according to the present invention shown in FIG. 12.

Referring to FIG. 28, the multi-angle non-seamless switching control routine executed in step #2326 when step #2322, FIG. 27, returns NO is described. This routine defines the interleaved arrangement of the multimedia bitstream, the content of the cell playback information (C_PBI#i) shown in FIG. 5, and the information stored to the navigation pack NV shown in FIG. 8, in the generated DVD multimedia bitstream.

At step #2340 based on the multi-angle flag VOB_Fm setting (=1) declaring whether multi-angle control is applied in the multi-scene period, the cell block mode CBM (FIG. 5) of the cell (C_PBI #i in FIG. 5) containing the VOB control information for each scene is recorded using such values as 01b to indicate the beginning of the cell block for the cell block mode CBM of the MA1 cell (FIG. 10), 10b to indicate a cell between the first and last cells in the block for the CBM of MA2, and 11b to indicate the end of the cell block for the CBM of MA3.

At step #2342 based on the multi-angle flag VOB_Fm setting (=1) declaring whether multi-angle control is applied in the multi-scene period, the cell block type CBT (FIG. 5) of the cell playback information blocks C_PBI #i containing the VOB control information for each scene is declared as 01b to indicate an "angle."

At step #2344 the seamless playback flag SPF (FIG. 5) is set to 1 in the cell playback information blocks C_PBI #i containing the VOB control information for each scene based on VOB_Fsb, which indicates whether the connection is seamless and is set to 1.

At step #2346 the STC discontinuity flag STCDF (FIG. 5) is set to 1 in the cell playback information blocks C_PBI #i (FIG. 5) containing the VOB control information for each scene based on VOB_Fsb, which indicates whether the connection is seamless and is set to 1.

At step #2348 the interleaved allocation flag IAF (FIG. 5) is set to 1 in the cell playback information blocks C_PBI #i (FIG. 5) containing the VOB control information for each scene based on VOB_FsV, which is set to 1 to indicate interleaving is required.

At step #2350 the location of the navigation pack NV (relative sector number from the VOB beginning) is detected from the title editing unit (VOB below) obtained from the system encoder 900 in FIG. 12, the navigation pack NV is detected based on the minimum interleaved unit presentation time ILVU_MT information (a formatter parameter obtained in step #1816, FIG. 21), the location of the VOBU expressed, for example, as the number of sectors from the VOB beginning is thus obtained, and the title editing unit VOB is divided into interleave units using VOBU units.

For example, in this example the minimum interleaved unit presentation time ILVU_MT is 2 sec and the presentation time of one VOBU is 0.5 sec., and the VOB is therefore divided into interleave units of 4 VOBU each. Note that this allocation operation is applied to the VOB constituting each multi-scene data unit.

At step #2352 the interleave units of each VOB obtained from step #2350 are arranged in the cell block mode CBM sequence (cell block beginning, middle, and end cells) written as the VOB control information for each scene in step #2340 to form the interleaved blocks as shown in FIG. 18 or FIG. 34. The interleaved blocks are then added to the VTS title VOBS (VTSTT_VOBS). Using the cell block mode CBM declarations above, for example, the angle data MA1, MA2, and MA3 (FIG. 10) are arranged in that sequence.

At step #2354 the relative sector number from the VOBU start is written to the VOB end pack address VOBU-EA (FIG. 8) in the navigation pack NV of each VOBU based on the VOBU position information obtained in step #2350.

At step #2356 the first cell VOBU start address C_FVOBU_SA and the last cell VOBU start address C_LVOBU_SA expressed as the number of sectors from the beginning of the VTS title VOBS (VTSTT_VOBS) are written as the addresses of the navigation packs NV of the first and last VOBU in each cell based on the VTS title VOBS (VTSTT_VOBS) data obtained in step #2352.

The angle #i VOBU start address NSML_AGL_C1_DSTA to NSML_AGL_C9_DSTA of the non-seamless angle information NSML_AGLI (FIG. 8) in the navigation pack NV of each VOBU is written at step #2358. This address is expressed as the relative sector number inside the data of the interleaved blocks formed in step #2352, and declares the address information of the navigation pack NV contained in the VOBU of all angle scenes near the presentation start time of the VOBU being processed.

At step #2360 "7FFFFFFFh" is written to the angle #i VOBU start address NSML_AGL_C1_DSTA to NSML_AGL_C9_DSTA (FIG. 8) of the non-seamless angle information NSML_AGLI (FIG. 8) in the navigation pack NV of each VOBU if the VOBU being processed is the last VOBU of each scene in the multi-scene period.

This routine thus formats the interleaved blocks for multi-angle non-seamless switching control in the multi-scene period, and formats the cell control information as the reproduction control information for those multiple scenes.

Figure 29:
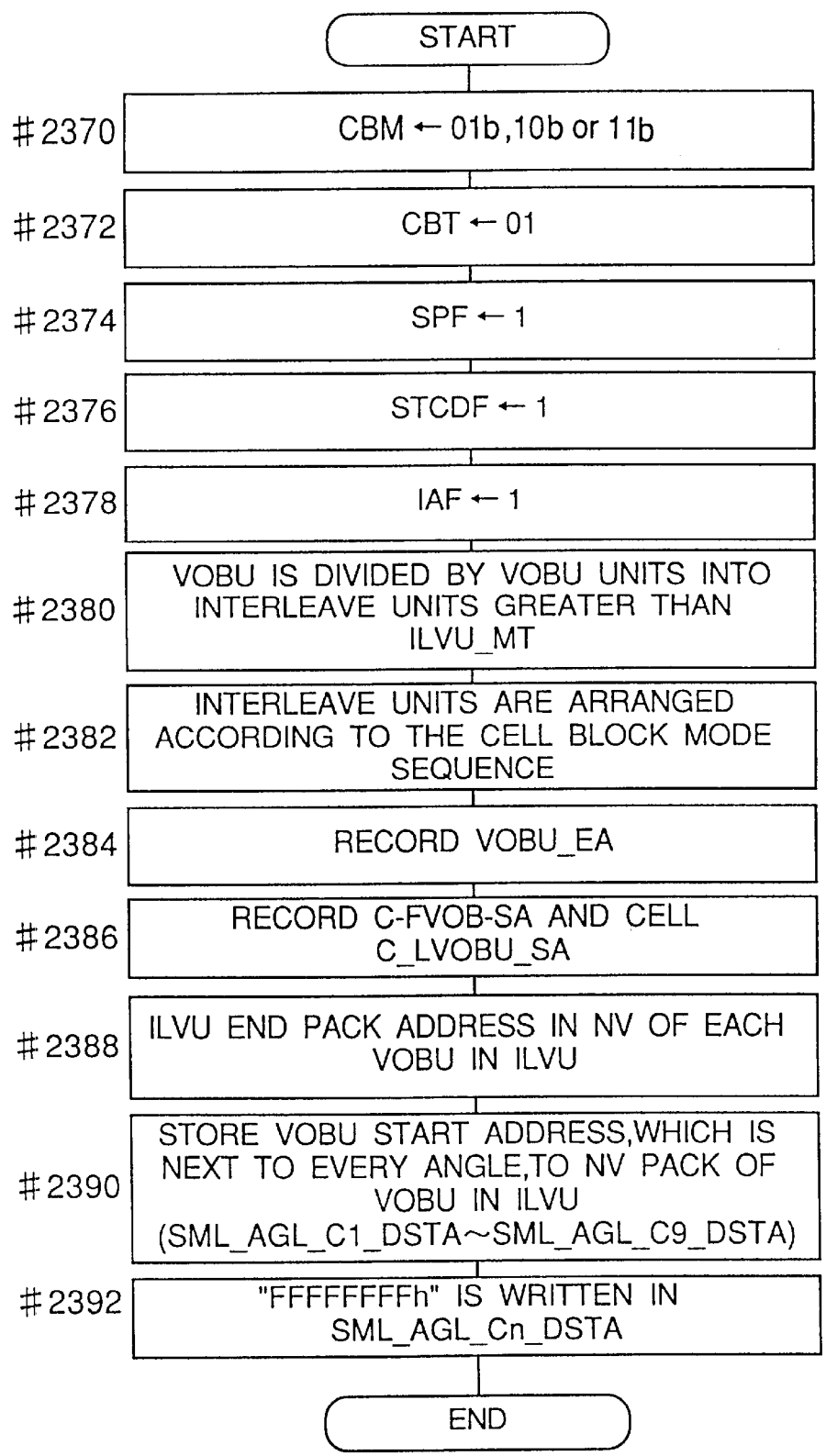
FIG. 29 is a flow chart of the operation of a formatter for seamless switching multi-angle control according to the present invention shown in FIG. 12.

Referring to FIG. 29, the multi-angle seamless switching control routine executed in step #2324 when step #2322, FIG. 27, returns YES is described. This routine defines the interleaved arrangement of the multimedia bitstream, the content of the cell playback information (C_PBI#i) shown in FIG. 5, and the information stored to the navigation pack NV shown in FIG. 8, in the generated DVD multimedia bitstream.

At step #2370 based on the multi-angle flag VOB_Fm setting (=1) declaring whether multi-angle control is applied in the multi-scene period, the cell block mode CBM (FIG. 5) of the cell playback information blocks C_PBI #i (FIG. 5) containing the VOB control information for each scene is declared according to the position of the angle data. For example, the cell block mode CBM of the MA1 cell (FIG. 10) is declared as 01b to indicate the beginning of the cell block, the CBM of MA2 is declared as 10b to indicate a cell between the first and last cells in the block, and the CBM of MA3 is declared as 11b to indicate the end of the cell block.

At step #2372 based on the multi-angle flag VOB Fm setting (=1) declaring whether multi-angle control is applied in the multi-scene period, the cell block type CBT (FIG. 5) of the cell playback information blocks C_PBI #i (FIG. 5) containing the VOB control information for each scene is declared as 01b to indicate an "angle."

At step #2374 the seamless playback flag SPF (FIG. 5) is set to 1 in the cell playback information blocks C_PBI #i (FIG. 5) containing the VOB control information for each scene based on VOB_Fsb, which indicates whether the connection is seamless and is set to 1.

At step #2376 the STC discontinuity flag STCDF (FIG. 5) is set to 1 in the cell playback information blocks C_PBI #i (FIG. 5) containing the VOB control information for each scene based on VOB_Fsb, which indicates whether the connection is seamless and is set to 1.

At step #2378 the interleaved allocation flag IAF (FIG. 5) is set to 1 in the cell playback information blocks C_PBI #i (FIG. 5) containing the VOB control information for each scene based on VOB_FsV, which is set to 1 to indicate interleaving is required.

At step #2380 the location of the navigation pack NV (relative sector number from the VOB beginning) is detected from the title editing unit (VOB below) obtained from the system encoder 900 in FIG. 12, the navigation pack NV is detected based on the minimum interleaved unit presentation time ILVU_MT information (a formatter parameter obtained in step #1854, FIG. 24), the location of the VOBU (expressed as the number of sectors from the VOB beginning, for example) is thus obtained, and the title editing unit VOB is divided into interleave units using VOBU units.

For example, the minimum interleaved unit presentation time is 2 sec and the presentation time of one VOBU is 0.5 sec. in the previous example, and a VOB is therefore divided into interleave units of 4 VOBU each. Note that this allocation operation is applied to the VOB constituting each multi-scene data unit.

At step #2382, the interleave units of each VOB obtained from step #1852 are arranged according to the cell block mode CBM (FIG. 5) sequence (cell block beginning, middle, and end cells) as the VOB control information for each scene recorded in step #2160 to form the interleaved blocks as shown in FIG. 18 or FIG. 34. The interleaved blocks are then added to the VTSTT_VOBS. Using the cell block mode CBM declarations above, for example, MA1, MA2, and MA3 (FIG. 10) are arranged in that sequence.

At step #2384 the relative sector number from the VOBU start is written to the VOB end pack address VOBU_EA (FIG. 8) in the navigation pack NV of each VOBU based on the VOBU position information obtained in step #2360.

At step #2386 the first cell VOBU start address C_FVOBU_SA and the last cell VOBU start address C_LVOBU_SA expressed as the number of sectors from the beginning of the VTS title VOBS (VTSTT_VOBS) are written as the addresses of the navigation packs NV of the first and last VOBU in each cell based on the VTS title VOBS (VTSTT_-VOBS) data obtained in step #2382.

At step #2388 the relative sector number to the last pack in the interleave unit is written to the ILVU end pack address ILVU_EA (FIG. 8) in the navigation pack NV of each VOBU in an interleave unit based on the interleave unit data obtained in step #2370.

The angle #i VOBU start address SML_AGL_C1_DSTA to SML_AGL_C9_DSTA of the seamless angle information SML_AGLI (FIG. 8) in the navigation pack NV of each VOBU is written at step #2390. This address is expressed as the relative sector number inside the data of the interleaved blocks formed in step #2382, and declares the address information of the navigation pack NV contained in the VOBU of all angle scenes with a start time contiguous to the reproduction end time of the VOBU being processed.

At step #2392 "7FFFFFFFh" is written to the angle #i VOBU start address SML_AGL_C1_DSTA to SML_AGL_C9_DSTA (FIG. 8) of the seamless angle information SML_AGLI (FIG. 8) in the navigation pack NV of the VOBU contained in the interleave unit if the interleave unit arranged in step #2382 is the last interleave unit of each scene in the multi-scene period.

This routine thus formats the interleaved blocks for multi-angle seamless switching control in a multi-scene period, and formats the cell control information as the reproduction control information for those multiple scenes.

The parental lock control subroutine (step #2320) executed when step #2318 in FIG. 27 returns NO, that is, when it is determined that parental lock control is implemented and not multi-angle control, is described next with reference to FIG. 30.

The parental lock subroutine described below writes the interleave unit arrangement of the multimedia bitstream, the content of the cell playback information C_PBI #i in FIG. 5), and the navigation pack NV information shown in FIG. 8, to the generated DVD multimedia bitstream.

At step #2402 "00b" is written to the cell block mode CBM (FIG. 5) of the cell playback information C_PBI #i (FIG. 5) containing the VOB control information for each scene based on VOB_Fm, which is set to 0 to indicate that multi-angle control is not enabled in the multi-scene period.

At step #2404 the seamless playback flag SPF (FIG. 5) is set to 1 in the cell playback information C_PBI #i (FIG. 5) containing the VOB control information for each scene based on VOB_Fsb, which indicates whether the connection is seamless and is set to 1.

At step #2406 the STC discontinuity flag STCDF is set to 1 in the cell playback information C_PBI #i (FIG. 5) containing the VOB control information for each scene based on VOB_Fsb, which indicates whether the connection is seamless and is set to 1.

At step #2408 the interleaved allocation flag IAF (FIG. 5) is set to 1 in the cell playback information C_PBI #i (FIG. 5) containing the VOB control information for each scene based on VOB_FsV, which is set to 1 to indicate interleaving is required.

At step #2410 the navigation pack NV position information (the relative sector number from the VOB start) is detected from the title editing unit (VOB) obtained from the system encoder 900 (FIG. 12). The navigation pack NV is then detected based on the number of interleaved VOB divisions ILV_DIV, a formatter parameter obtained in step #1874 in FIG. 25, to obtain the VOBU position information (number of sectors from the VOB start), and divide each VOB into the specified number of interleave units in VOBU units.

At step #2412 the interleave units obtained in step #2410 are then interleaved. For example, the interleave units are arranged in ascending VOB number sequence to create the interleaved blocks as shown in FIG. 18 or FIG. 34, and the interleaved blocks are added to VTSTT_VOBS.

At step #2414 the relative sector number from the VOBU start is written to VOB end pack address VOBU-EA (FIG. 8) in the navigation pack NV of each VOBU based on the VOBU position information obtained in step #2186.

At step #2416 the first cell VOBU start address C_FVOBU_SA and the last cell VOBU start address C_LVOBU_SA expressed as the number of sectors from the beginning of the VTS title VOBS (VTSTT_VOBS) are written as the addresses of the navigation packs NV of the first and last VOBU in each cell based on the VTS title VOBS (VTSTT_VOBS) data obtained in step #2412.

At step #2418 the relative sector number to the last interleave unit pack is written to the ILVU end pack address ILVU_EA (FIG. 8) in the navigation pack NV of the VOBU forming the interleaved units based on the interleaved unit data obtained from step #2412.

At step #2420, the relative sector number in the interleaved block data formed in step #2412 is written to the next-ILVU start address NT_ILVU_SA as the location information of the next ILVU in the navigation packs NV of the VOBU contained in the interleaved unit ILVU.

At step #2422 the interleaved unit flag ILVflag is set to 1 in the navigation packs NV of the VOBU contained in the interleaved unit ILVU.

At step #2424, the Unit END flag UNITENDFLAG of the navigation pack NV in the last VOBU of the interleaved unit ILVU is set to 1.

At step #2426 "FFFFFFFFh" is written to the NEXT-ILVU start address NT_ILVU_SA of the navigation pack NV of the VOBU in the last interleaved unit ILVU of each VOB.

The operation described above thus formats the interleaved blocks to enable parental lock control in multi-scene periods, and formats the control information in the cells, that is, the cell playback control information for the multi-scene periods.

Figure 31:
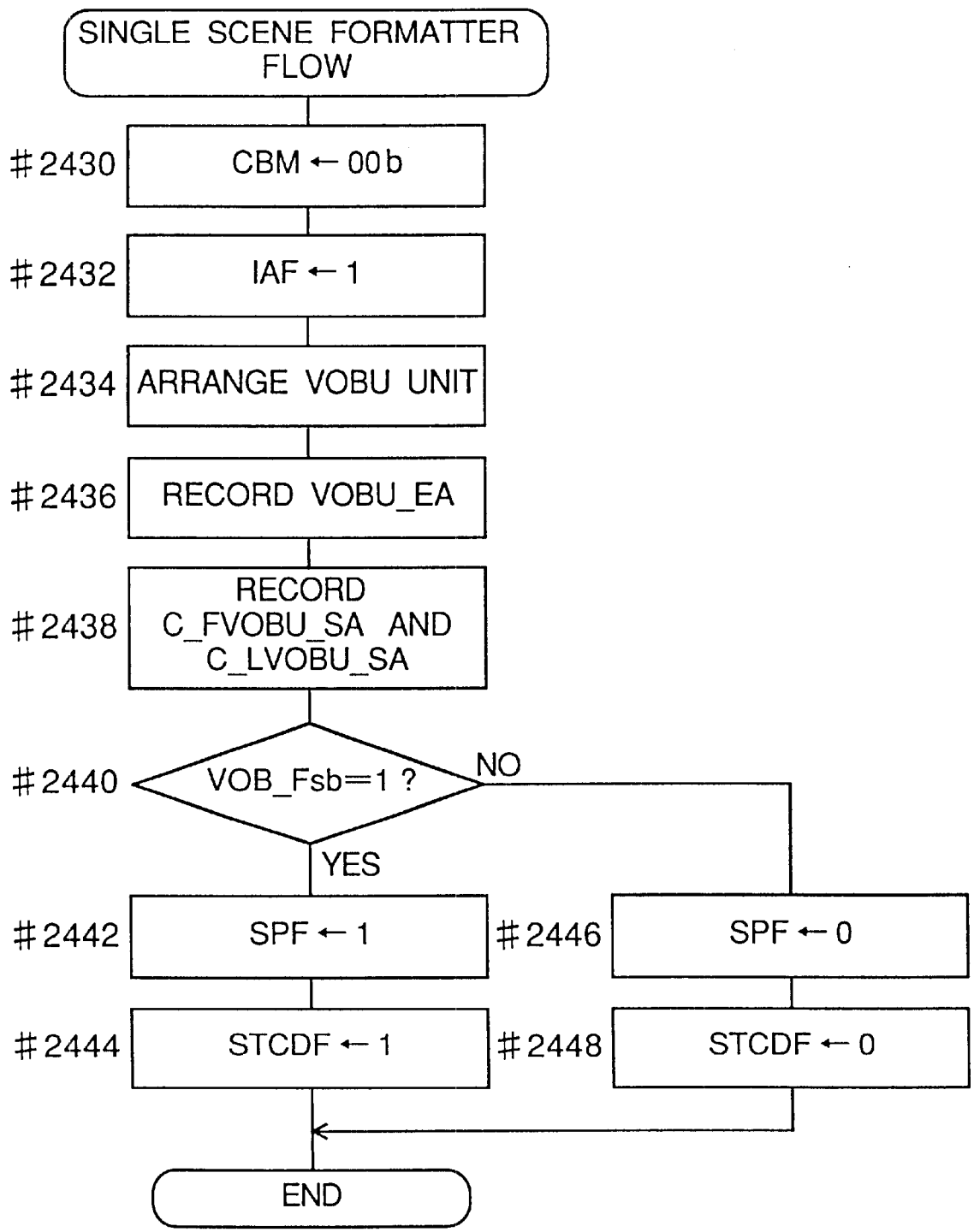
FIG. 31 is a flow chart of the operation of a formatter for a single scene according to the present invention shown in FIG. 12.

The subroutine executed as step #2314 when steps #2312 and #2316 in FIG. 27 return NO, that is, when the scene is determined to be a single scene and not a multi-scene period, is described next with reference to FIG. 31.

The single scene subroutine described below writes the interleave unit arrangement of the multimedia bitstream, the content of the cell playback information C_PBI #i shown in FIG. 5, and the navigation pack NV information shown in FIG. 8, to the generated DVD multimedia bitstream.

At step #2430 a value "00b" indicating a "non-cell block" is written to the cell block mode CBM (FIG. 5) of the cell playback information C_PBI #i containing the VOB control information for each scene based on VOB_Fp, which is set to 0 to indicate that the scene is a single scene and not part of a multi-scene period.

At step #2432 the interleaved allocation flag IAF (FIG. 5) is set to 0 in the cell playback information C_PBI #i containing the VOB control information for each scene based on VOB_FsV, which is set to 0 to indicate interleaving is not required.

At step #2434 the navigation pack NV position information (the relative sector number from the VOB start) is detected from the title editing unit (VOB) obtained from the system encoder 900 (FIG. 12), placed in the VOBU unit, and added to the VTSTT_VOBS, the video and other stream data of the multimedia bitstream.

At step #2436 the relative sector number from the VOBU start is written to the VOB end pack address VOBU_EA (FIG. 8) in the navigation pack NV of each VOBU based on the VOBU position information obtained in step #2434.

At step #2438, the address of the navigation pack of the first VOBU in each cell, and the address of the navigation pack NV of the last VOBU in each cell are extracted. The number of sectors from the beginning of the VTSTT_VOBS is recorded as the first cell VOBU start address C_FVOBU_SA, and the number of sectors from the end of the VTSTT_VOBS is recorded as the last cell VOBU start address C_LVOBU_SA.

At step #2440 the state determined as a result of step #300 or step #600 in FIG. 20, that is, whether VOB_Fsb is set to 1 indicating a seamless connection to the preceding or following scenes, is evaluated. If step #2440 returns YES, the procedure moves to step #2442.

At step #2442 the seamless playback flag SPF (FIG. 5) is set to 1 in the cell playback information C_PBI #i (FIG. 5) containing the VOB control information for each scene based on VOB_Fsb, which indicates whether the connection is seamless and is set to 1.

At step #2444 the STC discontinuity flag STCDF is set to 1 in the cell playback information C_PBI #i (FIG. 5) containing the VOB control information for each scene based on VOB_Fsb, which indicates whether the connection is seamless and is set to 1.

If step #2440 returns NO, that is, there is not a seamless connection to the preceding scene, the procedure moves to step #2446.

At step #2446 the seamless playback flag SPF (FIG. 5) is set to 0 in the cell playback information C_PBI #i (FIG. 5) containing the VOB control information for each scene based on VOB_Fsb, which indicates whether the connection is seamless and is set to 0.

At step #2448 the STC discontinuity flag STCDF is set to 0 in the cell playback information C_PBI #i (FIG. 5) containing the VOB control information for each scene based on VOB_Fsb, which indicates whether the connection is seamless and is set to 0.

The operation described above thus formats a multimedia bitstream for a single scene period, and records the cell playback information C_PBI #i (FIG. 5), and the information in the navigation pack NV (FIG. 8), to the generated DVD multimedia bitstream.

An authoring encoder EC according to the present invention is described in further detail below with reference to an authoring encoder whereby alternative reproduction are possible in parental lock control and multi-angle control. Authoring encoding enabling alternative reproduction can be broadly divided into the following six processes.

Process 1: Elementary Encoding Parameter Generation (EEParam)
  Enter parameters for source material (video information, audio information, subpicture information)
  Specify material that will constitute angle periods.
  Specify material that will constitute parental lock control periods.
Process 2: Check EEParam and Provide Feedback
  Angle period verification
  Check uniformity of angle period materials. Confirm that the length of the video is equal. Confirm an equal number of audio and subpicture channels. Display an error if uniformity cannot be verified.
  Parental lock control period verification
  Verify that the M value satisfies equation 1 and equation 4. If the value of M is not acceptable, display an error.
Process 3: Elementary Stream Encoding
  Encode the source streams based on the EEParam values.
Process 4: System Stream Encoding
Process 5: Formatting
Process 6: Produce Disk.

Note that processes 4, 5, and 6 are basically identical to steps #1800 to #2300 described above with reference to FIG. 20 and FIG. 21, and further description thereof is thus omitted below.

Figure 45:
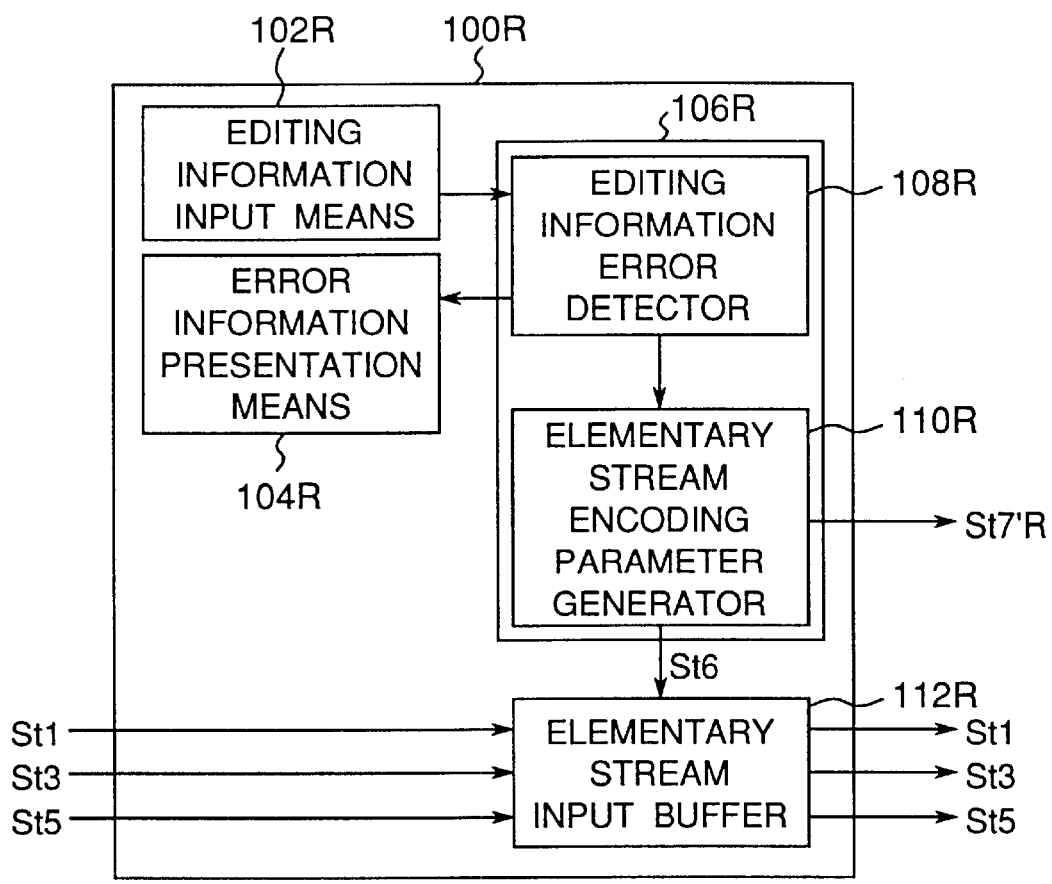
FIG. 45 is a block diagram of the structure of a third embodiment of an editing information generator according to the present invention shown in FIG. 12.

An editing information generator 100R for generating editing control command data St7 is described here with reference to FIG. 45. An editing information generator 100R in the present example is similar in construction to an editing information generator 100 shown in FIG. 37 and FIG. 38, and comprises a computer and control software therefor, a video tape drive device, and a tape drive device. Referring to FIG. 45, 102R is an editing information input means, 104R is an error information presentation means, 108R is an editing information error detector, 110R is an elementary stream encoding parameter generator, and 112R is an elementary stream input buffer.

The editing information input means 102R is preferably a text editor written in software for receiving information input by a user a computer keyboard or other input device, and storing the information in computer memory (not shown in the figure). The stored data is a video table VTBL (VTBL: Video Table) as shown in FIG. 43, and an audio table ATBL (ATBL: Audio Table) as shown in FIG. 44.

Figure 46:
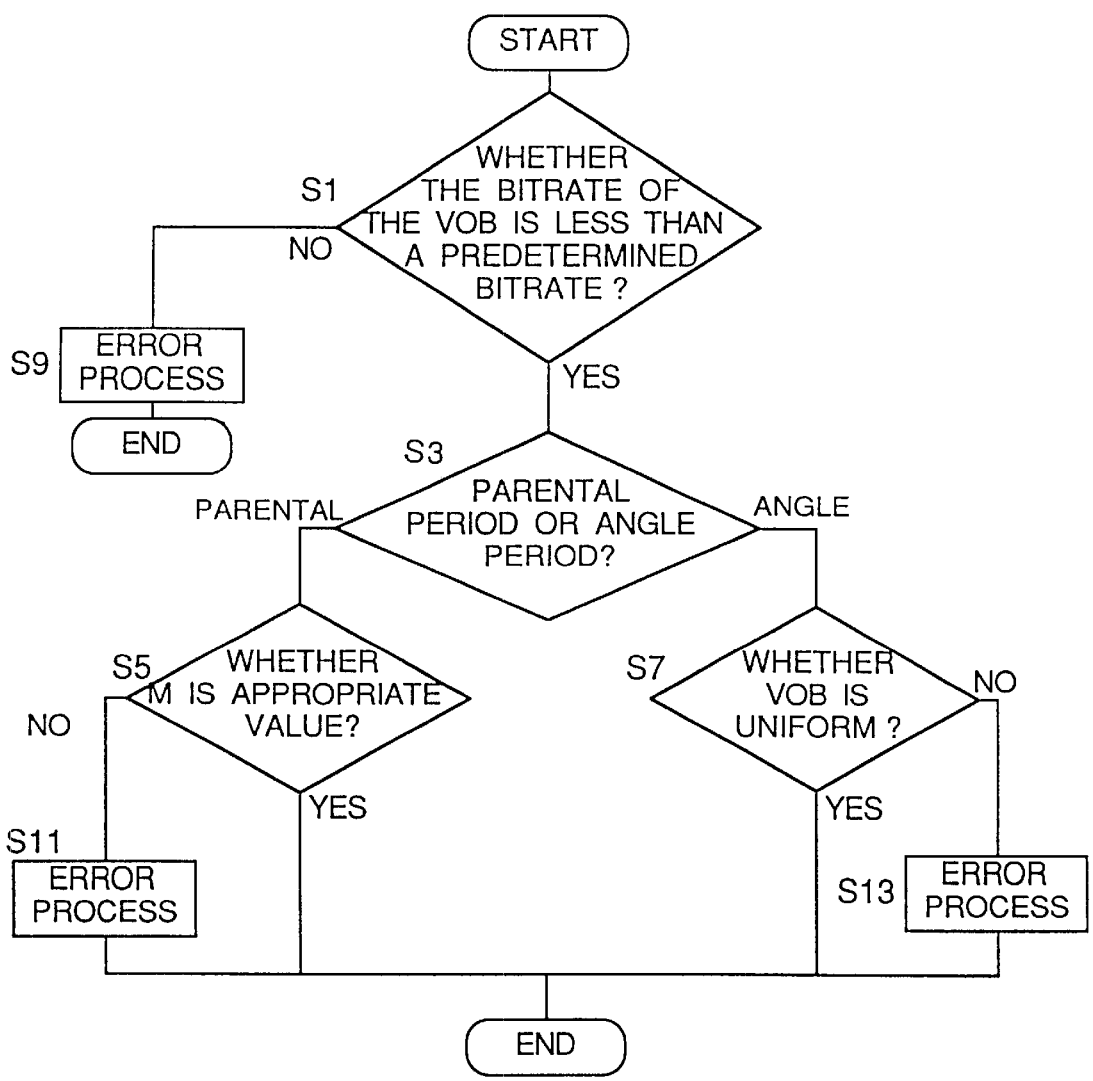
FIG. 46 is a flow chart showing the verification operation for whether an alternative reproduction period is a multi-angle control period or a parental lock control period.

The editing information error detector 108R is preferably a software construction for verifying the content of the generated VTBL and ATBL, outputting an error value to the error information presentation means 104R if an inappropriate setting is detected, and outputting the VTBL and ATBL to the elementary stream encoding parameter generator 110R if there are no inappropriate settings. It should be noted that the operation of the editing information generator 10OR is described further below in detail with reference to FIG. 46.

The error information presentation means 104R is preferably a software construction for analyzing error values input from the editing information error detector 108R, and providing visual feedback to the user. Specifically, based on information contained in an error value, it is determined whether a parameter in VTBL or ATBL is inappropriate, and presents on the display device of the computer a warning message to the effect that a parameter is inappropriate.

The elementary stream input buffer 112R receives video material and audio material input from an external source. Typically, this is a video tape drive for receiving video material, and a tape drive for receiving audio material and subpicture material.

The elementary stream encoding parameter generator 110R is preferably a software construction for analyzing the VTBL and ATBL, and outputting parameters to the elementary stream input buffer 112 and external video encoder and audio encoder.

Based on the VTBL shown in FIG. 43, for example, time code St6 is output to the elementary stream input buffer 112R, and the remaining information is output to the encoding system controller 200 as the editing control command data St7R.

Based on the ATBL shown in FIG. 44, for example, time code St6 is output to the elementary stream input buffer 112R, and the remaining information is output to the encoding system controller 200 as the editing control command data St7R.

The above processes are described in an actual example with reference to FIG. 42, FIG. 43, FIG. 44, FIG. 45, and FIG. 46.

Figure 42:
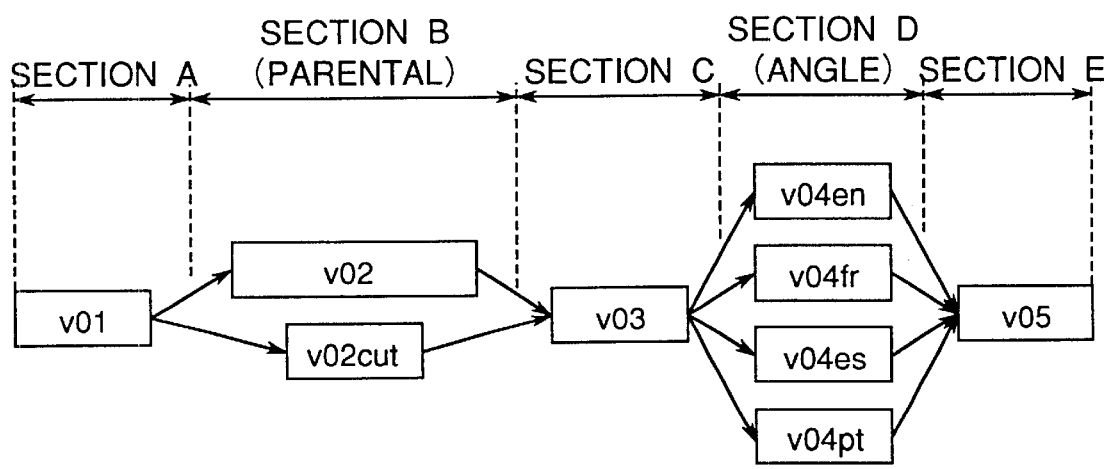
FIG. 42 is used to describe the video data of an optical disc according to the present invention, and the reproduction sequence thereof.

FIG. 42 is an example of the video data for a produced disk, and the reproduction sequence therefor.

Referring to FIG. 42, period B is a parental lock control period comprising video data v02 and v02cut. Video data v02cut represents video data from which a part of the video has been cut for the purpose of viewer restrictions. Period D is an angle period comprising video data v04en, v04fr, v04es, and v04pt. Video data v04en, v04fr, v04es, and v04pt are video data captured at four angles. Operation is described in detail below in each process.

First, in the first process, parameter EEParam for elementary stream encoding is generated. The editing information input means 102R receives user input, and generates video table VTBL, a parameter for video encoding, and audio table ATBL, a parameter for audio encoding.

An example of a video table VTBL for the video encoding input data shown in FIG. 42 is shown in FIG. 43. As shown in the figure, there are eight fields in the video table VTBL shown as, in sequence from the left, VOB, Audio, SP, ATTR, START_TC, END_TC, BR, and 132. These are defined as:

VOB: MPEG stream name for interleaving

Audio: number of audio streams in the MPEG stream

SP: number of subpicture streams in the MPEG stream

ATTR: attribute information; angle periods are "AG", parental lock control periods are "DC", and standard periods are "SL".

START_TC: start encoding code of the source tape

END_TC: end encoding code of the source tape

BR: BitRate

132: reverse telecine conversion declaration flag

An example of an audio table ATBL for the audio encoding input data is shown in FIG. 44. As shown in the figure, there are also eight fields in the audio table ATBL shown as from the left as VOB, STR_NO, MODE, START_TC, END_TC, ATTR, BR, and FQ. These are defined as:

VOB: MPEG stream name for interleaving

STR_NO: stream number

MODE: encoding mode, either AC3 or LPCM

START_TC: start encoding code of the source tape

END_TC: end encoding code of the source tape

ATTR: attribute information; angle periods are "AG", parental lock control periods are "DC", and standard periods are "SL".

BR: BitRate

FQ: sampling frequency

Note that the sequence in which the fields are enumerated matches the reproduction sequence. In addition, angle and parental lock control periods are in a continuously enumerated format. The sequence of enumeration in an angle period is the angle number sequence.

Checking the elementary encoding parameter EEParam and providing feedback occurs next in the second process. The error information presentation means 104R and editing information error detector 108R perform verification of the multi-angle control periods and parental lock control periods. Verification of the multi-angle control periods and parental lock control periods is described next below with reference to the flow chart in FIG. 46.

First, at step S1, the BitRate is evaluated. In this BitRate evaluation, it is determined whether the BitRate of each VOB (MPEG stream) is equal to or less than a particular BitRate.

That is, the overall BitRate of the VOB is determined based on:

BitRate assigned to video information in the VOB: BR value of the VTBL

BitRate assigned to audio information in the VOB: BR value of the ATBL

BitRate assigned to subpicture information in the VOB: constant value number of audio streams in the VOB: Audio value in the VTBL number of subpicture streams in the VOB: SP value in the VTBL and it is determined whether the overall BitRate is less than the transfer rate to the video buffer. If the BitRate is not appropriate, control advances to step S9, and an error process is accomplished to, for example, present a warning message on a monitor device.

The period is determined in step S3. First, each entry in the video table VTBL is inspected in sequence to detect angle periods and parental lock control periods. More specifically, entries with an attribute value of "AG" are determined to be angles, and the set of contiguous entries with an attribute of "AG" are determined to be video data entries forming an angle period. Parental lock control periods are determined in the same manner. When a parental lock control period is determined, control advances to step S5; when a multi-angle control period is determined, control advances to step S7.

Verification of the parental lock control period occurs in step S5. The entries of each VOB stored as a parental lock control period are verified, and it is determined whether the M value satisfies equations (1) and (4) above. An error process (step S11) is executed if a value is not appropriate. (A warning message is displayed on a monitor.)

Verification of the multi-angle control period occurs in step S7. It is determined whether the above-noted conditions of an angle period are satisfied, and whether the uniformity of each VOB associated with the angle period can be assured. An error process (step S13) is executed if a value is not appropriate. (A warning message is displayed on a monitor.)

In step S9, the video table VTBL and audio table ATBL are output from editing information generator 100R to the elementary stream encoding parameter generator 110R, and control then advances to the next (third) process.

Elementary stream encoding occurs in the third process. The materials are encoded based on the elementary encoding parameter EEParam by means of the elementary stream encoding parameter generator 110R, elementary stream input buffer 112R, and encoding boards, etc. (not shown in the figure). The elementary stream encoding parameter generator 110R controls the elementary stream input buffer 112R (tape drive, other) according to the video table VRBL and audio table ATBL, outputs the material data to an external encoder, and simultaneously outputs encoding parameters to the external encoder. It should be noted that in place of the elementary stream encoding parameter generator 110R, the encoding system controller 200 can be caused to control the elementary stream input buffer 112R.

Processes 4, 5, and 6 are basically identical to steps #1800 to #2300 described above with reference to FIG. 20 and FIG. 21, and further description thereof is thus omitted below.

It should be noted that description of process 4, process 5, and process 6 is omitted below.

<3.7> Decoder Flow Charts

<3.7.1> Disk-to-stream Buffer Transfer

The decoding information table produced by the decoding system controller 2300 based on the scenario selection data St51 is described below referring to FIG. 32 and FIG. 33. The decoding information table comprises the decoding system table shown in FIG. 32, and the decoding table shown in FIG. 33.

As shown in FIG. 32, the decoding system table comprises a scenario information register and a cell information register. The scenario information register records the title number and other scenario reproduction information selected by the user and extracted from the scenario selection data St51. The cell information register extracts and records the information required to reproduce the cells constituting the program chain based on the user-defined scenario information extracted into the scenario information register.

More specifically, the scenario information register contains plural sub-registers, that is, the angle number register ANGLE_NO_reg, VTS number register VTS_NO_reg, PGC number register VTS_PGCI_NO_reg, audio ID register AUDIO_ID_reg, subpicture ID register SP_ID_reg, and the SCR buffer register SCR_buffer.

The angle number register ANGLE_NO_reg stores which angle is reproduced when there are multiple angles in the reproduced PGC.

The VTS number register VTS_NO_reg records the number of the next VTS reproduced from among the plural VTS on the disk.

The PGC number register VTS_PGCI_NO_reg records which of the plurality of program chains PGC present in the video title set VTS is to be reproduced for parental lock control or other application.

The audio ID register AUDIO_ID_reg records which of the plurality of audio streams in the VTS are to be reproduced.

The subpicture ID register SP_ID_reg records which of the plurality of subpicture streams is to be reproduced when there are plural subpicture streams in the VTS.

The SCR buffer SCR_buffer is the buffer for temporarily storing the SCR recorded to the pack header as shown in FIG. 7. As described with reference to FIG. 3, this temporarily stored system clock reference SCR is output to the decoding system controller 2300 as the bitstream control data St63.

The cell information register contains the following sub-registers: the cell block mode register CBM_reg, cell block type register CBT_reg, seamless playback flag register SPB_reg, interleaved allocation flag register IAF_reg, STC discontinuity flag register STCDF_reg, seamless angle change flag register SACF_reg, first cell VOBU start address register C_FVOBU_SA_reg, and last cell VOBU start address register C_LVOBU_SA_reg.

The cell block mode register CBM_reg stores a value indicating whether plural cells constitute one functional block. If there are not plural cells in one functional block, CBM_reg stores N_BLOCK. If a plurality of cells constitute one functional block, the value F_CELL is stored in the first cell in the functional block, L_CELL is stored in the last cell in the functional block, and BLOCK is stored in all cells between the first and last cells in the functional block.

The cell block type register CBT_reg stores a value defining the type of the block indicated by the cell block mode CBM_reg. If the cell block is a multi-angle block, A_BLOCK is stored; if not, N_BLOCK is stored.

The seamless reproduction flag register SPF_reg stores a value defining whether that cell is seamlessly connected with the cell or cell block reproduced therebefore. If a seamless connection is specified, SML is stored; if a seamless connection is not specified, NSML is stored.

The interleaved allocation flag register IAF_reg stores a value identifying whether the cell exists in an interleaved block. If the cell is part of a an interleaved block, ILVB is stored; otherwise N_ILVB is stored.

The STC discontinuity flag register STCDF_reg defines whether the system time clock STC used for synchronization must be reset when the cell is reproduced; when resetting the system time clock STC is necessary, STC_RESET is stored; if resetting is not necessary, STC_NRESET is stored.

The first cell VOBU start address register C_FVOBU_SA_reg stores the VOBU start address of the first cell in a block. The value of this address is expressed as the distance from the logic sector of the first cell in the VTS title VOBS (VTSTT_VOBS) as measured by and recorded as the number of sectors.

The last cell VOBU start address register C_LVOBU_SA_reg stores the VOBU start address of the last cell in the block. The value of this address is expressed as the distance from the logic sector of the first cell in the VTS title VOBS (VTSTT_VOBS) measured by and recorded as the number of sectors.

The decoding table shown in FIG. 33 is described below. As shown in the figure, the decoding table comprises the following registers: an information register for non-seamless multi-angle control, an information register for seamless multi-angle control, a VOBU information register, and an information register for seamless reproduction.

The information register for non-seamless multi-angle control comprise NSML_AGL_C1_DSTA reg to NSML_AGL_C9_DSTA_reg.

NSML_AGL_C1_DSTA_reg to NSML_AGL_C9_DSTA_reg record the NMSL_AGL_C1_DSTA to NMSL_AGL_C9_DSTA values in the PCI packet shown in FIG. 8.

The information register for seamless multi-angle control comprises SML_AGL_C1_DSTA_reg to SML_AGL_C9_DSTA_reg.

SML_AGL_C1_DSTA_reg to SML_AGL_C9_DSTA_reg record the SML_AGL_C1_DSTA to SML_AGL_C9_DSTA values in the DSI packet shown in FIG. 8.

The VOBU information register stores the end pack address VOBU_EA.

The information register for seamless reproduction comprises: an interleaved unit flag register ILVU_flag_reg, Unit END flag register UNIT_END_flag_reg, ILVU End Address register ILVU_EA_reg, Next Interleaved Unit Start Address register NT_ILVU_SA_reg, the presentation start time of the first video frame in the VOB register VOB_V_SPTM_reg, the presentation end time of the last video frame in the VOB register VOB_V_EPTM_reg, audio reproduction stopping time 1 register VOB_A_GAP_PTM1_reg, audio reproduction stopping time 2 register VOB_A_GAP_PTM2_reg, audio reproduction stopping period 1 register VOB_A_GAP_LEN1_reg, and audio reproduction stopping period 2 register VOB_A_GAP_LEN2_reg.

The interleaved unit flag register ILVU_flag reg stores a value indicating whether the video object unit VOBU is in an interleaved block, and stores ILVU if it is, and N_ILVU if not.

The Unit END flag register UNIT_END_flag_reg stores a value indicating whether the video object unit VOBU is the last VOBU in the interleaved unit ILVU if the VOBU is in an interleaved block. Because the interleaved unit ILVU is the data unit for continuous reading, END is stored if the VOBU currently being read is the last VOBU in the interleaved unit ILVU, and N_END is otherwise stored.

The Interleaved Unit End Address register ILVU_EA_reg stores the address of the last pack in the ILVU to which the VOBU belongs if the VOBU is in an interleaved block. This address is expressed as the number of sectors from the navigation pack NV of that VOBU.

The Next Interleaved Unit Start Address register NT_ILVU_SA_reg stores the start address of the next interleaved unit ILVU if the VOBU is in an interleaved block. This address is expressed as the number of sectors from the navigation pack NV of that VOBU.

The Initial Video Frame Presentation Start Time register VOB_V_SPTM_reg stores the time at which presentation of the first video frame in the VOB starts.

The Final Video Frame Presentation Termination Time register VOB_V_EPTM_reg stores the time at which presentation of the last video frame in the VOB ends.

The audio reproduction stopping time 1 register VOB_A_GAP_PTM1_reg stores the time at which the audio is to be stopped, and the audio reproduction stopping period 1 register VOB_A_GAP_LEN1_reg stores the length of time the audio is stopped.

The audio reproduction stopping time 2 register VOB_A_GAP_PTM2_reg and audio reproduction stopping period 2 register VOB_A_GAP_LEN2_reg store the same values.

<3.8> DVD Player

Figure 41:
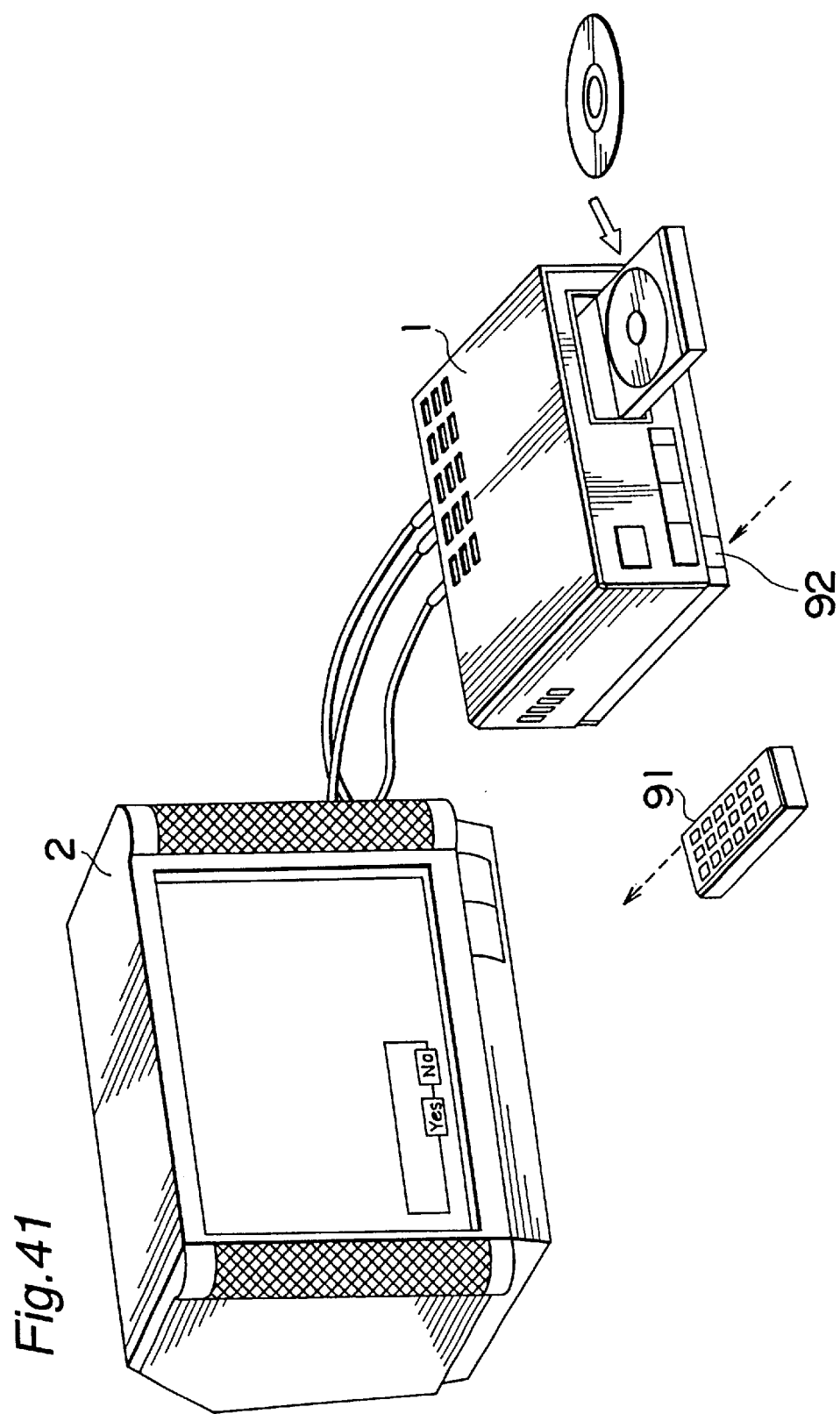
FIG. 41 is an exemplary diagram of a reproduction apparatus for a DVD, which is an optical disc to which is recorded a multimedia bitstream generated by a multimedia optical disc authoring system according to the present invention.

An example of a reproduction apparatus for a DVD, which is an optical disk to which is recorded a multimedia bitstream generated by a multimedia optical disk authoring system according to the present invention, is shown in FIG. 41. A DVD is used stored in a tray of a DVD player 1. The DVD player 1 is connected to a television monitor 2 whereby video and audio reproduced from the DVD are presented. Note that a remote control 91 is also provided for the user to operate the DVD player 1 and television monitor 2.

The DVD player 1 has an opening at the front, and a drive mechanism into which an optical disc is set is disposed in the depthwise direction from the opening. A remote control receptor 92 comprising an optical receptor for detecting an infrared beam emitted by the remote control 91 is disposed at the front of the DVD player 1. When a user holds and operates the remote control, the remote control receptor 92 emits an interrupt signal indicating that a key signal has been received.

A video output terminal and audio output terminal are disposed at the back of the DVD player 1, and by connecting thereto an AV cord, a video signal reproduced from the DVD can be output to a large-screen television monitor 2 for consumer use. As a result, the user can enjoy reproduced video from a DVD on a 33 inch, 35 inch, or other large television for consumer use. As will also be known from the above description, a DVD player 1 according to the present embodiment is not used connected to a personal computer, for example, but is used in conjunction with a television monitor 2 as a household appliance.

The remote control 91 comprises a keypad with resistance springs provided on the case surface thereof, and outputs a code corresponding to the depressed key by means of an infrared beam. In addition to a POWER key, play, stop, pause, fast forward, and reverse keys, the keypad also has an "angle" key for changing the angle, and a "setup" key for presenting a setup menu whereby parental lock control can be enabled, for example.

Industrial Applicability

As described above, a multimedia bitstream generating method and multimedia optical disc authoring system according to the present invention are suitable for use in an authoring system whereby a title comprising bitstreams carrying various information can be edited according to user desires to construct a new title, and, further, are suitable to a digital video disc system, that is, the DVD system, that has been developed in recent years.

What is claimed is:

1. An authoring encoder for generating a bitstream comprising editing units contiguously arranged in alternative selection periods by segmenting into a specific number of source streams for carrying moving picture data, audio data, and subpicture data information constituting each title having a sequence of related content, said authoring encoder comprising:

means for presenting content of the source streams in the editing units;

means for generating editing instruction data for the presented editing units;

verification means for verifying the editing instruction data, outputting the editing instruction data when the editing instruction data is appropriate, and generating an error signal when the editing instruction data is inappropriate; and means for generating a parameter for elementary encoding the source streams based on the editing instruction data outputted by said verification means.

2. An authoring encoder according to claim 1, wherein the editing instruction data comprises video management information and audio management information.

3. An authoring encoder according to claim 2, further comprising error information presentation means for indicating that either the video management information or audio management information is inappropriate based on the error signal.

4. An authoring encoder according to claim 2, further comprising period evaluation means for determining whether an alternative reproduction period is a parental lock control period or a multi-angle control period based on the video management information.

5. An authoring encoder according to claim 4, wherein when the alternative reproduction period is the parental lock control period, said verification means determines the alternative reproduction period to be appropriate when the specific number of the source streams is greater than a first constant, Mmin, and is less than a second constant, Mmax, and determines the alternative reproduction period to be inappropriate otherwise.

6. An authoring encoder according to claim 5, wherein the first constant, Mmin, is defined as $$Mmin \leq VOBMaxTime/JMT$$

where VOBMaxTime is a longest time of the moving picture data associated with the alternative reproduction period, and JMT is a maximum jump time of means for reproducing the bitstream, and the second constant, Mmax, is defined as $$Mmax \leq VOBminTime/(JT+(ILUM/BitRate))$$

where VOBminTime is a shortest time of the moving picture data associated with the alternative reproduction period, JT is the time used by the reproduction means for a jump, ILUM is a data size of an interleave unit, and BitRate is a transfer rate to a track buffer of the reproduction means.

7. An authoring encoder according to claim 4, wherein when the alternative reproduction period is a multi-angle control period, said verification means determines the alternative reproduction period to be appropriate when all GOP structures in the moving picture data associated with the alternative reproduction period are equal and determines the alternative reproduction period to be inappropriate otherwise.

8. A bitstream generating method for generating a bitstream comprising editing units contiguously arranged in alternative selection periods by segmenting into a specific number of source streams for carrying moving picture data, audio data, and subpicture data information constituting each title having a sequence of related content, said bitstream generating method comprising:

presenting content of the source streams in the editing units;

generating editing instruction data for the presented editing units;

verifying the editing instruction data, outputting the editing instruction data when the editing instruction data is appropriate, and generating an error signal when the editing instruction data is inappropriate; and generating a parameter for elementary encoding the source streams based on the outputted editing instruction data.

9. A bitstream generating method according to claim 8, wherein the editing instruction data comprises video information and audio information.

10. A bitstream generating method according to claim 9, further comprising indicating that either the video information or the audio information is inappropriate based on the error signal.

11. A bitstream generating method according to claim 9, further comprising determining whether an alternative reproduction period is a parental lock control period or a multi-angle control period based on the video information.

12. A bitstream generating method according to claim 11, further comprising determining, when the alternative reproduction period is a parental lock control period, that the alternative reproduction period is appropriate when the specific number of the source streams is greater than a first constant, Mmin, and is less than a second constant, Mmax, and determining the alternative reproduction period to be inappropriate otherwise.

13. A bitstream generating method according to claim 12, wherein the first constant, Mmin, is defined as $$Mmin \geq VOBMaxTime/JMT$$

where VOBMaxTime is a longest time of the moving picture data associated with the alternative reproduction period, and JMT is a maximum jump time of means for reproducing the bitstream, and the second constant, Mmax, is defined as $$Mmax \leq VOBminTime/(JT+(ILUM/BitRate))$$

where VOBminTime is a shortest time of the moving picture data associated with the alternative reproduction period, JT is the time used by the reproduction means for a jump, ILUM is a data size of an interleave unit, and BitRate is a transfer rate to a track buffer of the reproduction means.

14. A bitstream generating method according to claim 11, further comprising determining, when the alternative reproduction period is a multi-angle control period, that the multi-angle control period is appropriate when all GOP structures in the moving picture data associated with the alternative reproduction period are equal, and determining the alternative reproduction period to be inappropriate otherwise.

15. A manufacturing method for an optical disk medium to which is recorded a bitstream comprising editing units contiguously arranged in alternative selection periods by segmenting into a specific number of source streams for carrying moving picture data, audio data, and subpicture data information constituting each title having a sequence of related content, said manufacturing method comprising:

presenting content of the source streams in the editing units;

generating editing instruction data for the presented editing units;

verifying the editing instruction data, outputting the editing instruction data when the editing instruction data is appropriate, and generating an error signal when the editing instruction data is inappropriate;

generating an encoding parameter based on the editing instruction data;

encoding the source streams based on the generated encoding parameter;

encoding the encoded source streams based on the generated encoding parameter to create a system stream;

formatting the encoded system stream according to a recording surface of the optical disc medium; and recording the formatted and encoded system stream to the recording surface of the optical disc medium.

16. A manufacturing method according to claim 15, wherein the editing instruction data comprises video information, said manufacturing method further comprising:

determining whether an alternative reproduction period is a multi-angle control period based on the video information, wherein when the alternative reproduction period is the multi-angle control period, said recording of the formatted and encoded system stream only occurs if all GOP structures in the moving picture data associated with the alternative reproduction period are equal.

17. An authoring system for generating a bitstream stored on a disc, wherein the bitstream has at least one video object containing video information and audio information, and at least one of the at least one video object is a video object that is alternatively reproduced from a plurality of video objects, said authoring system comprising:

a receiving means for receiving encoding condition information for the at least one video object, and selecting information for the at least one alternatively reproduced video object;

a storage means for storing the encoding condition information and the selection information;

a verification means for referencing the encoding condition information and the selection information, and verifying whether the encoding condition information of the at least one alternatively reproduced video object is appropriate; and an encoding means for encoding the at least one video object according to the encoding condition information only when the encoding condition information of the at least one alternatively reproduced video object is appropriate.

18. An authoring system according to claim 17, further comprising feedback means for, when the encoding condition information of the at least one alternatively reproduced video object is inappropriate, providing external feedback indicative of such inappropriateness.

19. An authoring system according to claim 17, wherein the at least one alternatively produced video object is placed on the disc in an interleaved arrangement, said authoring system further comprising a disc reproduction apparatus comprising a track buffer operable to temporarily store data read from the disc before transfer to a decoder for video presentation, wherein said verification means verifies an interleave period formed by the encoding condition information to be inappropriate when said track buffer will overflow or underflow during reproduction.

20. An authoring system according to claim 19, wherein said verification means determines that said track buffer will overflow if a number of segments into which the at least one alternatively reproduced video object is divided in an interleave period is greater than a first constant, and determines that track buffer underflow will occur if the number of segments is less than a second constant.

* * * * *